US012652390B2

(12) United States Patent
Lim et al.

(10) Patent No.: US 12,652,390 B2
(45) Date of Patent: Jun. 9, 2026

(54) METHOD, APPARATUS, AND RECORDING MEDIUM FOR ENCODING/DECODING IMAGE

(71) Applicant: Electronics and Telecommunications Research Institute, Daejeon (KR)

(72) Inventors: Sung-Chang Lim, Daejeon (KR); Jung-Won Kang, Daejeon (KR); Ha-Hyun Lee, Daejeon (KR); Jin-Ho Lee, Daejeon (KR); Hui-Yong Kim, Daejeon (KR)

(73) Assignee: ELECTRONICS and TELECOMMUNICATIONS RESEARCH INSTITUTE, Daejeon (KR)

( * ) Notice: Subject to any disclaimer, the term of this patent is extended or adjusted under 35 U.S.C. 154(b) by 205 days.

(21) Appl. No.: 17/620,595

(22) PCT Filed: Jun. 19, 2020

(86) PCT No.: PCT/KR2020/008006
§ 371 (c)(1),
(2) Date: Dec. 17, 2021

(87) PCT Pub. No.: WO2020/256491
PCT Pub. Date: Dec. 24, 2020

(65) Prior Publication Data
US 2022/0312005 A1     Sep. 29, 2022

(30) Foreign Application Priority Data

Jun. 19, 2019   (KR) ........................ 10-2019-0073131
Jun. 19, 2020   (KR) ........................ 10-2020-0074871

(51) Int. Cl.
H04N 19/117     (2014.01)
H04N 19/132     (2014.01)
H04N 19/70      (2014.01)

(52) U.S. Cl.
CPC ......... H04N 19/117 (2014.11); H04N 19/132 (2014.11); H04N 19/70 (2014.11)

(58) Field of Classification Search
None
See application file for complete search history.

(56) References Cited

U.S. PATENT DOCUMENTS 10,477,247 B2   11/2019   Kang et al.
10,681,371 B2   6/2020   Park
(Continued)

FOREIGN PATENT DOCUMENTS

KR        100772576 B1    11/2007
KR       1020180006411 A   1/2018
(Continued)

OTHER PUBLICATIONS

Bross, et al., "Versatile Video Coding (Draft 4)", Joint Video Experts Team (JVET) of ITU-T SG 16 WP 3 and ISO/IEC JTC 1/SC 29/WG 11, Jan. 9-18, 2019, Document: JVET-M1001 v7, pp. 1-289 (299 pages).

(Continued)

*Primary Examiner* — James M Anderson, II
(74) *Attorney, Agent, or Firm* — Sughrue Mion, PLLC

(57) ABSTRACT

Disclosed herein are a method, apparatus, and storage medium for image encoding/decoding. In the image decoding method, whether filtering is to be performed across a boundary of a target block is determined, and filtering strength for the boundary of the target block and the number of samples to be used for filtering are determined. Based on this determination, filtering across the boundary of the target (Continued)

block is performed. When the filtering strength and the number of samples are determined, coding parameters related to the target block and a neighbor block, such as a block size and a prediction mode, are used.

17 Claims, 39 Drawing Sheets

(56)                    References Cited

U.S. PATENT DOCUMENTS

| | | | |
|---|---|---|---|
| 2006/0013317 A1 | 1/2006 | Lainema | |
| 2015/0146779 A1 | 5/2015 | Bang et al. | |
| 2015/0365703 A1* | 12/2015 | Puri | H04N 19/91 |
| | | | 375/240.24 |
| 2017/0272758 A1* | 9/2017 | Lin | H04N 19/176 |
| 2018/0131969 A1* | 5/2018 | Huang | H04N 19/176 |
| 2019/0014349 A1 | 1/2019 | Karczewicz et al. | |
| 2019/0122672 A1 | 4/2019 | Tomasek et al. | |
| 2019/0200016 A1* | 6/2019 | Jang | H04N 19/14 |
| 2020/0154104 A1 | 5/2020 | Lim et al. | |
| 2020/0204799 A1 | 6/2020 | Lee et al. | |
| 2021/0218962 A1 | 7/2021 | Lim et al. | |
| 2021/0266552 A1* | 8/2021 | Kotra | H04N 19/117 |
| 2021/0329266 A1* | 10/2021 | Andersson | H04N 19/86 |
| 2022/0167020 A1* | 5/2022 | Andersson | H04N 19/86 |

FOREIGN PATENT DOCUMENTS

| | | |
|---|---|---|
| KR | 1020180059413 A | 6/2018 |
| KR | 1020190005730 A | 1/2019 |
| KR | 1020190063452 A | 6/2019 |

OTHER PUBLICATIONS

Andersson, et al., CE11-2.1: Deblocking for 4×N, N×4 and 8×N and N×8 block boundaries not aligned with 8×8 grids, Joint Video Experts Team (JVET) of ITU-T SG 16 WP 3 and ISO/IEC JTC 1/SC 29/WG 11, Mar. 19-27, 2019, Document: JVET-N0098-v1, pp. 1-7 (7 pages).

Bross, et al., "Versatile Video Coding (Draft 5)", Joint Video Experts Team (JVET) of ITU-T SG 16 WP 3 and ISO/IEC JTC 1/SC 29/WG 11, Mar. 19-27, 2019, Document: JVET-N1001 v8, pp. 1-388 (400 pages).

* cited by examiner

510

DIAGONAL SCANNING

HORIZONTAL SCANNING

VERTICAL SCANNING

VERTICAL
BOUNDARY
FILTERING

RECONSTRUCTED          CODING
PIXEL                 PARAMETER

FILTERED PIXELS

STRONG FILTERING ——— ——— WEAK FILTERING

INTRA-PREDICTION
(BLOCK A)

INTER-PREDICTION
(BLOCK B)

FILTERING
EXECUTION REGION

|  | TOP FACE |  |  |
|---|---|---|---|
| LEFT FACE | FRONT FACE | RIGHT FACE | BACK FACE |
|  | BOTTOM FACE |  |  |

FIG. 29

| PICTURE PARAMETER SET (PPS) - SYNTAX | SEMANTICS |
|---|---|
| tiles_enabled_flag | |
| num_tiles_in_column | |
| num_tiles_in_row | |
| loop_filter_across_tile | WHETHER LOOP FILTERING IS TO BE PERFORMED ACROSS BOUNDARY BETWEEN TILES IN PICTURE |
| if(tiles_enabled_flag && loop_filer_across_tile) | |
| { | |
|    for(i =0; i< num_tiles_in_column; i++) | |
|    { | |
|      loop_filer_across_tile_col[i][0] | WHETHER LOOP FILTERING IS TO BE PERFORMED ACROSS UPPER PICTURE BOUNDARY IN EACH TILE, AND FILTERING METHOD |
|      if(loop_filer_across_tile_col[i][0]) | |
|        loop_filer_across_tile_upper_boundary[i] | LOCATION INFORMATION OF i-TH UPPER PICTURE BOUNDARY AND CONTINUOUS BOUNDARY |
|      } | |
|    for(i =0; i< num_tiles_in_row; i++) | |
|    { | |
|      loop_filer_across_tile_row[i][o] | WHETHER LOOP FILTERING IS TO BE PERFORMED ACROSS LEFT PICTURE BOUNDARY OF EACH TILE, AND FILTERING METHOD |
|      if(loop_filer_across_tile_row[i][0]) | |
|        loop_filer_across_tile_left_boundary[i] | LOCATION INFORMATION OF i-TH LEFT PICTURE BOUNDARY AND CONTINUOUS BOUNDARY |
|      } | |
|    for(i =1; i< num_tiles_in_column; i++) | |
|      for(j=1; j< num_tiles_in_row; j++) | |
|      { | |
|        loop_filer_across_tile_col[j][i] | WHETHER LOOP FILTERING IS TO BE PERFORMED ACROSS UPPER BOUNDARY OF EACH TILE, AND FILTERING METHOD |
|        loop_filer_across_tile_row[j][i] | WHETHER LOOP FILTERING IS TO BE PERFORMED ACROSS LEFT BOUNDARY OF EACH TILE, AND FILTERING METHOD |
|      } | |
| } | |

FIG. 32

| | |
|---|---|
| ladf_enabled_flag | u(1) |
| if(ladf_enabled_flag) { | |
|    num_ladf_intervals_minus2 | u(2) |
|    ladf_lowest_interval_qp_offset | se(v) |
|    for(i=0; i<num_ladf_intervals_minus2+1; i++) { | |
|       ladf_qp_offset[ i ] | se(v) |
|       ladf_delta_threshold_minus1[ i ] | ue(v) |
|    } | |
| } | |

FIG. 34

| | |
|---|---|
| ladf_enabled_flag | u(1) |
| if(ladf_enabled_flag) { | |
|   ladf_delta_prec_minus1 | ue(v) |
|   num_ladf_intervals_minus2 | u(2) |
|   ladf_lowest_interval_qp_offset | se(v) |
|   for(i=0; i<num_ladf_intervals_minus2+1; i++) { | |
|     ladf_qp_offset[ i ] | se(v) |
|     ladf_delta_threshold_minus1[ i ] | ue(v) |
|   } | |
| } | |

FIG. 35

| | |
|---|---|
| ladf_enabled_flag | u(1) |
| if(ladf_enabled_flag) { | |
|   num_ladf_intervals_minus2 | u(2) |
|   ladf_lowest_interval_qp_offset | se(v) |
|   for(i=0; i<num_ladf_intervals_minus2+1; i++) { | |
|     ladf_qp_offset[ i ] | se(v) |
|     ladf_delta_prec_minus1[ i ] | ue(v) |
|     ladf_delta_threshold_minus1[ i ] | ue(v) |
|   } | |
| } | |

FIG. 36

| | |
|---|---|
| ladf_enabled_flag | u(1) |
| if(ladf_enabled_flag) { | |
|    ladf_delta_bit_depth | ue(v) |
|    num_ladf_intervals_minus2 | u(2) |
|    ladf_lowest_interval_qp_offset | se(v) |
|    for(i=0; i<num_ladf_intervals_minus2+1; i++) { | |
|       ladf_qp_offset[ i ] | se(v) |
|       ladf_delta_threshold_minus1[ i ] | ue(v) |
|    } | |
| } | |

FIG. 37

| Q | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|----|----|----|----|----|----|----|
| β | 0 | 0 | 0 | 0 | 0 | 0 | 0 | 0 | 0 | 0 | 0  | 0  | 0  | 0  | 0  | 0  | 6  |
| tc | 0 | 0 | 0 | 0 | 0 | 0 | 0 | 0 | 0 | 0 | 0 | 0 | 0 | 0 | 0 | 0 | 0 |
| Q | 17 | 18 | 19 | 20 | 21 | 22 | 23 | 24 | 25 | 26 | 27 | 28 | 29 | 30 | 31 | 32 | 33 |
| β | 7 | 8 | 9 | 10 | 11 | 12 | 13 | 14 | 15 | 16 | 17 | 18 | 20 | 22 | 24 | 26 | 28 |
| tc | 0 | 1 | 1 | 1 | 1 | 1 | 1 | 1 | 1 | 1 | 2 | 2 | 2 | 2 | 3 | 3 | 3 |
| Q | 34 | 35 | 36 | 37 | 38 | 39 | 40 | 41 | 42 | 43 | 44 | 45 | 46 | 47 | 48 | 49 | 50 |
| β | 30 | 32 | 34 | 36 | 38 | 40 | 42 | 44 | 46 | 48 | 50 | 52 | 54 | 56 | 58 | 60 | 62 |
| tc | 3 | 4 | 4 | 4 | 5 | 5 | 6 | 6 | 7 | 8 | 9 | 10 | 11 | 13 | 14 | 16 | 18 |
| Q | 51 | 52 | 53 | 54 | 55 | 56 | 57 | 58 | 59 | 60 | 61 | 62 | 63 | 64 | 65 | | |
| β | 64 | 66 | 68 | 70 | 72 | 74 | 76 | 78 | 80 | 82 | 84 | 86 | 88 | - | - | | |
| tc | 20 | 22 | 25 | 28 | 31 | 35 | 39 | 44 | 50 | 56 | 63 | 70 | 79 | 88 | 99 | | |

FIG. 38

METHOD, APPARATUS, AND RECORDING MEDIUM FOR ENCODING/DECODING IMAGE

TECHNICAL FIELD

The present invention relates, in general, to a method, apparatus, and storage medium for image encoding/decoding. More particularly, the present invention relates to a method, apparatus, and storage medium for image encoding/decoding using an improved deblocking filter.

This application claims the benefit of Korean Patent Application No. 10-2019-0073131, filed Jun. 19, 2019 and the benefit of Korean Patent Application No. 10-2020-0074871, filed Jun. 19, 2020, which are hereby incorporated by reference in its entirety into this application.

BACKGROUND ART

With the continuous development of the information and communication industries, broadcasting services supporting High-Definition (HD) resolution have been popularized all over the world. Through this popularization, a large number of users have become accustomed to high-resolution and high-definition images and/or video.

To satisfy users' demand for high definition, many institutions have accelerated the development of next-generation imaging devices. Users' interest in UHD TVs, having resolution that is more than four times as high as that of Full HD (FHD) TVs, as well as High-Definition TVs (HDTV) and FHD TVs, has increased. As interest therein has increased, image encoding/decoding technology for images having higher resolution and higher definition is currently required.

As image compression technology, there are various technologies, such as inter prediction technology, intra prediction technology, transform, quantization technology, and entropy coding technology.

Inter prediction technology is technology for predicting the value of a pixel included in a current picture using a picture previous to and/or a picture subsequent to the current picture. Intra prediction technology is technology for predicting the value of a pixel included in a current picture using information about pixels in the current picture. Transform and quantization technology may be technology for compressing the energy of a residual signal. The entropy coding technology is technology for assigning a short codeword to a frequently occurring value and assigning a long codeword to a less frequently occurring value.

By utilizing this image compression technology, data about images may be effectively compressed, transmitted, and stored.

Since a filtering method used by a conventional image encoding/decoding method and apparatus is limitedly applied from the standpoint of an application scheme, there is a limitation in performing encoding/decoding.

DISCLOSURE

Technical Problem

An embodiment is intended to provide an image decoding/encoding method and apparatus that perform efficient deblocking filtering.

Technical Solution

In accordance with an aspect, there is provided an image decoding method, including determining whether filtering is to be performed across a target boundary of a target block; when it is determined that the filtering is to be performed, determining a filtering strength for the target boundary of the target block and a number of samples to be used for filtering; and when it is determined that the filtering is to be performed, performing filtering across the target boundary of the target block based on the filtering strength and the number of samples to be used for the filtering.

The number of samples to be used for the filtering may be determined based on at least one of a size of the target block and a size of a neighbor block adjacent to the target block.

Whether the filtering is to be performed may be determined based on a component of the target block.

A length of a filter in the filtering may be determined based on a size of the target block and a component of the target block.

The filtering strength in the filtering may be determined based on prediction modes of multiple blocks adjacent to the target boundary.

The filtering strength in the filtering may be determined based on a difference between motion vectors of multiple blocks adjacent to the target boundary.

When the target boundary is a boundary of a picture, filtering across the target boundary may not be performed.

When the target boundary is a boundary of a slice, filtering across the target boundary may not be performed.

The filtering may be performed based on a quantization parameter for the target block.

Information indicating whether the filtering is to be performed may be included in a parameter set.

The filtering may be determined not to be performed when the information indicates that the filtering is not to be performed.

The parameter set may be referred to by a sub-picture.

In accordance with another aspect, there is provided an image encoding method, including determining whether filtering is to be performed across a target boundary of a target block; when it is determined that the filtering is to be performed, determining a filtering strength for the target boundary of the target block and a number of samples to be used for filtering; and when it is determined that the filtering is to be performed, performing filtering across the target boundary of the target block based on the filtering strength and the number of samples to be used for the filtering.

The filtering strength in the filtering may be determined based on prediction modes of multiple blocks adjacent to the target boundary.

The filtering may be performed based on a quantization parameter for the target block.

Information indicating whether the filtering is to be performed may be included in a parameter set referred to by a sub-picture.

The filtering may be determined not to be performed when the information indicates that the filtering is not to be performed.

In accordance with a further aspect, there is provided a storage medium storing a bitstream generated by the image encoding method.

In accordance with still another aspect, there is provided a computer-readable storage medium including a bitstream, the bitstream indicating image data used in an image decoding method, including decoding is performed on a target block using the image data, whether filtering across a target boundary of the target block is to be performed is determined, when it is determined that the filtering is to be performed, a filtering strength for the target boundary of the target block and a number of samples to be used for the filtering are determined, and when it is determined that the filtering is to be performed, filtering across the target boundary of the target block is performed based on the filtering strength and the number of samples to be used for the filtering.

The filtering strength in the filtering may be determined based on prediction modes of multiple blocks adjacent to the target boundary.

The filtering may be performed based on a quantization parameter for the target block.

Information indicating whether the filtering is to be performed may be included in a parameter set referred to by a sub-picture.

The filtering may not be performed when the information indicates that the filtering is not to be performed.

Advantageous Effects

The embodiment may provide various filtering methods that are performed at respective steps of image encoding/decoding so as to improve image encoding/decoding efficiency.

The embodiment may improve prediction efficiency by generating a prediction image using a reference sample closer to an original image.

The embodiment may improve encoding/decoding efficiency of images.

The embodiment may reduce the computational complexity of an image encoding apparatus and an image decoding apparatus.

DESCRIPTION OF DRAWINGS

FIG. 29 illustrates six faces configured by projecting a 360° image in the form of a cube map according to an example:

FIG. 32 illustrates syntax and semantics of a PPS defined in relation to whether each boundary is to be filtered and the signaling of a filtering method according to an example;

FIG. 34 illustrates a first syntax for signal-adaptive deblocking filtering according to an example;

FIG. 35 illustrates a second syntax for signal-adaptive deblocking filtering according to an example;

FIG. 36 illustrates a third syntax for signal-adaptive deblocking filtering according to an example;

FIG. 37 illustrates a fourth syntax for signal-adaptive deblocking filtering according to an example;

FIG. 38 illustrates a table indicating relationships between quantization parameters and filtering according to an example;

MODE FOR INVENTION

Figure 1:
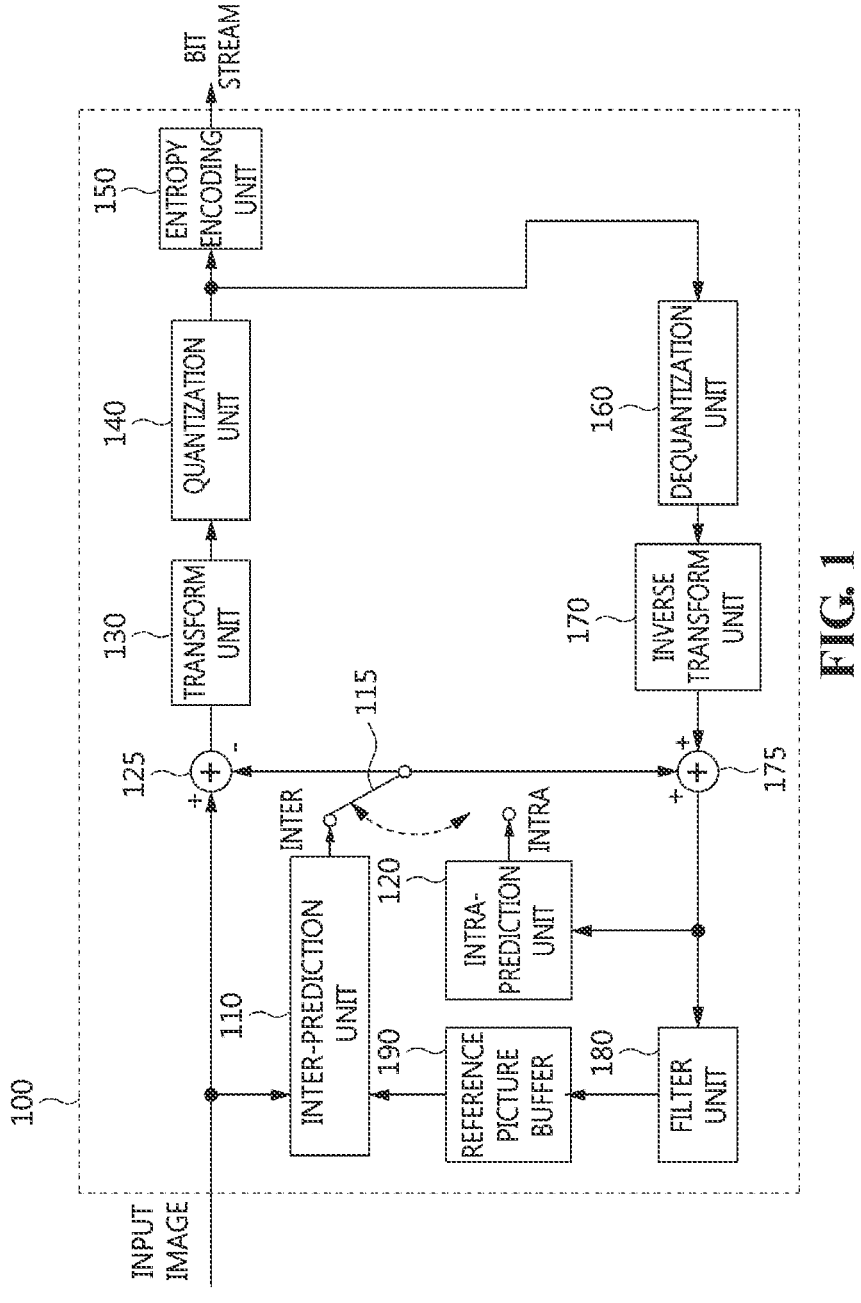
FIG. 1 is a block diagram illustrating the configuration of an embodiment of an encoding apparatus to which the present disclosure is applied.

The present invention may be variously changed, and may have various embodiments, and specific embodiments will be described in detail below with reference to the attached drawings. However, it should be understood that those embodiments are not intended to limit the present invention to specific disclosure forms, and that they include all changes, equivalents or modifications included in the spirit and scope of the present invention.

Detailed descriptions of the following exemplary embodiments will be made with reference to the attached drawings illustrating specific embodiments. These embodiments are described so that those having ordinary knowledge in the technical field to which the present disclosure pertains can easily practice the embodiments. It should be noted that the various embodiments are different from each other, but do not need to be mutually exclusive of each other. For example, specific shapes, structures, and characteristics described here may be implemented as other embodiments without departing from the spirit and scope of the embodiments in relation to an embodiment. Further, it should be understood that the locations or arrangement of individual components in each disclosed embodiment can be changed without departing from the spirit and scope of the embodiments. Therefore, the accompanying detailed description is not intended to restrict the scope of the disclosure, and the scope of the exemplary embodiments is limited only by the accompanying claims, along with equivalents thereof, as long as they are appropriately described.

In the drawings, similar reference numerals are used to designate the same or similar functions in various aspects. The shapes, sizes, etc. of components in the drawings may be exaggerated to make the description clear.

Terms such as "first" and "second" may be used to describe various components, but the components are not restricted by the terms. The terms are used only to distinguish one component from another component. For example, a first component may be named a second component without departing from the scope of the present specification. Likewise, a second component may be named a first component. The terms "and/or" may include combinations of a plurality of related described items or any of a plurality of related described items.

It will be understood that when a component is referred to as being "connected" or "coupled" to another component, the two components may be directly connected or coupled to each other, or intervening components may be present between the two components. On the other hand, it will be understood that when a component is referred to as being "directly connected or coupled", no intervening components are present between the two components.

Also, components described in the embodiments are independently shown in order to indicate different characteristic functions, but this does not mean that each of the components is formed of a separate piece of hardware or software. That is, the components are arranged and included separately for convenience of description. For example, at least two of the components may be integrated into a single component. Conversely, one component may be divided into multiple components. An embodiment into which the components are integrated or an embodiment in which some components are separated is included in the scope of the present specification as long as it does not depart from the essence of the present specification.

Further, in the exemplary embodiments, an expression describing that a component "comprises" a specific component means that additional components may be included within the scope of the practice or the technical spirit of exemplary embodiments, but does not preclude the presence of components other than the specific component.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added. That is, in the present invention, an expression describing that a component "comprises" a specific component means that additional components may be included within the scope of the practice of the present invention or the technical spirit of the present invention, but does not preclude the presence of components other than the specific component.

Some components of the present invention are not essential components for performing essential functions, but may be optional components for improving only performance. The embodiments may be implemented using only essential components for implementing the essence of the embodiments. For example, a structure including only essential components, excluding optional components used only to improve performance, is also included in the scope of the embodiments.

Embodiments will be described in detail below with reference to the accompanying drawings so that those having ordinary knowledge in the technical field to which the embodiments pertain can easily practice the embodiments. In the following description of the embodiments, detailed descriptions of known functions or configurations which are deemed to make the gist of the present specification obscure will be omitted. Further, the same reference numerals are used to designate the same components throughout the drawings, and repeated descriptions of the same components will be omitted.

Hereinafter, "image" may mean a single picture constituting a video, or may mean the video itself. For example, "encoding and/or decoding of an image" may mean "encoding and/or decoding of a video", and may also mean "encoding and/or decoding of any one of images constituting the video".

Hereinafter, the terms "video" and "motion picture" may be used to have the same meaning, and may be used interchangeably with each other.

Hereinafter, a target image may be an encoding target image, which is the target to be encoded, and/or a decoding target image, which is the target to be decoded. Further, the target image may be an input image that is input to an encoding apparatus or an input image that is input to a decoding apparatus. And, a target image may be a current image, that is, the target to be currently encoded and/or decoded. For example, the terms "target image" and "current image" may be used to have the same meaning, and may be used interchangeably with each other.

Hereinafter, the terms "image", "picture", "frame", and "screen" may be used to have the same meaning and may be used interchangeably with each other.

Hereinafter, a target block may be an encoding target block, i.e. the target to be encoded and/or a decoding target block, i.e. the target to be decoded. Further, the target block may be a current block, i.e. the target to be currently encoded and/or decoded. Here, the terms "target block" and "current block" may be used to have the same meaning, and may be used interchangeably with each other. A current block may denote an encoding target block, which is the target of encoding, during encoding and/or a decoding target block, which is the target of decoding, during decoding. Also, the current block may be at least one of a coding block, a prediction block, a residual block, and a transform block.

Hereinafter, the terms "block" and "unit" may be used to have the same meaning, and may be used interchangeably with each other. Alternatively, "block" may denote a specific unit.

Hereinafter, the terms "region" and "segment" may be used interchangeably with each other.

Hereinafter, a specific signal may be a signal indicating a specific block. For example, the original signal may be a signal indicating a target block. A prediction signal may be a signal indicating a prediction block. A residual signal may be a signal indicating a residual block.

In the following embodiments, specific information, data, a flag, an index, an element, and an attribute may have their respective values. A value of "0" corresponding to each of the information, data, flag, index, element, and attribute may indicate a logical false or a first predefined value. In other words, the value of "0", false, logical false, and a first predefined value may be used interchangeably with each other. A value of "1" corresponding to each of the information, data, flag, index, element, and attribute may indicate a logical true or a second predefined value. In other words, the value of "1", true, logical true, and a second predefined value may be used interchangeably with each other.

When a variable such as i or j is used to indicate a row, a column, or an index, the value of i may be an integer of 0 or more or an integer of 1 or more. In other words, in the embodiments, each of a row, a column, and an index may be counted from 0 or may be counted from 1.

In embodiments, the term "one or more" or the term "at least one" may mean the term "plural". The term "one or more" or the term "at least one" may be used interchangeably with "plural".

Below, the terms to be used in embodiments will be described.

Encoder: An encoder denotes a device for performing encoding. That is, an encoder may mean an encoding apparatus.

Decoder: A decoder denotes a device for performing decoding. That is, a decoder may mean a decoding apparatus.

Unit: A unit may denote the unit of image encoding and decoding. The terms "unit" and "block" may be used to have the same meaning, and may be used interchangeably with each other.

A unit may be an M×N array of samples. Each of M and N may be a positive integer. A unit may typically mean an array of samples in the form of two-dimensions.

In the encoding and decoding of an image, "unit" may be an area generated by the partitioning of one image. In other words, "unit" may be a region specified in one image. A single image may be partitioned into multiple units. Alternatively, one image may be partitioned into sub-parts, and the unit may denote each partitioned sub-part when encoding or decoding is performed on the partitioned sub-part.

In the encoding and decoding of an image, predefined processing may be performed on each unit depending on the type of the unit.

Depending on functions, the unit types may be classified into a macro unit, a Coding Unit (CU), a Prediction Unit (PU), a residual unit, a Transform Unit (TU), etc. Alternatively, depending on functions, the unit may denote a block, a macroblock, a coding tree unit, a coding tree block, a coding unit, a coding block, a prediction unit, a prediction block, a residual unit, a residual block, a transform unit, a transform block, etc.

For example, a target unit, which is the target of encoding and/or decoding, may be at least one of a CU, a PU, a residual unit, and a TU.

The term "unit" may mean information including a luminance (luma) component block, a chrominance (chroma) component block corresponding thereto, and syntax elements for respective blocks so that the unit is designated to be distinguished from a block.

The size and shape of a unit may be variously implemented. Further, a unit may have any of various sizes and shapes. In particular, the shapes of the unit may include not only a square, but also a geometric figure that can be represented in two dimensions (2D), such as a rectangle, a trapezoid, a triangle, and a pentagon.

Further, unit information may include one or more of the type of a unit, the size of a unit, the depth of a unit, the order of encoding of a unit and the order of decoding of a unit, etc. For example, the type of a unit may indicate one of a CU, a PU, a residual unit and a TU.

One unit may be partitioned into sub-units, each having a smaller size than that of the relevant unit.

Depth: A depth may mean an extent to which the unit is partitioned. Further, the depth of the unit may indicate the level at which the corresponding unit is present when unit(s) are represented by a tree structure.

Unit partition information may include a depth indicating the depth of a unit. A depth may indicate the number of times the unit is partitioned and/or the degree to which the unit is partitioned.

In a tree structure, it may be considered that the depth of a root node is the smallest, and the depth of a leaf node is the largest. The root node may be the highest (top) node. The leaf node may be a lowest node.

A single unit may be hierarchically partitioned into multiple sub-units while having depth information based on a tree structure. In other words, the unit and sub-units, generated by partitioning the unit, may correspond to a node and child nodes of the node, respectively. Each of the partitioned sub-units may have a unit depth. Since the depth indicates the number of times the unit is partitioned and/or the degree to which the unit is partitioned, the partition information of the sub-units may include information about the sizes of the sub-units.

In a tree structure, the top node may correspond to the initial node before partitioning. The top node may be referred to as a "root node". Further, the root node may have a minimum depth value. Here, the top node may have a depth of level '0'.

A node having a depth of level '1' may denote a unit generated when the initial unit is partitioned once. A node having a depth of level '2' may denote a unit generated when the initial unit is partitioned twice.

A leaf node having a depth of level 'n' may denote a unit generated when the initial unit has been partitioned n times.

The leaf node may be a bottom node, which cannot be partitioned any further. The depth of the leaf node may be the maximum level. For example, a predefined value for the maximum level may be 3.

A QT depth may denote a depth for a quad-partitioning. A BT depth may denote a depth for a binary-partitioning. A TT depth may denote a depth for a ternary-partitioning.

Sample: A sample may be a base unit constituting a block. A sample may be represented by values from 0 to $2^{Bd}-1$ depending on the bit depth (Bd).

A sample may be a pixel or a pixel value.

Hereinafter, the terms "pixel" and "sample" may be used to have the same meaning, and may be used interchangeably with each other.

A Coding Tree Unit (CTU): A CTU may be composed of a single luma component (Y) coding tree block and two chroma component (Cb, Cr) coding tree blocks related to the luma component coding tree block. Further, a CTU may mean information including the above blocks and a syntax element for each of the blocks.

Each coding tree unit (CTU) may be partitioned using one or more partitioning methods, such as a quad tree (QT), a binary tree (BT), and a ternary tree (TT) so as to configure sub-units, such as a coding unit, a prediction unit, and a transform unit. A quad tree may mean a quarternary tree. Further, each coding tree unit may be partitioned using a multitype tree (MTT) using one or more partitioning methods.

"CTU" may be used as a term designating a pixel block, which is a processing unit in an image-decoding and encoding process, as in the case of partitioning of an input image.

Coding Tree Block (CTB): "CTB" may be used as a term designating any one of a Y coding tree block, a Cb coding tree block, and a Cr coding tree block.

Neighbor block: A neighbor block (or neighboring block) may mean a block adjacent to a target block. A neighbor block may mean a reconstructed neighbor block.

Hereinafter, the terms "neighbor block" and "adjacent block" may be used to have the same meaning and may be used interchangeably with each other.

A neighbor block may mean a reconstructed neighbor block.

Spatial neighbor block: A spatial neighbor block may a block spatially adjacent to a target block. A neighbor block may include a spatial neighbor block.

The target block and the spatial neighbor block may be included in a target picture.

The spatial neighbor block may mean a block, the boundary of which is in contact with the target block, or a block located within a predetermined distance from the target block.

The spatial neighbor block may mean a block adjacent to the vertex of the target block. Here, the block adjacent to the vertex of the target block may mean a block vertically adjacent to a neighbor block which is horizontally adjacent to the target block or a block horizontally adjacent to a neighbor block which is vertically adjacent to the target block.

Temporal neighbor block: A temporal neighbor block may be a block temporally adjacent to a target block. A neighbor block may include a temporal neighbor block.

The temporal neighbor block may include a co-located block (col block).

The col block may be a block in a previously reconstructed co-located picture (col picture). The location of the col block in the col-picture may correspond to the location of the target block in a target picture. Alternatively, the location of the col block in the col-picture may be equal to the location of the target block in the target picture. The col picture may be a picture included in a reference picture list.

The temporal neighbor block may be a block temporally adjacent to a spatial neighbor block of a target block.

Prediction mode: The prediction mode may be information indicating the mode in which encoding and/or decoding are performed for intra prediction, or the mode in which encoding and/or decoding are performed for inter prediction.

Prediction unit: A prediction unit may be a base unit for prediction, such as inter prediction, intra prediction, inter compensation, intra compensation, and motion compensation.

A single prediction unit may be divided into multiple partitions having smaller sizes or sub-prediction units. The multiple partitions may also be base units in the performance of prediction or compensation. The partitions generated by dividing the prediction unit may also be prediction units.

Prediction unit partition: A prediction unit partition may be the shape into which a prediction unit is divided.

Reconstructed neighbor unit: A reconstructed neighbor unit may be a unit which has already been decoded and reconstructed neighboring a target unit.

A reconstructed neighbor unit may be a unit that is spatially adjacent to the target unit or that is temporally adjacent to the target unit.

A reconstructed spatial neighbor unit may be a unit which is included in a target picture and which has already been reconstructed through encoding and/or decoding.

A reconstructed temporal neighbor unit may be a unit which is included in a reference image and which has already been reconstructed through encoding and/or decoding. The location of the reconstructed temporal neighbor unit in the reference image may be identical to that of the target unit in the target picture, or may correspond to the location of the target unit in the target picture. Also, a reconstructed temporal neighbor unit may be a block neighboring the corresponding block in a reference image. Here, the location of the corresponding block in the reference image may correspond to the location of the target block in the target image. Here, the fact that the locations of blocks correspond to each other may mean that the locations of the blocks are identical to each other, may mean that one block is included in another block, or may mean that one block occupies a specific location in another block.

Sub-picture: a picture may be divided into one or more sub-pictures. A sub-picture may be composed of one or more tile rows and one or more tile columns.

A sub-picture may be a region having a square or rectangular (i.e., a non-square rectangular) shape in a picture. Further, a sub-picture may include one or more CTUs.

A single sub-picture may include one or more tiles, one or more bricks, and/or one or more slices.

Tile: A tile may be a region having a square or rectangular (i.e., a non-square rectangular) shape in a picture.

A tile may include one or more CTUs.

A tile may be partitioned into one or more bricks.

Brick: A brick may denote one or more CTU rows in a tile.

A tile may be partitioned into one or more bricks. Each brick may include one or more CTU rows.

A tile that is not partitioned into two parts may also denote a brick.

Slice: A slice may include one or more tiles in a picture. Alternatively, a slice may include one or more bricks in a tile.

Parameter set: A parameter set may correspond to header information in the internal structure of a bitstream.

A parameter set may include at least one of a video parameter set (VPS), a sequence parameter set (SPS), a picture parameter set (PPS), an adaptation parameter set (APS), a decoding parameter set (DPS), etc.

Information signaled through each parameter set may be applied to pictures which refer to the corresponding parameter set. For example, information in a VPS may be applied to pictures which refer to the VPS. Information in an SPS may be applied to pictures which refer to the SPS. Information in a PPS may be applied to pictures which refer to the PPS.

Each parameter set may refer to a higher parameter set. For example, a PPS may refer to an SPS. An SPS may refer to a VPS.

Further, a parameter set may include a tile group, slice header information, and tile header information. The tile group may be a group including multiple tiles. Also, the meaning of "tile group" may be identical to that of "slice".

An adaptation parameter set may be a parameter set that can be referred to by different pictures, sub-pictures, slices, tile groups, tiles, or bricks and then be shared thereamong. Also, sub-pictures, slices, tile groups, tiles, or bricks in a picture may use pieces of information contained in different adaptation parameter sets by referring to the different adaptation parameter sets.

Further, for the adaptation parameter sets, sub-pictures, slices, tile groups, tiles, or bricks in a picture may refer to different adaptation parameter sets by exploiting the identifiers of different adaptation parameter sets.

Furthermore, slices, tile groups, tiles, or bricks in a sub-picture may refer to different adaptation parameter sets by exploiting the identifiers of different adaptation parameter sets.

Furthermore, tiles or bricks in a slice may refer to different adaptation parameter sets by exploiting the identifiers of different adaptation parameter sets.

Furthermore, bricks in a tile may refer to different adaptation parameter sets by exploiting the identifiers of different adaptation parameter sets.

Information about the identifier of an adaptation parameter set may be included in the parameter set or header of a sub-picture, and the adaptation parameter set corresponding to the included adaptation parameter set identifier may be used in the sub-picture.

Information about the identifier of an adaptation parameter set may be included in the parameter set or header of a tile, and the adaptation parameter set corresponding to the included adaptation parameter set identifier may be used in the tile.

Information about the identifier of an adaptation parameter set may be included in the header of a brick, and the adaptation parameter set corresponding to the included adaptation parameter set identifier may be used in the brick.

Rate-distortion optimization: An encoding apparatus may use rate-distortion optimization so as to provide high coding efficiency by utilizing combinations of the size of a coding unit (CU), a prediction mode, the size of a prediction unit (PU), motion information, and the size of a transform unit (TU).

A rate-distortion optimization scheme may calculate rate-distortion costs of respective combinations so as to select an optimal combination from among the combinations. The rate-distortion costs may be calculated using the equation "$D+\lambda*R$". Generally, a combination enabling the rate-distortion cost to be minimized may be selected as the optimal combination in the rate-distortion optimization scheme.

D may denote distortion. D may be the mean of squares of differences (i.e. mean square error) between original transform coefficients and reconstructed transform coefficients in a transform unit.

R may denote the rate, which may denote a bit rate using related-context information.

$\lambda$ denotes a Lagrangian multiplier. R may include not only coding parameter information, such as a prediction mode, motion information, and a coded block flag, but also bits generated due to the encoding of transform coefficients.

An encoding apparatus may perform procedures, such as inter prediction and/or intra prediction, transform, quantization, entropy encoding, inverse quantization (dequantization), and/or inverse transform so as to calculate precise D and R. These procedures may greatly increase the complexity of the encoding apparatus.

Bitstream: A bitstream may denote a stream of bits including encoded image information.

Parameter set: A parameter set may correspond to header information in the internal structure of a bitstream.

Parsing: Parsing may be the decision on the value of a syntax element, made by performing entropy decoding on a bitstream. Alternatively, the term "parsing" may mean such entropy decoding itself.

Symbol: A symbol may be at least one of the syntax element, the coding parameter, and the transform coefficient of an encoding target unit and/or a decoding target unit. Further, a symbol may be the target of entropy encoding or the result of entropy decoding.

Reference picture: A reference picture may be an image referred to by a unit so as to perform inter prediction or motion compensation. Alternatively, a reference picture may be an image including a reference unit referred to by a target unit so as to perform inter prediction or motion compensation.

Hereinafter, the terms "reference picture" and "reference image" may be used to have the same meaning, and may be used interchangeably with each other.

Reference picture list: A reference picture list may be a list including one or more reference images used for inter prediction or motion compensation.

The types of a reference picture list may include List Combined (LC), List 0 (L0), List 1 (L1), List 2 (L2), List 3 (L3), etc.

For inter prediction, one or more reference picture lists may be used.

Inter prediction indicator: An inter prediction indicator may indicate the inter prediction direction for a target unit. Inter prediction may be one of unidirectional prediction and bidirectional prediction. Alternatively, the inter prediction indicator may denote the number of reference pictures used to generate a prediction unit of a target unit. Alternatively, the inter prediction indicator may denote the number of prediction blocks used for inter prediction or motion compensation of a target unit.

Prediction list utilization flag: A prediction list utilization flag may indicate whether a prediction unit is generated using at least one reference picture in a specific reference picture list.

An inter prediction indicator may be derived using the prediction list utilization flag. In contrast, the prediction list utilization flag may be derived using the inter prediction indicator. For example, the case where the prediction list utilization flag indicates "0", which is a first value, may indicate that, for a target unit, a prediction block is not generated using a reference picture in a reference picture list. The case where the prediction list utilization flag indicates "1", which is a second value, may indicate that, for a target unit, a prediction unit is generated using the reference picture list.

Reference picture index: A reference picture index may be an index indicating a specific reference picture in a reference picture list.

Picture Order Count (POC): A POC value for a picture may denote an order in which the corresponding picture is displayed.

Motion vector (MV): A motion vector may be a 2D vector used for inter prediction or motion compensation. A motion vector may mean an offset between a target image and a reference image.

For example, a MV may be represented in a form such as $(mv_x, mv_y)$. $mv_x$ may indicate a horizontal component, and $mv_y$ may indicate a vertical component.

Search range: A search range may be a 2D area in which a search for a MV is performed during inter prediction. For example, the size of the search range may be M×N. M and N may be respective positive integers.

Motion vector candidate: A motion vector candidate may be a block that is a prediction candidate or the motion vector of the block that is a prediction candidate when a motion vector is predicted.

A motion vector candidate may be included in a motion vector candidate list.

Motion vector candidate list: A motion vector candidate list may be a list configured using one or more motion vector candidates.

Motion vector candidate index: A motion vector candidate index may be an indicator for indicating a motion vector candidate in the motion vector candidate list. Alternatively, a motion vector candidate index may be the index of a motion vector predictor.

Motion information: Motion information may be information including at least one of a reference picture list, a reference picture, a motion vector candidate, a motion vector candidate index, a merge candidate, and a merge index, as well as a motion vector, a reference picture index, and an inter prediction indicator.

Merge candidate list: A merge candidate list may be a list configured using one or more merge candidates.

Merge candidate: A merge candidate may be a spatial merge candidate, a temporal merge candidate, a combined merge candidate, a combined bi-prediction merge candidate, a candidate based on a history, a candidate based on an average of two candidates, a zero-merge candidate, etc. A merge candidate may include an inter prediction indicator, and may include motion information such as prediction type information, a reference picture index for each list, a motion vector, a prediction list utilization flag, and an inter prediction indicator.

Merge index: A merge index may be an indicator for indicating a merge candidate in a merge candidate list.

A merge index may indicate a reconstructed unit used to derive a merge candidate between a reconstructed unit spatially adjacent to a target unit and a reconstructed unit temporally adjacent to the target unit.

A merge index may indicate at least one of pieces of motion information of a merge candidate.

Transform unit: A transform unit may be the base unit of residual signal encoding and/or residual signal decoding, such as transform, inverse transform, quantization, dequantization, transform coefficient encoding, and transform coefficient decoding. A single transform unit may be partitioned into multiple sub-transform units having a smaller size. Here, a transform may include one or more of a primary transform and a secondary transform, and an inverse transform may include one or more of a primary inverse transform and a secondary inverse transform.

Scaling: Scaling may denote a procedure for multiplying a factor by a transform coefficient level.

As a result of scaling of the transform coefficient level, a transform coefficient may be generated. Scaling may also be referred to as "dequantization".

Quantization Parameter (QP): A quantization parameter may be a value used to generate a transform coefficient level for a transform coefficient in quantization. Alternatively, a quantization parameter may also be a value used to generate a transform coefficient by scaling the transform coefficient level in dequantization. Alternatively, a quantization parameter may be a value mapped to a quantization step size.

Delta quantization parameter: A delta quantization parameter may mean a difference value between a predicted quantization parameter and the quantization parameter of a target unit.

Scan: Scan may denote a method for aligning the order of coefficients in a unit, a block or a matrix. For example, a method for aligning a 2D array in the form of a one-dimensional (1D) array may be referred to as a "scan". Alternatively, a method for aligning a 1D array in the form of a 2D array may also be referred to as a "scan" or an "inverse scan".

Transform coefficient: A transform coefficient may be a coefficient value generated as an encoding apparatus performs a transform. Alternatively, the transform coefficient may be a coefficient value generated as a decoding apparatus performs at least one of entropy decoding and dequantization.

A quantized level or a quantized transform coefficient level generated by applying quantization to a transform coefficient or a residual signal may also be included in the meaning of the term "transform coefficient".

Quantized level: A quantized level may be a value generated as the encoding apparatus performs quantization on a transform coefficient or a residual signal. Alternatively, the quantized level may be a value that is the target of dequantization as the decoding apparatus performs dequantization.

A quantized transform coefficient level, which is the result of transform and quantization, may also be included in the meaning of a quantized level.

Non-zero transform coefficient: A non-zero transform coefficient may be a transform coefficient having a value other than 0 or a transform coefficient level having a value other than 0. Alternatively, a non-zero transform coefficient may be a transform coefficient, the magnitude of the value of which is not 0, or a transform coefficient level, the magnitude of the value of which is not 0.

Quantization matrix: A quantization matrix may be a matrix used in a quantization procedure or a dequantization procedure so as to improve the subjective image quality or objective image quality of an image. A quantization matrix may also be referred to as a "scaling list".

Quantization matrix coefficient: A quantization matrix coefficient may be each element in a quantization matrix. A quantization matrix coefficient may also be referred to as a "matrix coefficient".

Default matrix: A default matrix may be a quantization matrix predefined by the encoding apparatus and the decoding apparatus.

Non-default matrix: A non-default matrix may be a quantization matrix that is not predefined by the encoding apparatus and the decoding apparatus. The non-default matrix may mean a quantization matrix to be signaled from the encoding apparatus to the decoding apparatus by a user.

Most Probable Mode (MPM): An MPM may denote an intra prediction mode having a high probability of being used for intra prediction for a target block.

An encoding apparatus and a decoding apparatus may determine one or more MPMs based on coding parameters related to the target block and the attributes of entities related to the target block.

The encoding apparatus and the decoding apparatus may determine one or more MPMs based on the intra prediction mode of a reference block. The reference block may include multiple reference blocks. The multiple reference blocks may include spatial neighbor blocks adjacent to the left of the target block and spatial neighbor blocks adjacent to the top of the target block. In other words, depending on which intra prediction modes have been used for the reference blocks, one or more different MPMs may be determined.

The one or more MPMs may be determined in the same manner both in the encoding apparatus and in the decoding apparatus. That is, the encoding apparatus and the decoding apparatus may share the same MPM list including one or more MPMs.

MPM list: An MPM list may be a list including one or more MPMs. The number of the one or more MPMs in the MPM list may be defined in advance.

MPM indicator: An MPM indicator may indicate an MPM to be used for intra prediction for a target block among one or more MPMs in the MPM list. For example, the MPM indicator may be an index for the MPM list.

Since the MPM list is determined in the same manner both in the encoding apparatus and in the decoding apparatus, there may be no need to transmit the MPM list itself from the encoding apparatus to the decoding apparatus.

The MPM indicator may be signaled from the encoding apparatus to the decoding apparatus. As the MPM indicator is signaled, the decoding apparatus may determine the MPM to be used for intra prediction for the target block among the MPMs in the MPM list.

MPM use indicator: An MPM use indicator may indicate whether an MPM usage mode is to be used for prediction for a target block. The MPM usage mode may be a mode in which the MPM to be used for intra prediction for the target block is determined using the MPM list.

The MPM use indicator may be signaled from the encoding apparatus to the decoding apparatus.

Signaling: "signaling" may denote that information is transferred from an encoding apparatus to a decoding apparatus. Alternatively, "signaling" may mean information is included in in a bitstream or a recoding medium. Information signaled by an encoding apparatus may be used by a decoding apparatus.

The encoding apparatus may generate encoded information by performing encoding on information to be signaled. The encoded information may be transmitted from the encoding apparatus to the decoding apparatus. The decoding apparatus may obtain information by decoding the transmitted encoded information. Here, the encoding may be entropy encoding, and the decoding may be entropy decoding.

Statistic value: A variable, a coding parameter, a constant, etc. may have values that can be calculated. The statistic value may be a value generated by performing calculations (operations) on the values of specified targets. For example, the statistic value may indicate one or more of the average, weighted average, weighted sum, minimum value, maximum value, mode, median value, and interpolated value of the values of a specific variable, a specific coding parameter, a specific constant, or the like.

FIG. 1 is a block diagram illustrating the configuration of an embodiment of an encoding apparatus to which the present disclosure is applied.

An encoding apparatus 100 may be an encoder, a video encoding apparatus or an image encoding apparatus. A video may include one or more images (pictures). The encoding apparatus 100 may sequentially encode one or more images of the video.

Referring to FIG. 1, the encoding apparatus 100 includes an inter prediction unit 110, an intra prediction unit 120, a switch 115, a subtractor 125, a transform unit 130, a quantization unit 140, an entropy encoding unit 150, a dequantization (inverse quantization) unit 160, an inverse transform unit 170, an adder 175, a filter unit 180, and a reference picture buffer 190.

The encoding apparatus 10 may perform encoding on a target image using an intra mode and/or an inter mode. In other words, a prediction mode for a target block may be one of an intra mode and an inter mode.

Hereinafter, the terms "intra mode", "intra prediction mode", "intra-picture mode" and "intra-picture prediction mode" may be used to have the same meaning, and may be used interchangeably with each other.

Hereinafter, the terms "inter mode", "inter prediction mode", "inter-picture mode" and "inter-picture prediction mode" may be used to have the same meaning, and may be used interchangeably with each other.

Hereinafter, the term "image" may indicate only part of an image, or may indicate a block. Also, the processing of an "image" may indicate sequential processing of multiple blocks.

Further, the encoding apparatus 100 may generate a bitstream, including encoded information, via encoding on the target image, and may output and store the generated bitstream. The generated bitstream may be stored in a computer-readable storage medium and may be streamed through a wired and/or wireless transmission medium.

When the intra mode is used as a prediction mode, the switch 115 may switch to the intra mode. When the inter mode is used as a prediction mode, the switch 115 may switch to the inter mode.

The encoding apparatus 100 may generate a prediction block of a target block. Further, after the prediction block has been generated, the encoding apparatus 100 may encode a residual block for the target block using a residual between the target block and the prediction block.

When the prediction mode is the intra mode, the intra prediction unit 120 may use pixels of previously encoded/decoded neighbor blocks adjacent to the target block as reference samples. The intra prediction unit 120 may perform spatial prediction on the target block using the reference samples, and may generate prediction samples for the target block via spatial prediction, the prediction samples may mean samples in the prediction block.

The inter prediction unit 110 may include a motion prediction unit and a motion compensation unit.

When the prediction mode is an inter mode, the motion prediction unit may search a reference image for the area most closely matching the target block in a motion prediction procedure, and may derive a motion vector for the target block and the found area based on the found area. Here, the motion-prediction unit may use a search range as a target area for searching.

The reference image may be stored in the reference picture buffer 190. More specifically, an encoded and/or decoded reference image may be stored in the reference picture buffer 190 when the encoding and/or decoding of the reference image have been processed.

Since a decoded picture is stored, the reference picture buffer 190 may be a Decoded Picture Buffer (DPB).

The motion compensation unit may generate a prediction block for the target block by performing motion compensation using a motion vector. Here, the motion vector may be a two-dimensional (2D) vector used for inter prediction. Further, the motion vector may indicate an offset between the target image and the reference image.

The motion prediction unit and the motion compensation unit may generate a prediction block by applying an interpolation filter to a partial area of a reference image when the motion vector has a value other than an integer. In order to perform inter prediction or motion compensation, it may be determined which one of a skip mode, a merge mode, an advanced motion vector prediction (AMVP) mode, and a current picture reference mode corresponds to a method for predicting the motion of a PU included in a CU, based on the CU, and compensating for the motion, and inter prediction or motion compensation may be performed depending on the mode.

The subtractor 125 may generate a residual block, which is the differential between the target block and the prediction block. A residual block may also be referred to as a "residual signal".

The residual signal may be the difference between an original signal and a prediction signal. Alternatively, the residual signal may be a signal generated by transforming or quantizing the difference between an original signal and a prediction signal or by transforming and quantizing the difference. A residual block may be a residual signal for a block unit.

The transform unit 130 may generate a transform coefficient by transforming the residual block, and may output the generated transform coefficient. Here, the transform coefficient may be a coefficient value generated by transforming the residual block.

The transform unit 130 may use one of multiple predefined transform methods when performing a transform.

The multiple predefined transform methods may include a Discrete Cosine Transform (DCT), a Discrete Sine Transform (DST), a Karhunen-Loeve Transform (KLT), etc.

The transform method used to transform a residual block may be determined depending on at least one of coding parameters for a target block and/or a neighbor block. For example, the transform method may be determined based on at least one of an inter prediction mode for a PU, an intra prediction mode for a PU, the size of a TU, and the shape of a TU. Alternatively, transformation information indicating the transform method may be signaled from the encoding apparatus 100 to the decoding apparatus 200.

When a transform skip mode is used, the transform unit 130 may omit transforming the residual block.

By applying quantization to the transform coefficient, a quantized transform coefficient level or a quantized level may be generated. Hereinafter, in the embodiments, each of the quantized transform coefficient level and the quantized level may also be referred to as a 'transform coefficient'.

The quantization unit 140 may generate a quantized transform coefficient level (i.e., a quantized level or a quantized coefficient) by quantizing the transform coefficient depending on quantization parameters. The quantization unit 140 may output the quantized transform coefficient level that is generated. In this case, the quantization unit 140 may quantize the transform coefficient using a quantization matrix.

The entropy encoding unit 150 may generate a bitstream by performing probability distribution-based entropy encoding based on values, calculated by the quantization unit 140, and/or coding parameter values, calculated in the encoding procedure. The entropy encoding unit 150 may output the generated bitstream.

The entropy encoding unit 150 may perform entropy encoding on information about the pixels of the image and information required to decode the image. For example, the information required to decode the image may include syntax elements or the like.

When entropy encoding is applied, fewer bits may be assigned to more frequently occurring symbols, and more bits may be assigned to rarely occurring symbols. As symbols are represented by means of this assignment, the size of a bit string for target symbols to be encoded may be reduced. Therefore, the compression performance of video encoding may be improved through entropy encoding.

Further, for entropy encoding, the entropy encoding unit 150 may use a coding method such as exponential Golomb, Context-Adaptive Variable Length Coding (CAVLC), or Context-Adaptive Binary Arithmetic Coding (CABAC). For example, the entropy encoding unit 150 may perform entropy encoding using a Variable Length Coding/Code (VLC) table. For example, the entropy encoding unit 150 may derive a binarization method for a target symbol. Further, the entropy encoding unit 150 may derive a probability model for a target symbol/bin. The entropy encoding unit 150 may perform arithmetic coding using the derived binarization method, a probability model, and a context model.

The entropy encoding unit 150 may transform the coefficient of the form of a 2D block into the form of a 1D vector through a transform coefficient scanning method so as to encode a quantized transform coefficient level.

The coding parameters may be information required for encoding and/or decoding. The coding parameters may include information encoded by the encoding apparatus 100 and transferred from the encoding apparatus 100 to a decoding apparatus, and may also include information that may be derived in the encoding or decoding procedure. For example, information transferred to the decoding apparatus may include syntax elements.

The coding parameters may include not only information (or a flag or an index), such as a syntax element, which is encoded by the encoding apparatus and is signaled by the encoding apparatus to the decoding apparatus, but also information derived in an encoding or decoding process. Further, the coding parameters may include information required so as to encode or decode images. For example, the coding parameters may include at least one value, combinations or statistics of a size of a unit/block, a shape/form of a unit/block, a depth of a unit/block, partition information of a unit/block, a partition structure of a unit/block, information indicating whether a unit/block is partitioned in a quad-tree structure, information indicating whether a unit/block is partitioned in a binary tree structure, a partitioning direction of a binary tree structure (horizontal direction or vertical direction), a partitioning form of a binary tree structure (symmetrical partitioning or asymmetrical partitioning), information indicating whether a unit/block is partitioned in a ternary tree structure, a partitioning direction of a ternary tree structure (horizontal direction or vertical direction), a partitioning form of a ternary tree structure (symmetrical partitioning or asymmetrical partitioning, etc.), information indicating whether a unit/block is partitioned in a multi-type tree structure, a combination and a direction (horizontal direction or vertical direction, etc.) of a partitioning of the multi-type tree structure, a partitioning form of a partitioning of a multi-type tree structure (symmetrical partitioning or asymmetrical partitioning, etc.), a partitioning tree (a binary tree or a ternary tree) of the multi-type tree form, a type of a prediction (intra prediction or inter prediction), an intra prediction mode/direction, an intra luma prediction mode/direction, an intra chroma prediction mode/direction, an intra partitioning information, an inter partitioning information, a coding block partitioning flag, a prediction block partitioning flag, a transform block partitioning flag, a reference sample filtering method, a reference sample filter tap, a reference sample filter coefficient, a prediction block filtering method, a prediction block filter tap, a prediction block filter coefficient, a prediction block boundary filtering method, a prediction block boundary filter tap, a prediction block boundary filter coefficient, an inter prediction mode, motion information, a motion vector, a motion vector difference, a reference picture index, an inter prediction direction, an inter prediction indicator, a prediction list utilization flag, a reference picture list, a reference image, a POC, a motion vector predictor, a motion vector prediction index, a motion vector prediction candidate, a motion vector candidate list, information indicating whether a merge mode is used, a merge index, a merge candidate, a merge candidate list, information indicating whether a skip mode is used, a type of an interpolation filter, a tap of an interpolation filter, a filter coefficient of an interpolation filter, a magnitude of a motion vector, accuracy of motion vector representation, a transform type, a transform size, information indicating whether a first transform is used, information indicating whether an additional (secondary) transform is used, first transform selection information (or a first transform index), secondary transform selection information (or a secondary transform index), information indicating a presence or absence of a residual signal, a coded block pattern, a coded block flag, a quantization parameter, a residual quantization parameter, a quantization matrix, information about an intra-loop filter, information indicating whether an intra-loop filter is applied, a coefficient of an intra-loop filter, a tap of an intra-loop filter, a shape/form of an intra-loop filter, information indicating whether a deblocking filter is applied, a coefficient of a deblocking filter, a tap of a deblocking filter, deblocking filter strength, a shape/form of a deblocking filter, information indicating whether an adaptive sample offset is applied, a value of an adaptive sample offset, a category of an adaptive sample offset, a type of an adaptive sample offset, information indicating whether an adaptive in-loop filter is applied, a coefficient of an adaptive in-loop filter, a tap of an adaptive in-loop filter, a shape/form of an adaptive in-loop filter, a binarization/inverse binarization method, a context model, a context model decision method, a context model update method, information indicating whether a regular mode is performed, information whether a bypass mode is performed, a significant coefficient flag, a last significant coefficient flag, a coding flag for a coefficient group, a position of a last significant coefficient, information indicating whether a value of a coefficient is greater than 1, information indicating whether a value of a coefficient is greater than 2, information indicating whether a value of a coefficient is greater than 3, a remaining coefficient value information, a sign information, a reconstructed luma sample, a reconstructed chroma sample, a context bin, a bypass bin, a residual luma sample, a residual chroma sample, a transform coefficient, a luma transform coefficient, a chroma transform coefficient, a quantized level, a luma quantized level, a chroma quantized level, a transform coefficient level, a transform coefficient level scanning method, a size of a motion vector search region on a side of a decoding apparatus, a shape/form of a motion vector search region on a side of a decoding apparatus, the number of a motion vector search on a side of a decoding apparatus, a size of a CTU, a minimum block size, a maximum block size, a maximum block depth, a minimum block depth, an image display/output order, slice identification information, a slice type, slice partition information, tile group identification information, a tile group type, a tile group partitioning information, tile identification information, a tile type, tile partitioning information, a picture type, bit depth, input sample bit depth, reconstructed sample bit depth, residual sample bit depth, transform coefficient bit depth, quantized level bit depth, information about a luma signal, information about a chroma signal, a color space of a target block, and a color space of a residual block. Further, the above-described coding parameter-related information may also be included in the coding parameter. Information used to calculate and/or derive the above-described coding parameter may also be included in the coding parameter. Information calculated or derived using the above-described coding parameter may also be included in the coding parameter.

The prediction scheme may denote one prediction mode of an intra prediction mode and an inter prediction mode.

The first transform selection information may indicate a first transform which is applied to a target block.

The second transform selection information may indicate a second transform which is applied to a target block.

The residual signal may denote the difference between the original signal and a prediction signal. Alternatively, the residual signal may be a signal generated by transforming the difference between the original signal and the prediction signal. Alternatively, the residual signal may be a signal generated by transforming and quantizing the difference between the original signal and the prediction signal. A residual block may be the residual signal for a block.

Here, signaling information may mean that the encoding apparatus 100 includes an entropy-encoded information, generated by performing entropy encoding on a flag or an index, in a bitstream, and that the decoding apparatus 200 acquires information by performing entropy decoding on the entropy-encoded information, extracted from the bitstream. Here, the information may comprise a flag, an index, etc.

A bitstream may include information based on a specific syntax. The encoding apparatus 100 may generate a bitstream including information depending on a specific syntax. The decoding apparatus 200 may acquire information from the bitstream depending on a specific syntax.

Since the encoding apparatus 100 performs encoding via inter prediction, the encoded target image may be used as a reference image for additional image(s) to be subsequently processed. Therefore, the encoding apparatus 100 may reconstruct or decode the encoded target image and store the reconstructed or decoded image as a reference image in the reference picture buffer 190. For decoding, dequantization and inverse transform on the encoded target image may be processed.

The quantized level may be inversely quantized by the dequantization unit 160, and may be inversely transformed by the inverse transform unit 170. The dequantization unit 160 may generate an inversely quantized coefficient by performing inverse transform for the quantized level. The inverse transform unit 170 may generate an inversely quantized and inversely transformed coefficient by performing inverse transform for the inversely quantized coefficient.

The inversely quantized and inversely transformed coefficient may be added to the prediction block by the adder 175. The inversely quantized and inversely transformed coefficient and the prediction block are added, and then a reconstructed block may be generated. Here, the inversely quantized and/or inversely transformed coefficient may denote a coefficient on which one or more of dequantization and inverse transform are performed, and may also denote a reconstructed residual block. Here, the reconstructed block may mean a recovered block or a decoded block.

The reconstructed block may be subjected to filtering through the filter unit 180. The filter unit 180 may apply one or more of a deblocking filter, a Sample Adaptive Offset (SAO) filter, an Adaptive Loop Filter (ALF), and a Non Local Filter (NLF) to a reconstructed sample, the reconstructed block or a reconstructed picture. The filter unit 180 may also be referred to as an "in-loop filter".

The deblocking filter may eliminate block distortion occurring at the boundaries between blocks. In order to determine whether to apply the deblocking filter, the number of columns or rows which are included in a block and which include pixel(s) based on which it is determined whether to apply the deblocking filter to a target block may be decided on.

When the deblocking filter is applied to the target block, the applied filter may differ depending on the strength of the required deblocking filtering. In other words, among different filters, a filter decided on in consideration of the strength of deblocking filtering may be applied to the target block. When a deblocking filter is applied to a target block, a filter corresponding to any one of a strong filter and a weak filter may be applied to the target block depending on the strength of required deblocking filtering.

Also, when vertical filtering and horizontal filtering are performed on the target block, the horizontal filtering and the vertical filtering may be processed in parallel.

The SAO may add a suitable offset to the values of pixels to compensate for coding error. The SAO may perform, for the image to which deblocking is applied, correction that uses an offset in the difference between an original image and the image to which deblocking is applied, on a pixel basis. To perform an offset correction for an image, a method for dividing the pixels included in the image into a certain number of regions, determining a region to which an offset is to be applied, among the divided regions, and applying an offset to the determined region may be used, and a method for applying an offset in consideration of edge information of each pixel may also be used.

The ALF may perform filtering based on a value obtained by comparing a reconstructed image with an original image. After pixels included in an image have been divided into a predetermined number of groups, filters to be applied to each group may be determined, and filtering may be differentially performed for respective groups, information related to whether to apply an adaptive loop filter may be signaled for each CU. Such information may be signaled for a luma signal. The shapes and filter coefficients of ALFs to be applied to respective blocks may differ for respective blocks. Alternatively, regardless of the features of a block, an ALF having a fixed form may be applied to the block.

A non-local filter may perform filtering based on reconstructed blocks, similar to a target block. A region similar to the target block may be selected from a reconstructed picture, and filtering of the target block may be performed using the statistical properties of the selected similar region.

Information about whether to apply a non-local filter may be signaled for a Coding Unit (CU). Also, the shapes and filter coefficients of the non-local filter to be applied to blocks may differ depending on the blocks.

The reconstructed block or the reconstructed image subjected to filtering through the filter unit 180 may be stored in the reference picture buffer 190 as a reference picture. The reconstructed block subjected to filtering through the filter unit 180 may be a part of a reference picture. In other words, the reference picture may be a reconstructed picture composed of reconstructed blocks subjected to filtering through the filter unit 180. The stored reference picture may be subsequently used for inter prediction or a motion compensation.

Figure 2:
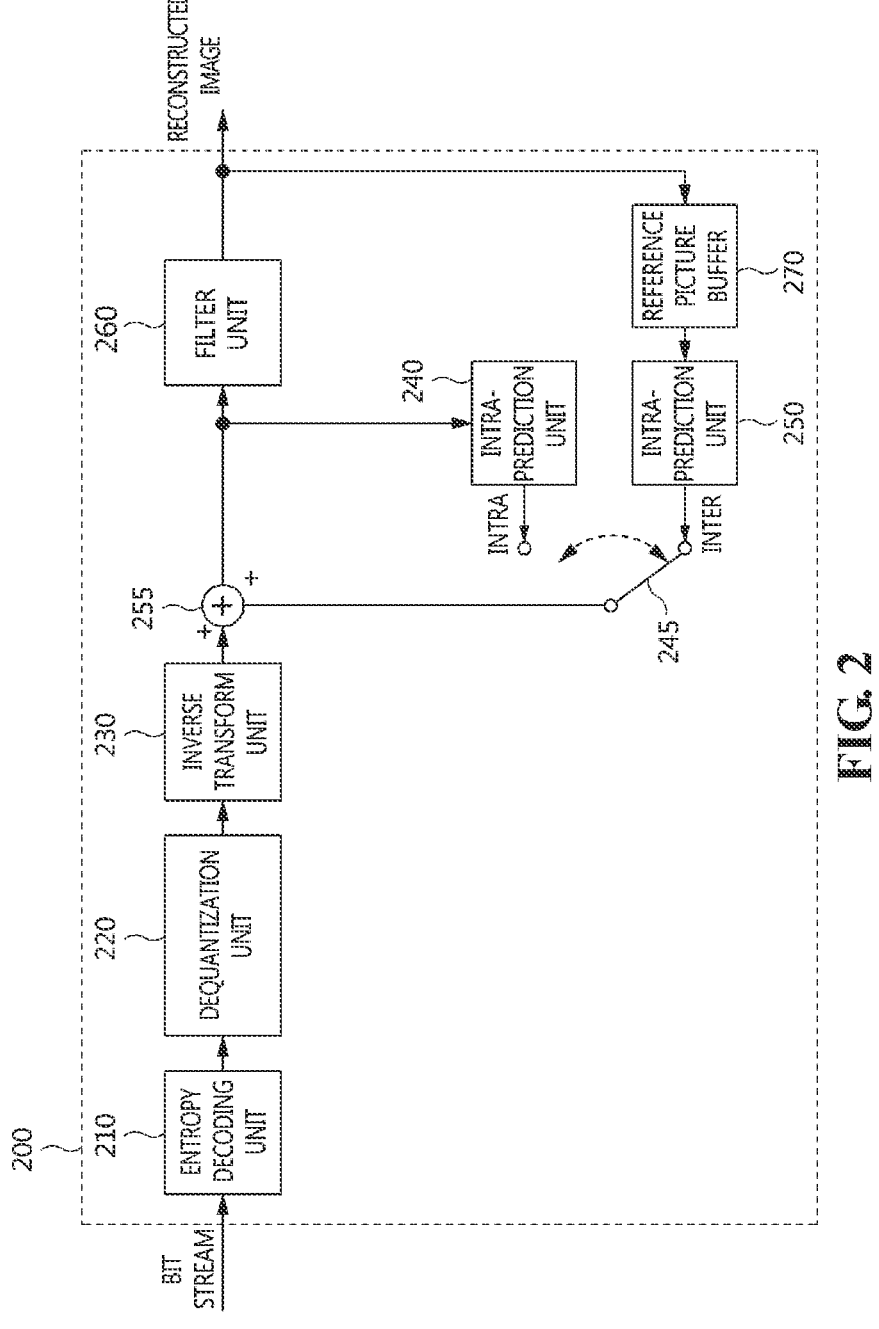
FIG. 2 is a block diagram illustrating the configuration of an embodiment of a decoding apparatus to which the present disclosure is applied.

FIG. 2 is a block diagram illustrating the configuration of an embodiment of a decoding apparatus to which the present disclosure is applied.

A decoding apparatus 200 may be a decoder, a video decoding apparatus or an image decoding apparatus.

Referring to FIG. 2, the decoding apparatus 200 may include an entropy decoding unit 210, a dequantization (inverse quantization) unit 220, an inverse transform unit 230, an intra prediction unit 240, an inter prediction unit 250, a switch 245 an adder 255, a filter unit 260, and a reference picture buffer 270.

The decoding apparatus 200 may receive a bitstream output from the encoding apparatus 100. The decoding apparatus 200 may receive a bitstream stored in a computer-readable storage medium, and may receive a bitstream that is streamed through a wired/wireless transmission medium.

The decoding apparatus 200 may perform decoding on the bitstream in an intra mode and/or an inter mode. Further, the decoding apparatus 200 may generate a reconstructed image or a decoded image via decoding, and may output the reconstructed image or decoded image.

For example, switching to an intra mode or an inter mode based on the prediction mode used for decoding may be performed by the switch 245. When the prediction mode used for decoding is an intra mode, the switch 245 may be operated to switch to the intra mode. When the prediction mode used for decoding is an inter mode, the switch 245 may be operated to switch to the inter mode.

The decoding apparatus 200 may acquire a reconstructed residual block by decoding the input bitstream, and may generate a prediction block. When the reconstructed residual block and the prediction block are acquired, the decoding apparatus 200 may generate a reconstructed block, which is the target to be decoded, by adding the reconstructed residual block and the prediction block.

The entropy decoding unit 210 may generate symbols by performing entropy decoding on the bitstream based on the probability distribution of a bitstream. The generated symbols may include symbols in a form of a quantized transform coefficient level (i.e., a quantized level or a quantized coefficient). Here, the entropy decoding method may be similar to the above-described entropy encoding method. That is, the entropy decoding method may be the reverse procedure of the above-described entropy encoding method.

The entropy decoding unit 210 may change a coefficient having a one-dimensional (1D) vector form to a 2D block shape through a transform coefficient scanning method in order to decode a quantized transform coefficient level.

For example, the coefficients of the block may be changed to 2D block shapes by scanning the block coefficients using up-right diagonal scanning. Alternatively, which one of up-right diagonal scanning, vertical scanning, and horizontal scanning is to be used may be determined depending on the size and/or the intra prediction mode of the corresponding block.

The quantized coefficient may be inversely quantized by the dequantization unit 220. The dequantization unit 220 may generate an inversely quantized coefficient by performing dequantization on the quantized coefficient. Further, the inversely quantized coefficient may be inversely transformed by the inverse transform unit 230. The inverse transform unit 230 may generate a reconstructed residual block by performing an inverse transform on the inversely quantized coefficient. As a result of performing dequantization and the inverse transform on the quantized coefficient, the reconstructed residual block may be generated. Here, the dequantization unit 220 may apply a quantization matrix to the quantized coefficient when generating the reconstructed residual block.

When the intra mode is used, the intra prediction unit 240 may generate a prediction block by performing spatial prediction that uses the pixel values of previously decoded neighbor blocks adjacent to a target block for the target block.

The inter prediction unit 250 may include a motion compensation unit. Alternatively, the inter prediction unit 250 may be designated as a "motion compensation unit".

When the inter mode is used, the motion compensation unit may generate a prediction block by performing motion compensation that uses a motion vector and a reference image stored in the reference picture buffer 270 for the target block.

The motion compensation unit may apply an interpolation filter to a partial area of the reference image when the motion vector has a value other than an integer, and may generate a prediction block using the reference image to which the interpolation filter is applied. In order to perform motion compensation, the motion compensation unit may determine which one of a skip mode, a merge mode, an Advanced Motion Vector Prediction (AMVP) mode, and a current picture reference mode corresponds to the motion compensation method used for a PU included in a CU, based on the CU, and may perform motion compensation depending on the determined mode.

The reconstructed residual block and the prediction block may be added to each other by the adder 255. The adder 255 may generate a reconstructed block by adding the reconstructed residual block to the prediction block.

The reconstructed block may be subjected to filtering through the filter unit 260. The filter unit 260 may apply at least one of a deblocking filter, an SAO filter, an ALF, and a NLF to the reconstructed block or the reconstructed image. The reconstructed image may be a picture including the reconstructed block.

The filter unit may output the reconstructed image.

The reconstructed image and/or the reconstructed block subjected to filtering through the filter unit 260 may be stored as a reference picture in the reference picture buffer 270. The reconstructed block subjected to filtering through the filter unit 260 may be a part of the reference picture. In other words, the reference picture may be an image composed of reconstructed blocks subjected to filtering through the filter unit 260. The stored reference picture may be subsequently used for inter prediction or a motion compensation.

Figure 3:
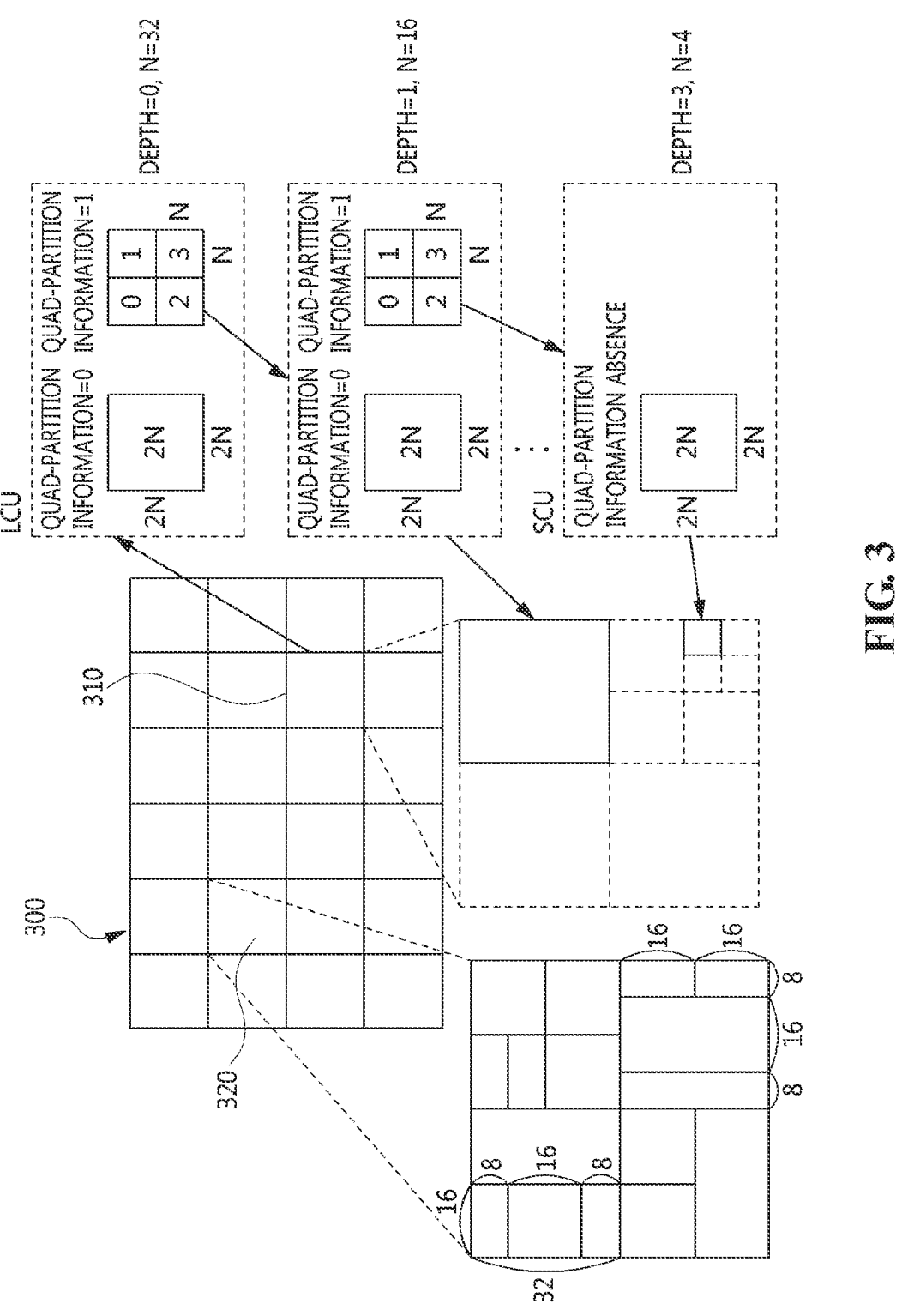
FIG. 3 is a diagram schematically illustrating the partition structure of an image when the image is encoded and decoded.

FIG. 3 is a diagram schematically illustrating the partition structure of an image when the image is encoded and decoded.

FIG. 3 may schematically illustrate an example in which a single unit is partitioned into multiple sub-units.

In order to efficiently partition the image, a Coding Unit (CU) may be used in encoding and decoding. The term "unit" may be used to collectively designate 1) a block including image samples and 2) a syntax element. For example, the "partitioning of a unit" may mean the "partitioning of a block corresponding to a unit".

A CU may be used as a base unit for image encoding/decoding. A CU may be used as a unit to which one mode selected from an intra mode and an inter mode in image encoding/decoding is applied. In other words, in image encoding/decoding, which one of an intra mode and an inter mode is to be applied to each CU may be determined.

Further, a CU may be a base unit in prediction, transform, quantization, inverse transform, dequantization, and encoding/decoding of transform coefficients.

Referring to FIG. 3, an image 200 may be sequentially partitioned into units corresponding to a Largest Coding Unit (LCU), and a partition structure may be determined for each LCU. Here, the LCU may be used to have the same meaning as a Coding Tree Unit (CTU).

The partitioning of a unit may mean the partitioning of a block corresponding to the unit. Block partition information may include depth information about the depth of a unit. The depth information may indicate the number of times the unit is partitioned and/or the degree to which the unit is partitioned. A single unit may be hierarchically partitioned into a plurality of sub-units while having depth information based on a tree structure.

Each of partitioned sub-units may have depth information. The depth information may be information indicating the size of a CU. The depth information may be stored for each CU.

Each CU may have depth information. When the CU is partitioned, CUs resulting from partitioning may have a depth increased from the depth of the partitioned CU by 1.

The partition structure may mean the distribution of Coding Units (CUs) to efficiently encode the image in an LCU 310. Such a distribution may be determined depending on whether a single CU is to be partitioned into multiple CUs. The number of CUs generated by partitioning may be a positive integer of 2 or more, including 2, 3, 4, 8, 16, etc.

The horizontal size and the vertical size of each of CUs generated by the partitioning may be less than the horizontal size and the vertical size of a CU before being partitioned, depending on the number of CUs generated by partitioning. For example, the horizontal size and the vertical size of each of CUs generated by the partitioning may be half of the horizontal size and the vertical size of a CU before being partitioned.

Each partitioned CU may be recursively partitioned into four CUs in the same way. Via the recursive partitioning, at least one of the horizontal size and the vertical size of each partitioned CU may be reduced compared to at least one of the horizontal size and the vertical size of the CU before being partitioned.

The partitioning of a CU may be recursively performed up to a predefined depth or a predefined size.

For example, the depth of a CU may have a value ranging from 0 to 3. The size of the CU may range from a size of 64×64 to a size of 8×8 depending on the depth of the CU.

For example, the depth of an LCU 310 may be 0, and the depth of a Smallest Coding Unit (SCU) may be a predefined maximum depth. Here, as described above, the LCU may be the CU having the maximum coding unit size, and the SCU may be the CU having the minimum coding unit size.

Partitioning may start at the LCU 310, and the depth of a CU may be increased by 1 whenever the horizontal and/or vertical sizes of the CU are reduced by partitioning.

For example, for respective depths, a CU that is not partitioned may have a size of 2N×2N. Further, in the case of a CU that is partitioned, a CU having a size of 2N×2N may be partitioned into four CUs, each having a size of N×N. The value of N may be halved whenever the depth is increased by 1.

Referring to FIG. 3, an LCU having a depth of 0 may have 64×64 pixels or 64×64 blocks. 0 may be a minimum depth. An SCU having a depth of 3 may have 8×8 pixels or 8×8 blocks. 3 may be a maximum depth. Here, a CU having 64×64 blocks, which is the LCU, may be represented by a depth of 0. A CU having 32×32 blocks may be represented by a depth of 1. A CU having 16×16 blocks may be represented by a depth of 2. A CU having 8×8 blocks, which is the SCU, may be represented by a depth of 3.

Information about whether the corresponding CU is partitioned may be represented by the partition information of the CU. The partition information may be 1-bit information. All CUs except the SCU may include partition information. For example, the value of the partition information of a CU that is not partitioned may be a first value. The value of the partition information of a CU that is partitioned may be a second value. When the partition information indicates whether a CU is partitioned or not, the first value may be "O" and the second value may be "1".

For example, when a single CU is partitioned into four CUs, the horizontal size and vertical size of each of four CUs generated by partitioning may be half the horizontal size and the vertical size of the CU before being partitioned. When a CU having a 32×32 size is partitioned into four CUs, the size of each of four partitioned CUs may be 16×16. When a single CU is partitioned into four CUs, it may be considered that the CU has been partitioned in a quad-tree structure. In other words, it may be considered that a quad-tree partition has been applied to a CU.

For example, when a single CU is partitioned into two CUs, the horizontal size or the vertical size of each of two CUs generated by partitioning may be half the horizontal size or the vertical size of the CU before being partitioned. When a CU having a 32×32 size is vertically partitioned into two CUs, the size of each of two partitioned CUs may be 16×32. When a CU having a 32×32 size is horizontally partitioned into two CUs, the size of each of two partitioned CUs may be 32×16. When a single CU is partitioned into two CUs, it may be considered that the CU has been partitioned in a binary-tree structure. In other words, it may be considered that a binary-tree partition has been applied to a CU.

For example, when a single CU is partitioned (or split) into three CUs, the original CU before being partitioned is partitioned so that the horizontal size or vertical size thereof is divided at a ratio of 1:2:1, thus enabling three sub-CUs to be generated. For example, when a CU having a 16×32 size is horizontally partitioned into three sub-CUs, the three sub-CUs resulting from the partitioning may have sizes of 16×8, 16×16, and 16×8, respectively, in a direction from the top to the bottom. For example, when a CU having a 32×32 size is vertically partitioned into three sub-CUs, the three sub-CUs resulting from the partitioning may have sizes of 8×32, 16×32, and 8×32, respectively, in a direction from the left to the right. When a single CU is partitioned into three CUs, it may be considered that the CU is partitioned in a ternary-tree form. In other words, it may be considered that a ternary-tree partition has been applied to the CU.

Both of quad-tree partitioning and binary-tree partitioning are applied to the LCU 310 of FIG. 3.

In the encoding apparatus 100, a Coding Tree Unit (CTU) having a size of 64×64 may be partitioned into multiple smaller CUs by a recursive quad-tree structure. A single CU may be partitioned into four CUs having the same size. Each CU may be recursively partitioned, and may have a quad-tree structure.

By the recursive partitioning of a CU, an optimal partitioning method that incurs a minimum rate-distortion cost may be selected.

The Coding Tree Unit (CTU) 320 in FIG. 3 is an example of a CTU to which all of a quad-tree partition, a binary-tree partition, and a ternary-tree partition are applied.

As described above, in order to partition a CTU, at least one of a quad-tree partition, a binary-tree partition, and a ternary-tree partition may be applied to the CTU. Partitions may be applied based on specific priority.

For example, a quad-tree partition may be preferentially applied to the CTU. A CU that cannot be partitioned in a quad-tree form any further may correspond to a leaf node of a quad-tree. A CU corresponding to the leaf node of the quad-tree may be a root node of a binary tree and/or a ternary tree. That is, the CU corresponding to the leaf node of the quad-tree may be partitioned in a binary-tree form or a ternary-tree form, or may not be partitioned any further. In this case, each CU, which is generated by applying a binary-tree partition or a ternary-tree partition to the CU corresponding to the leaf node of a quad-tree, is prevented from being subjected again to quad-tree partitioning, thus effectively performing partitioning of a block and/or signaling of block partition information.

The partition of a CU corresponding to each node of a quad-tree may be signaled using quad-partition information. Quad-partition information having a first value (e.g., "1") may indicate that the corresponding CU is partitioned in a quad-tree form. Quad-partition information having a second value (e.g., "0") may indicate that the corresponding CU is not partitioned in a quad-tree form. The quad-partition information may be a flag having a specific length (e.g., 1 bit).

Priority may not exist between a binary-tree partition and a ternary-tree partition. That is, a CU corresponding to the leaf node of a quad-tree may be partitioned in a binary-tree form or a ternary-tree form. Also, the CU generated through a binary-tree partition or a ternary-tree partition may be further partitioned in a binary-tree form or a ternary-tree form, or may not be partitioned any further.

Partitioning performed when priority does not exist between a binary-tree partition and a ternary-tree partition may be referred to as a "multi-type tree partition". That is, a CU corresponding to the leaf node of a quad-tree may be the root node of a multi-type tree. Partitioning of a CU corresponding to each node of the multi-type tree may be signaled using at least one of information indicating whether the CU is partitioned in a multi-type tree, partition direction information, and partition tree information. For partitioning of a CU corresponding to each node of a multi-type tree, information indicating whether partitioning in the multi-type tree is performed, partition direction information, and partition tree information may be sequentially signaled.

For example, information indicating whether a CU is partitioned in a multi-type tree and having a first value (e.g., "1") may indicate that the corresponding CU is partitioned in a multi-type tree form. Information indicating whether a CU is partitioned in a multi-type tree and having a second value (e.g., "0") may indicate that the corresponding CU is not partitioned in a multi-type tree form.

When a CU corresponding to each node of a multi-type tree is partitioned in a multi-type tree form, the corresponding CU may further include partition direction information.

The partition direction information may indicate the partition direction of the multi-type tree partition. Partition direction information having a first value (e.g., "1") may indicate that the corresponding CU is partitioned in a vertical direction. Partition direction information having a second value (e.g., "0") may indicate that the corresponding CU is partitioned in a horizontal direction.

When a CU corresponding to each node of a multi-type tree is partitioned in a multi-type tree form, the corresponding CU may further include partition-tree information. The partition-tree information may indicate the tree that is used for a multi-type tree partition.

For example, partition-tree information having a first value (e.g., "1") may indicate that the corresponding CU is partitioned in a binary-tree form. Partition-tree information having a second value (e.g., "0") may indicate that the corresponding CU is partitioned in a ternary-tree form.

Here, each of the above-described information indicating whether partitioning in the multi-type tree is performed, partition-tree information, and partition direction information may be a flag having a specific length (e.g., 1 bit).

At least one of the above-described quad-partition information, information indicating whether partitioning in the multi-type tree is performed, partition direction information, and partition-tree information may be entropy-encoded and/or entropy-decoded. In order to perform entropy encoding/decoding of such information, information of a neighbor CU adjacent to a target CU may be used.

For example, it may be considered that there is a high probability that the partition form of a left CU and/or an above CU (i.e., partitioning/non-partitioning, a partition tree and/or a partition direction) and the partition form of a target CU will be similar to each other. Therefore, based on the information of a neighbor CU, context information for entropy encoding and/or entropy decoding of the information of the target CU may be derived. Here, the information of the neighbor CU may include at least one of 1) quad-partition information of the neighbor CU, 2) information indicating whether the neighbor CU is partitioned in a multi-type tree, 3) partition direction information of the neighbor CU, and 4) partition-tree information of the neighbor CU.

In another embodiment, of a binary-tree partition and a ternary-tree partition, the binary-tree partition may be preferentially performed. That is, the binary-tree partition may be first applied, and then a CU corresponding to the leaf node of a binary tree may be set to the root node of a ternary tree. In this case, a quad-tree partition or a binary-tree partition may not be performed on the CU corresponding to the node of the ternary tree.

A CU, which is not partitioned any further through a quad-tree partition, a binary-tree partition, and/or a ternary-tree partition, may be the unit of encoding, prediction and/or transform. That is, the CU may not be partitioned any further for prediction and/or transform. Therefore, a partition structure for partitioning the CU into Prediction Units (PUs) and/or Transform Units (TUs), partition information thereof, etc. may not be present in a bitstream.

However, when the size of a CU, which is the unit of partitioning, is greater than the size of a maximum transform block, the CU may be recursively partitioned until the size of the CU becomes less than or equal to the size of the maximum transform block. For example, when the size of a CU is 64×64 and the size of the maximum transform block is 32×32, the CU may be partitioned into four 32×32 blocks so as to perform a transform. For example, when the size of a CU is 32×64 and the size of the maximum transform block is 32×32, the CU may be partitioned into two 32×32 blocks.

In this case, information indicating whether a CU is partitioned for a transform may not be separately signaled. Without signaling, whether a CU is partitioned may be determined via a comparison between the horizontal size (and/or vertical size) of the CU and the horizontal size (and/or vertical size) of the maximum transform block. For example, when the horizontal size of the CU is greater than the horizontal size of the maximum transform block, the CU may be vertically bisected. Further, when the vertical size of the CU is greater than the vertical size of the maximum transform block, the CU may be horizontally bisected.

Information about the maximum size and/or minimum size of a CU and information about the maximum size and/or minimum size of a transform block may be signaled or determined at a level higher than that of the CU. For example, the higher level may be a sequence level, a picture level, a tile level, a tile group level or a slice level. For example, the minimum size of the CU may be set to 4×4. For example, the maximum size of the transform block may be set to 64×64. For example, the maximum size of the transform block may be set to 4×4.

Information about the minimum size of a CU corresponding to the leaf node of a quad-tree (i.e., the minimum size of the quad-tree) and/or information about the maximum depth of a path from the root node to the leaf node of a multi-type tree (i.e., the maximum depth of a multi-type tree) may be signaled or determined at a level higher than that of the CU. For example, the higher level may be a sequence level, a picture level, a slice level, a tile group level or a tile level. Information about the minimum size of a quad-tree and/or information about the maximum depth of a multi-type tree may be separately signaled or determined at each of an intra-slice level and an inter-slice level.

Information about the difference between the size of a CTU and the maximum size of a transform block may be signaled or determined at a level higher than that of a CU. For example, the higher level may be a sequence level, a picture level, a slice level, a tile group level or a tile level. Information about the maximum size of a CU corresponding to each node of a binary tree (i.e., the maximum size of the binary tree) may be determined based on the size and the difference information of a CTU. The maximum size of a CU corresponding to each node of a ternary tree (i.e., the maximum size of the ternary tree) may have different values depending on the type of slice. For example, the maximum size of the ternary tree at an intra-slice level may be 32×32. For example, the maximum size of the ternary tree at an inter-slice level may be 128×128. For example, the minimum size of a CU corresponding to each node of a binary tree (i.e., the minimum size of the binary tree) and/or the minimum size of a CU corresponding to each node of a ternary tree (i.e., the minimum size of the ternary tree) may be set to the minimum size of a CU.

In a further example, the maximum size of a binary tree and/or the maximum size of a ternary tree may be signaled or determined at a slice level. Also, the minimum size of a binary tree and/or the minimum size of a ternary tree may be signaled or determined at a slice level.

Based on the above-described various block sizes and depths, quad-partition information, information indicating whether partitioning in a multi-type tree is performed, partition tree information and/or partition direction information may or may not be present in a bitstream.

For example, when the size of a CU is not greater than the minimum size of a quad-tree, the CU may not include quad-partition information, and quad-partition information of the CU may be inferred as a second value.

For example, when the size of a CU corresponding to each node of a multi-type tree (horizontal size and vertical size) is greater than the maximum size of a binary tree (horizontal size and vertical size) and/or the maximum size of a ternary tree (horizontal size and vertical size), the CU may not be partitioned in a binary-tree form and/or a ternary-tree form. By means of this determination manner, information indicating whether partitioning in a multi-type tree is performed may not be signaled, but may be inferred as a second value.

Alternatively, when the size of a CU corresponding to each node of a multi-type tree (horizontal size and vertical size) is equal to the minimum size of a binary tree (horizontal size and vertical size), or when the size of a CU (horizontal size and vertical size) is equal to twice the minimum size of a ternary tree (horizontal size and vertical size), the CU may not be partitioned in a binary tree form and/or a ternary tree form. By means of this determination manner, information indicating whether partitioning in a multi-type tree is performed may not be signaled, but may be inferred as a second value. The reason for this is that, when a CU is partitioned in a binary tree form and/or a ternary tree form, a CU smaller than the minimum size of the binary tree and/or the minimum size of the ternary tree is generated.

Alternatively, a binary-tree partition or a ternary-tree partition may be limited based on the size of a virtual pipeline data unit (i.e., the size of a pipeline buffer). For example, when a CU is partitioned into sub-CUs unsuitable for the size of a pipeline buffer through a binary-tree partition or a ternary-tree partition, a binary-tree partition or a ternary-tree partition may be limited. The size of the pipeline buffer may be equal to the maximum size of a transform block (e.g., 64×64).

For example, when the size of the pipeline buffer is 64×64, the following partitions may be limited.

Ternary-tree partition for N×M CU (w % here N and/or M are 128)

Horizontal binary-tree partition for 128×N CU (where N<=64)

Vertical binary-tree partition for N×128 CU (where N<=64)

Alternatively, when the depth of a CU corresponding to each node of a multi-type tree is equal to the maximum depth of the multi-type tree, the CU may not be partitioned in a binary-tree form and/or a ternary-tree form. By means of this determination manner, information indicating whether partitioning in a multi-type tree is performed may not be signaled, but may be inferred as a second value.

Alternatively, information indicating whether partitioning in a multi-type tree is performed may be signaled only when at least one of a vertical binary-tree partition, a horizontal binary-tree partition, a vertical ternary-tree partition, and a horizontal ternary-tree partition is possible for a CU corresponding to each node of a multi-type tree. Otherwise, the CU may not be partitioned in a binary-tree form and/or a ternary-tree form. By means of this determination manner, information indicating whether partitioning in a multi-type tree is performed may not be signaled, but may be inferred as a second value.

Alternatively, partition direction information may be signaled only when both a vertical binary-tree partition and a horizontal binary-tree partition are possible or only when both a vertical ternary-tree partition and a horizontal ternary-tree partition are possible, for a CU corresponding to each node of a multi-type tree. Otherwise, the partition direction information may not be signaled, but may be inferred as a value indicating the direction in which the CU can be partitioned.

Alternatively, partition tree information may be signaled only when both a vertical binary-tree partition and a vertical ternary-tree partition are possible or only when both a horizontal binary-tree partition and a horizontal ternary-tree partition are possible, for a CU corresponding to each node of a multi-type tree. Otherwise, the partition tree information may not be signaled, but may be inferred as a value indicating a tree that can be applied to the partition of the CU.

Figure 4:
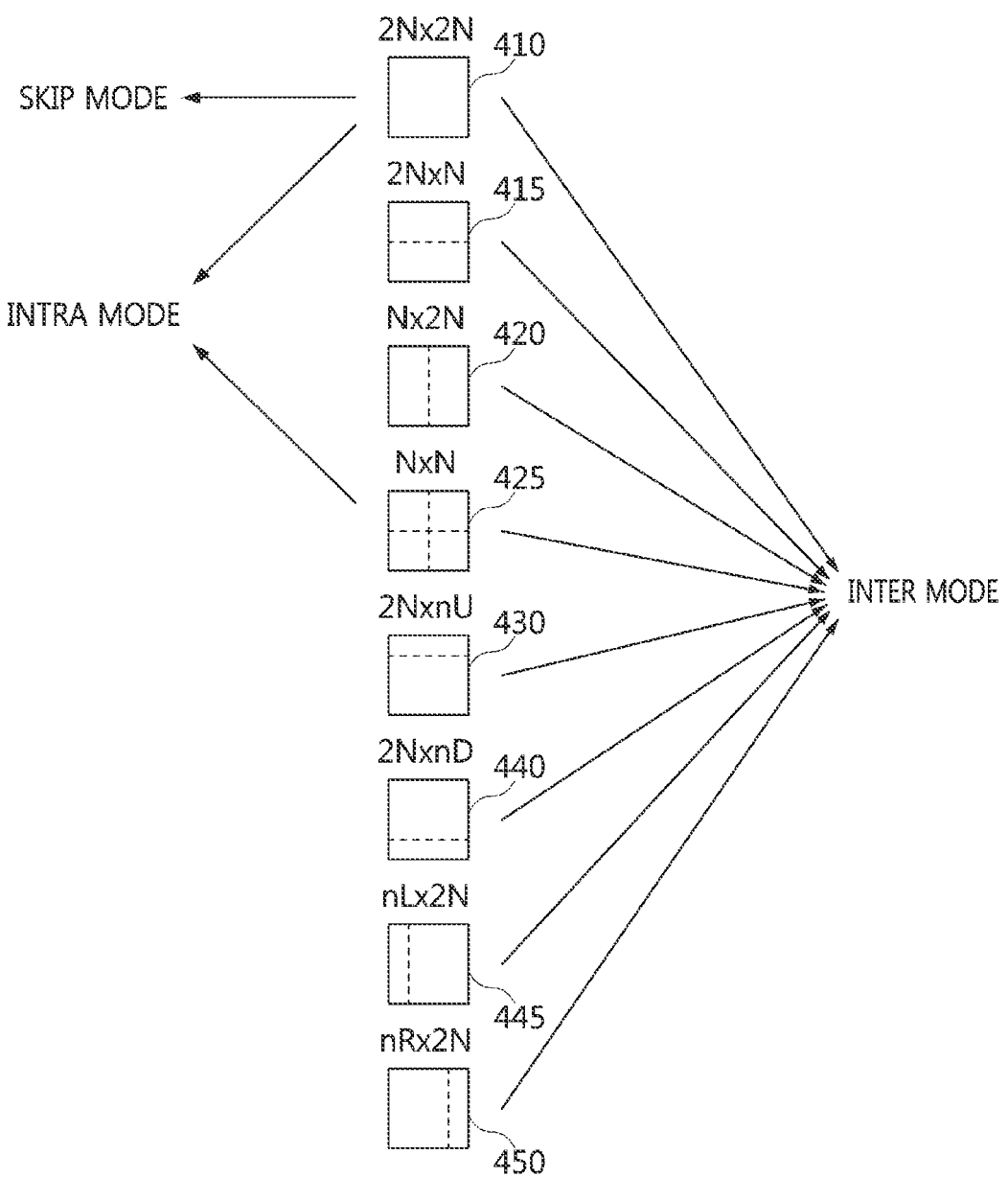
FIG. 4 is a diagram illustrating the form of a prediction unit that a coding unit can include.

FIG. 4 is a diagram illustrating the form of a prediction unit that a coding unit can include.

When, among CUs partitioned from an LCU, a CU, which is not partitioned any further, may be divided into one or more Prediction Units (PUs). Such division is also referred to as "partitioning".

A PU may be a base unit for prediction. A PU may be encoded and decoded in any one of a skip mode, an inter mode, and an intra mode. A PU may be partitioned into various shapes depending on respective modes. For example, the target block, described above with reference to FIG. 1, and the target block, described above with reference to FIG. 2, may each be a PU.

A CU may not be split into PUs. When the CU is not split into PUs, the size of the CU and the size of a PU may be equal to each other.

In a skip mode, partitioning may not be present in a CU. In the skip mode, a 2N×2N mode 410, in which the sizes of a PU and a CU are identical to each other, may be supported without partitioning.

In an inter mode, 8 types of partition shapes may be present in a CU. For example, in the inter mode, the 2N×2N mode 410, a 2N×N mode 415, an N×2N mode 420, an N×N mode 425, a 2N×nU mode 430, a 2N×nD mode 435, an nL×2N mode 440, and an nR×2N mode 445 may be supported.

In an intra mode, the 2N×2N mode 410 and the N×N mode 425 may be supported.

In the 2N×2N mode 410, a PU having a size of 2N×2N may be encoded. The PU having a size of 2N×2N may mean a PU having a size identical to that of the CU. For example, the PU having a size of 2N×2N may have a size of 64×64, 32×32, 16×16 or 8×8.

In the N×N mode 425, a PU having a size of N×N may be encoded.

For example, in intra prediction, when the size of a PU is 8×8, four partitioned PUs may be encoded. The size of each partitioned PU may be 4×4.

When a PU is encoded in an intra mode, the PU may be encoded using any one of multiple intra prediction modes. For example, High Efficiency Video Coding (HEVC) technology may provide 35 intra prediction modes, and the PU may be encoded in any one of the 35 intra prediction modes.

Which one of the 2N×2N mode 410 and the N×N mode 425 is to be used to encode the PU may be determined based on rate-distortion cost.

The encoding apparatus 100 may perform an encoding operation on a PU having a size of 2N×2N. Here, the encoding operation may be the operation of encoding the PU in each of multiple intra prediction modes that can be used by the encoding apparatus 100. Through the encoding operation, the optimal intra prediction mode for a PU having a size of 2N×2N may be derived. The optimal intra prediction mode may be an intra prediction mode in which a minimum rate-distortion cost occurs upon encoding the PU having a size of 2N×2N, among multiple intra prediction modes that can be used by the encoding apparatus 100.

Further, the encoding apparatus 100 may sequentially perform an encoding operation on respective PUs obtained from N×N partitioning. Here, the encoding operation may be the operation of encoding a PU in each of multiple intra prediction modes that can be used by the encoding apparatus 100. By means of the encoding operation, the optimal intra prediction mode for the PU having a size of N×N may be derived. The optimal intra prediction mode may be an intra prediction mode in which a minimum rate-distortion cost occurs upon encoding the PU having a size of N×N, among multiple intra prediction modes that can be used by the encoding apparatus 100.

The encoding apparatus 100 may determine which of a PU having a size of 2N×2N and PUs having sizes of N×N to be encoded based on a comparison of a rate-distortion cost of the PU having a size of 2N×2N and a rate-distortion costs of the PUs having sizes of N×N.

A single CU may be partitioned into one or more PUs, and a PU may be partitioned into multiple PUs.

For example, when a single PU is partitioned into four PUs, the horizontal size and vertical size of each of four PUs generated by partitioning may be half the horizontal size and the vertical size of the PU before being partitioned. When a PU having a 32×32 size is partitioned into four PUs, the size of each of four partitioned PUs may be 16×16. When a single PU is partitioned into four PUs, it may be considered that the PU has been partitioned in a quad-tree structure.

For example, when a single PU is partitioned into two PUs, the horizontal size or the vertical size of each of two PUs generated by partitioning may be half the horizontal size or the vertical size of the PU before being partitioned. When a PU having a 32×32 size is vertically partitioned into two PUs, the size of each of two partitioned PUs may be 16×32. When a PU having a 32×32 size is horizontally partitioned into two PUs, the size of each of two partitioned PUs may be 32×16. When a single PU is partitioned into two PUs, it may be considered that the PU has been partitioned in a binary-tree structure.

Figure 5:
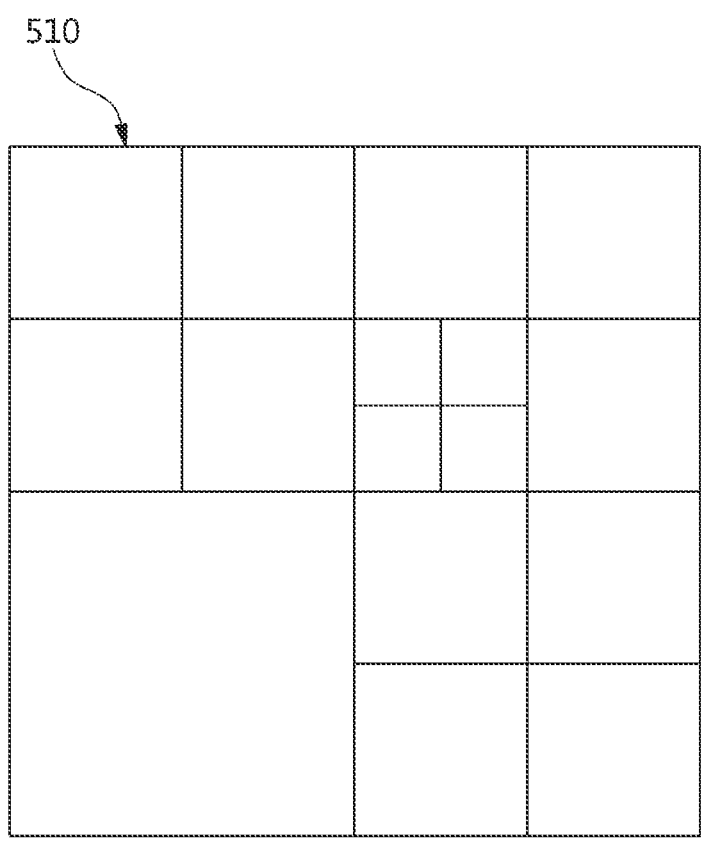
FIG. 5 is a diagram illustrating the form of a transform unit that can be included in a coding unit.

FIG. 5 is a diagram illustrating the form of a transform unit that can be included in a coding unit.

A Transform Unit (TU) may have a base unit that is used for a procedure, such as transform, quantization, inverse transform, dequantization, entropy encoding, and entropy decoding, in a CU.

A TU may have a square shape or a rectangular shape. A shape of a TU may be determined based on a size and/or a shape of a CU.

Among CUs partitioned from the LCU, a CU which is not partitioned into CUs any further may be partitioned into one or more TUs. Here, the partition structure of a TU may be a quad-tree structure. For example, as shown in FIG. 5, a single CU 510 may be partitioned one or more times depending on the quad-tree structure. By means of this partitioning, the single CU 510 may be composed of TUs having various sizes.

It can be considered that when a single CU is split two or more times, the CU is recursively split. Through splitting, a single CU may be composed of Transform Units (TUs) having various sizes.

Alternatively, a single CU may be split into one or more TUs based on the number of vertical lines and/or horizontal lines that split the CU.

A CU may be split into symmetric TUs or asymmetric TUs. For splitting into asymmetric TUs, information about the size and/or shape of each TU may be signaled from the encoding apparatus 100 to the decoding apparatus 200. Alternatively, the size and/or shape of each TU may be derived from information about the size and/or shape of the CU.

A CU may not be split into TUs. When the CU is not split into TUs, the size of the CU and the size of a TU may be equal to each other.

A single CU may be partitioned into one or more TUs, and a TU may be partitioned into multiple TUs.

For example, when a single TU is partitioned into four TUs, the horizontal size and vertical size of each of four TUs generated by partitioning may be half the horizontal size and the vertical size of the TU before being partitioned. When a TU having a 32×32 size is partitioned into four TUs, the size of each of four partitioned TUs may be 16×16. When a single TU is partitioned into four TUs, it may be considered that the TU has been partitioned in a quad-tree structure.

For example, when a single TU is partitioned into two TUs, the horizontal size or the vertical size of each of two TUs generated by partitioning may be half the horizontal size or the vertical size of the TU before being partitioned. When a TU having a 32×32 size is vertically partitioned into two TUs, the size of each of two partitioned TUs may be 16×32. When a TU having a 32×32 size is horizontally partitioned into two TUs, the size of each of two partitioned TUs may be 32×16. When a single TU is partitioned into two TUs, it may be considered that the TU has been partitioned in a binary-tree structure.

In a way differing from that illustrated in FIG. 5, a CU may be split.

For example, a single CU may be split into three CUs. The horizontal sizes or vertical sizes of the three CUs generated from splitting may be ¼, ½, and ¼, respectively, of the horizontal size or vertical size of the original CU before being split.

For example, when a CU having a 32×32 size is vertically split into three CUs, the sizes of the three CUs generated from the splitting may be 8×32, 16×32, and 8×32, respectively. In this way, when a single CU is split into three CUs, it may be considered that the CU is split in the form of a ternary tree.

One of exemplary splitting forms, that is, quad-tree splitting, binary tree splitting, and ternary tree splitting, may be applied to the splitting of a CU, and multiple splitting schemes may be combined and used together for splitting of a CU. Here, the case where multiple splitting schemes are combined and used together may be referred to as "complex tree-format splitting".

Figure 6:
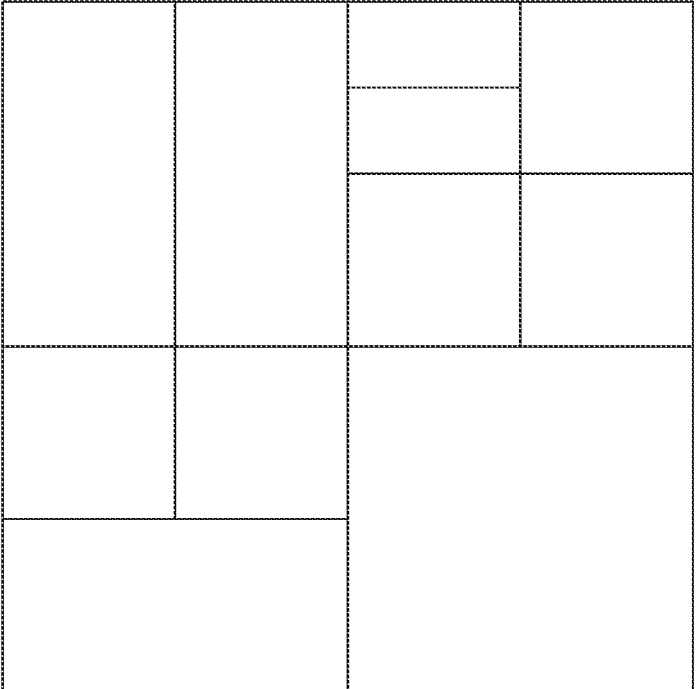
FIG. 6 illustrates splitting of a block according to an example.

FIG. 6 illustrates the splitting of a block according to an example.

In a video encoding and/or decoding process, a target block may be split, as illustrated in FIG. 6. For example, the target block may be a CU.

For splitting of the target block, an indicator indicating split information may be signaled from the encoding apparatus 100 to the decoding apparatus 200. The split information may be information indicating how the target block is split.

The split information may be one or more of a split flag (hereinafter referred to as "split_flag"), a quad-binary flag (hereinafter referred to as "QB_flag"), a quad-tree flag (hereinafter referred to as "quadtree_flag"), a binary tree flag (hereinafter referred to as "binarytree_flag"), and a binary type flag (hereinafter referred to as "Btype_flag").

"split_flag" may be a flag indicating whether a block is split. For example, a split_flag value of 1 may indicate that the corresponding block is split. A split_flag value of 0 may indicate that the corresponding block is not split.

"QB_flag" may be a flag indicating which one of a quad-tree form and a binary tree form corresponds to the shape in which the block is split. For example, a QB_flag value of 0 may indicate that the block is split in a quad-tree form. A QB_flag value of 1 may indicate that the block is split in a binary tree form. Alternatively, a QB_flag value of 0 may indicate that the block is split in a binary tree form. A QB_flag value of 1 may indicate that the block is split in a quad-tree form.

"quadtree_flag" may be a flag indicating whether a block is split in a quad-tree form. For example, a quadtree_flag value of 1 may indicate that the block is split in a quad-tree form. A quadtree_flag value of 0 may indicate that the block is not split in a quad-tree form.

"binarytree_flag" may be a flag indicating whether a block is split in a binary tree form. For example, a binarytree flag value of 1 may indicate that the block is split in a binary tree form. A binarytree_flag value of 0 may indicate that the block is not split in a binary tree form.

"Btype_flag" may be a flag indicating which one of a vertical split and a horizontal split corresponds to a split direction when a block is split in a binary tree form. For example, a Btype_flag value of 0 may indicate that the block is split in a horizontal direction. A Btype_flag value of 1 may indicate that a block is split in a vertical direction. Alternatively, a Btype_flag value of 0 may indicate that the block is split in a vertical direction. A Btype_flag value of 1 may indicate that a block is split in a horizontal direction.

For example, the split information of the block in FIG. 6 may be derived by signaling at least one of quadtree_flag, binarytree_flag, and Btype_flag, as shown in the following Table 1.

TABLE 1

| quadtree_flag | binarytree_flag | Btype_flag |
|---|---|---|
| 1 | | |
| 0 | | |
| | 1 | |
| | | 1 |
| | 0 | |
| | 0 | |
| 1 | | |
| 0 | | |
| | 1 | |
| | | 0 |
| | 0 | |
| | 0 | |
| 0 | | |
| | 0 | |
| 0 | | |
| | 0 | |
| 0 | | |
| | 0 | |
| 0 | | |
| | 1 | |
| | | 0 |
| | 1 | |
| | | 1 |
| | 0 | |
| | 0 | |

TABLE 1-continued

| quadtree_flag | binarytree_flag | Btype_flag |
|---|---|---|
| | 0 | |
| 0 | | |
| | 0 | |

For example, the split information of the block in FIG. 6 may be derived by signaling at least one of split_flag, QB_flag and Btype_flag, as shown in the following Table 2.

TABLE 2

| split_flag | QB_flag | Btype_flag |
|---|---|---|
| 1 | | |
| | 0 | |
| 1 | | |
| | 1 | |
| | | 1 |
| 0 | | |
| 0 | | |
| 1 | | |
| | 0 | |
| 1 | | |
| | 1 | |
| | | 0 |
| 0 | | |
| 1 | | |
| | 1 | |
| | | 0 |
| 0 | | |
| 0 | | |
| 0 | | |
| 0 | | |
| 0 | | |
| 1 | | |
| | 1 | |
| | | 0 |
| 1 | | |
| | | 1 |
| 0 | | |
| 0 | | |
| 0 | | |
| 0 | | |

The splitting method may be limited only to a quad-tree or to a binary tree depending on the size and/or shape of the block. When this limitation is applied, split_flag may be a flag indicating whether a block is split in a quad-tree form or a flag indicating whether a block is split in a binary tree form. The size and shape of a block may be derived depending on the depth information of the block, and the depth information may be signaled from the encoding apparatus 100 to the decoding apparatus 200.

When the size of a block falls within a specific range, only splitting in a quad-tree form may be possible. For example, the specific range may be defined by at least one of a maximum block size and a minimum block size at which only splitting in a quad-tree form is possible.

Information indicating the maximum block size and the minimum block size at which only splitting in a quad-tree form is possible may be signaled from the encoding apparatus 100 to the decoding apparatus 200 through a bitstream. Further, this information may be signaled for at least one of units such as a video, a sequence, a picture, a parameter, a tile group, and a slice (or a segment).

Alternatively, the maximum block size and/or the minimum block size may be fixed sizes predefined by the encoding apparatus 100 and the decoding apparatus 200. For example, when the size of a block is above 64×64 and below 256×256, only splitting in a quad-tree form may be possible. In this case, split_flag may be a flag indicating whether splitting in a quad-tree form is performed.

When the size of a block is greater than the maximum size of a transform block, only partitioning in a quad-tree form may be possible. Here, a sub-block resulting from partitioning may be at least one of a CU and a TU.

In this case, split_flag may be a flag indicating whether a CU is partitioned in a quad-tree form.

When the size of a block falls within the specific range, only splitting in a binary tree form or a ternary tree form may be possible. For example, the specific range may be defined by at least one of a maximum block size and a minimum block size at which only splitting in a binary tree form or a ternary tree form is possible.

Information indicating the maximum block size and/or the minimum block size at which only splitting in a binary tree form or a ternary tree form is possible may be signaled from the encoding apparatus 100 to the decoding apparatus 200 through a bitstream. Further, this information may be signaled for at least one of units such as a sequence, a picture, and a slice (or a segment).

Alternatively, the maximum block size and/or the minimum block size may be fixed sizes predefined by the encoding apparatus 100 and the decoding apparatus 200. For example, when the size of a block is above 8×8 and below 16×16, only splitting in a binary tree form may be possible. In this case, split_flag may be a flag indicating whether splitting in a binary tree form or a ternary tree form is performed.

The above description of partitioning in a quad-tree form may be equally applied to a binary-tree form and/or a ternary-tree form.

The partition of a block may be limited by a previous partition. For example, when a block is partitioned in a specific binary-tree form and then multiple sub-blocks are generated from the partitioning, each sub-block may be additionally partitioned only in a specific tree form. Here, the specific tree form may be at least one of a binary-tree form, a ternary-tree form, and a quad-tree form.

When the horizontal size or vertical size of a partition block is a size that cannot be split further, the above-described indicator may not be signaled.

Figure 7:
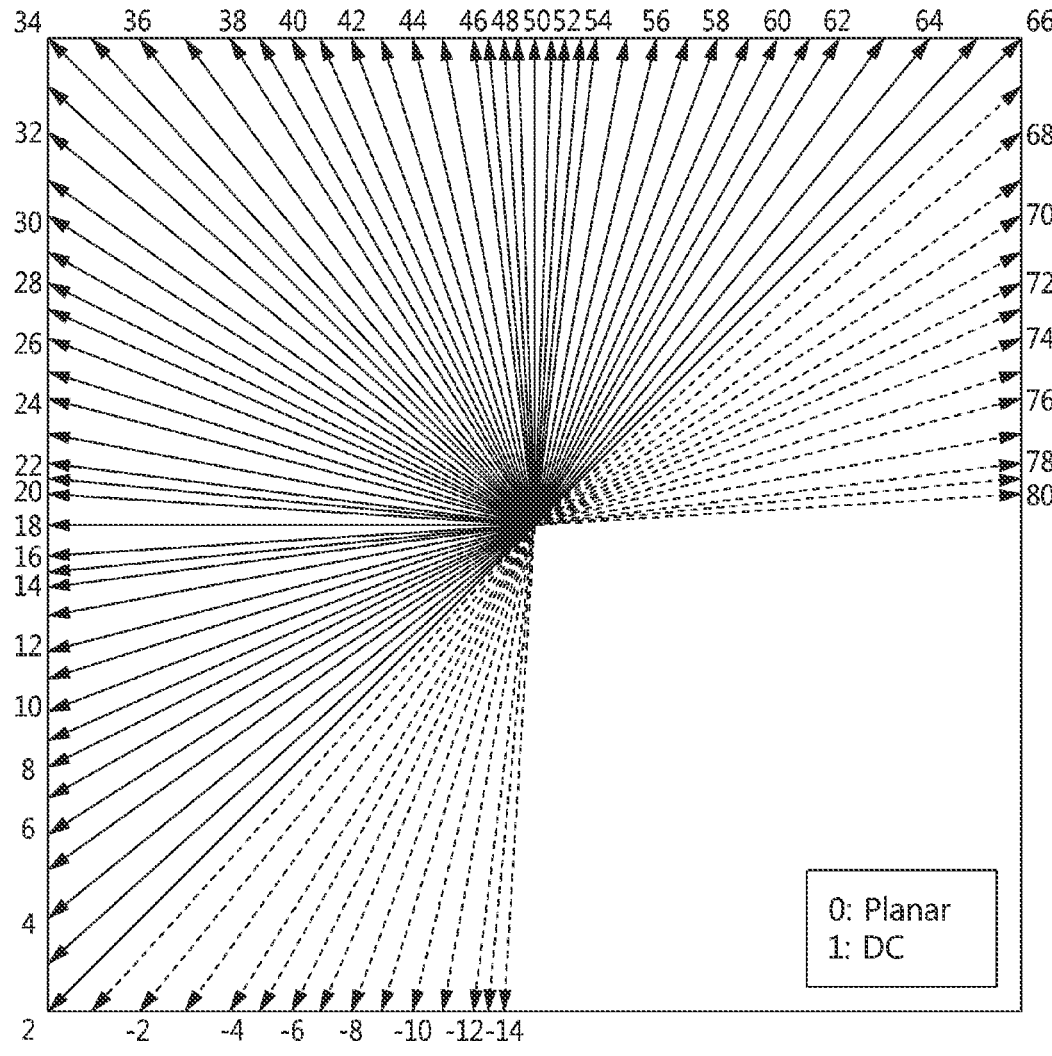
FIG. 7 is a diagram for explaining an embodiment of an intra prediction procedure.

Arrows radially extending from the center of the graph in FIG. 7 indicate the prediction directions of directional intra prediction modes. Further, numbers appearing near the arrows indicate examples of mode values assigned to intra prediction modes or to the prediction directions of the intra prediction modes.

In FIG. 7, A number "0" may represent a Planar mode which is a non-directional intra prediction mode. A number "1" may represent a DC mode which is a non-directional intra prediction mode.

Intra encoding and/or decoding may be performed using a reference sample of a neighbor unit of a target block. The neighbor block may be a reconstructed neighbor block. The reference sample may mean a neighbor sample.

For example, intra encoding and/or decoding may be performed using the value of a reference sample which are included in a reconstructed neighbor block or the coding parameters of the reconstructed neighbor block.

The encoding apparatus 100 and/or the decoding apparatus 200 may generate a prediction block by performing intra prediction on a target block based on information about samples in a target image. When intra prediction is performed, the encoding apparatus 100 and/or the decoding apparatus 200 may generate a prediction block for the target block by performing intra prediction based on information about samples in the target image. When intra prediction is performed, the encoding apparatus 100 and/or the decoding apparatus 200 may perform directional prediction and/or non-directional prediction based on at least one reconstructed reference sample.

A prediction block may be a block generated as a result of performing intra prediction. A prediction block may correspond to at least one of a CU, a PU, and a TU.

The unit of a prediction block may have a size corresponding to at least one of a CU, a PU, and a TU. The prediction block may have a square shape having a size of 2N×2N or N×N. The size of N×N may include sizes of 4×4, 8×8, 16×16, 32×32, 64×64, or the like.

Alternatively, a prediction block may a square block having a size of 2×2, 4×4, 8×8, 16×16, 32×32, 64×64 or the like or a rectangular block having a size of 2×8, 4×8, 2×16, 4×16, 8×16, or the like.

Intra prediction may be performed in consideration of the intra prediction mode for the target block. The number of intra prediction modes that the target block can have may be a predefined fixed value, and may be a value determined differently depending on the attributes of a prediction block. For example, the attributes of the prediction block may include the size of the prediction block, the type of prediction block, etc. Further, the attribute of a prediction block may indicate a coding parameter for the prediction block.

For example, the number of intra prediction modes may be fixed at N regardless of the size of a prediction block. Alternatively, the number of intra prediction modes may be, for example, 3, 5, 9, 17, 34, 35, 36, 65, 67 or 95.

The intra prediction modes may be non-directional modes or directional modes.

For example, the intra prediction modes may include two non-directional modes and 65 directional modes corresponding to numbers 0 to 66 illustrated in FIG. 7.

For example, the intra prediction modes may include two non-directional modes and 93 directional modes corresponding to numbers −14 to 80 illustrated in FIG. 7 in a case that a specific intra prediction method is used.

The two non-directional modes may include a DC mode and a planar mode.

A directional mode may be a prediction mode having a specific direction or a specific angle. The directional mode may also be referred to as an "angular mode".

An intra prediction mode may be represented by at least one of a mode number, a mode value, a mode angle, and a mode direction. In other words, the terms "(mode) number of the intra prediction mode", "(mode) value of the intra prediction mode". "(mode) angle of the intra prediction mode", and "(mode) direction of the intra prediction mode" may be used to have the same meaning, and may be used interchangeably with each other.

The number of intra prediction modes may be M. The value of M may be 1 or more. In other words, the number of intra prediction modes may be M, which includes the number of non-directional modes and the number of directional modes.

The number of intra prediction modes may be fixed to M regardless of the size and/or the color component of a block. For example, the number of intra prediction modes may be fixed at any one of 35 and 67 regardless of the size of a block.

Alternatively, the number of intra prediction modes may differ depending on the shape, the size and/or the type of the color component of a block.

For example, in FIG. 7, directional prediction modes illustrated as dashed lines may be applied only for a prediction for a non-square block.

For example, the larger the size of the block, the greater the number of intra prediction modes. Alternatively, the larger the size of the block, the smaller the number of intra prediction modes. When the size of the block is 4×4 or 8×8, the number of intra prediction modes may be 67. When the size of the block is 16×16, the number of intra prediction modes may be 35. When the size of the block is 32×32, the number of intra prediction modes may be 19. When the size of a block is 64×64, the number of intra prediction modes may be 7.

For example, the number of intra prediction modes may differ depending on whether a color component is a luma signal or a chroma signal. Alternatively, the number of intra prediction modes corresponding to a luma component block may be greater than the number of intra prediction modes corresponding to a chroma component block.

For example, in a vertical mode having a mode value of 50, prediction may be performed in a vertical direction based on the pixel value of a reference sample. For example, in a horizontal mode having a mode value of 18, prediction may be performed in a horizontal direction based on the pixel value of a reference sample.

Even in directional modes other than the above-described mode, the encoding apparatus 100 and the decoding apparatus 200 may perform intra prediction on a target unit using reference samples depending on angles corresponding to the directional modes.

Intra prediction modes located on a right side with respect to the vertical mode may be referred to as 'vertical-right modes'. Intra prediction modes located below the horizontal mode may be referred to as 'horizontal-below modes'. For example, in FIG. 7, the intra prediction modes in which a mode value is one of 51, 52, 53, 54, 55, 56, 57, 58, 59, 60, 61, 62, 63, 64, 65, and 66 may be vertical-right modes. Intra prediction modes in which a mode value is one of 2, 3, 4, 5, 6, 7, 8, 9, 10, 11, 12, 13, 14, 15, 16, and 17 may be horizontal-below modes.

The non-directional mode may include a DC mode and a planar mode. For example, a value of the DC mode may be 1. A value of the planar mode may be 0.

The directional mode may include an angular mode. Among the plurality of the intra prediction modes, remaining modes except for the DC mode and the planar mode may be directional modes.

When the intra prediction mode is a DC mode, a prediction block may be generated based on the average of pixel values of a plurality of reference pixels. For example, a value of a pixel of a prediction block may be determined based on the average of pixel values of a plurality of reference pixels.

The number of above-described intra prediction modes and the mode values of respective intra prediction modes are merely exemplary. The number of above-described intra prediction modes and the mode values of respective intra prediction modes may be defined differently depending on the embodiments, implementation and/or requirements.

In order to perform intra prediction on a target block, the step of checking whether samples included in a reconstructed neighbor block can be used as reference samples of a target block may be performed. When a sample that cannot be used as a reference sample of the target block is present among samples in the neighbor block, a value generated via copying and/or interpolation that uses at least one sample value, among the samples included in the reconstructed neighbor block, may replace the sample value of the sample that cannot be used as the reference sample. When the value generated via copying and/or interpolation replaces the sample value of the existing sample, the sample may be used as the reference sample of the target block.

When intra prediction is used, a filter may be applied to at least one of a reference sample and a prediction sample based on at least one of the intra prediction mode and the size of the target block.

The type of filter to be applied to at least one of a reference sample and a prediction sample may differ depending on at least one of the intra prediction mode of a target block, the size of the target block, and the shape of the target block. The types of filters may be classified depending on one or more of the length of filter tap, the value of a filter coefficient, and filter strength. The length of filter tap may mean the number of filter taps. Also, the number of filter tap may mean the length of the filter.

When the intra prediction mode is a planar mode, a sample value of a prediction target block may be generated using a weighted sum of an above reference sample of the target block, a left reference sample of the target block, an above-right reference sample of the target block, and a below-left reference sample of the target block depending on the location of the prediction target sample in the prediction block when the prediction block of the target block is generated.

When the intra prediction mode is a DC mode, the average of reference samples above the target block and the reference samples to the left of the target block may be used when the prediction block of the target block is generated. Also, filtering using the values of reference samples may be performed on specific rows or specific columns in the target block. The specific rows may be one or more upper rows adjacent to the reference sample. The specific columns may be one or more left columns adjacent to the reference sample.

When the intra prediction mode is a directional mode, a prediction block may be generated using the above reference samples, left reference samples, above-right reference sample and/or below-left reference sample of the target block.

In order to generate the above-described prediction sample, real-number-based interpolation may be performed.

The intra prediction mode of the target block may be predicted from intra prediction mode of a neighbor block adjacent to the target block, and the information used for prediction may be entropy-encoded/decoded.

For example, when the intra prediction modes of the target block and the neighbor block are identical to each other, it may be signaled, using a predefined flag, that the intra prediction modes of the target block and the neighbor block are identical.

For example, an indicator for indicating an intra prediction mode identical to that of the target block, among intra prediction modes of multiple neighbor blocks, may be signaled.

When the intra prediction modes of the target block and a neighbor block are different from each other, information about the intra prediction mode of the target block may be encoded and/or decoded using entropy encoding and/or decoding.

Figure 8:
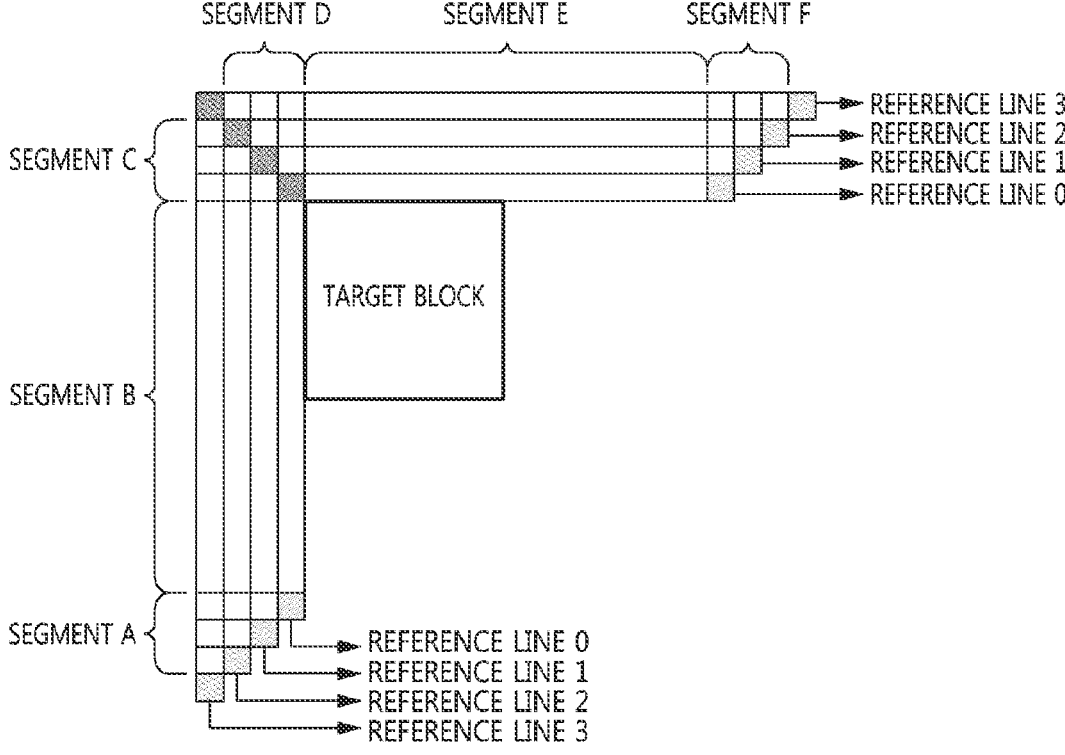
FIG. 8 is a diagram illustrating reference samples used in an intra prediction procedure.

FIG. 8 is a diagram illustrating reference samples used in an intra prediction procedure.

Reconstructed reference samples used for intra prediction of the target block may include below-left reference samples, left reference samples, an above-left corner reference sample, above reference samples, and above-right reference samples.

For example, the left reference samples may mean reconstructed reference pixels adjacent to the left side of the target block. The above reference samples may mean reconstructed reference pixels adjacent to the top of the target block. The above-left corner reference sample may mean a reconstructed reference pixel located at the above-left corner of the target block. The below-left reference samples may mean reference samples located below a left sample line composed of the left reference samples, among samples located on the same line as the left sample line. The above-right reference samples may mean reference samples located to the right of an above sample line composed of the above reference samples, among samples located on the same line as the above sample line.

When the size of a target block is N×N, the numbers of the below-left reference samples, the left reference samples, the above reference samples, and the above-right reference samples may each be N.

By performing intra prediction on the target block, a prediction block may be generated. The generation of the prediction block may include the determination of the values of pixels in the prediction block. The sizes of the target block and the prediction block may be equal.

The reference samples used for intra prediction of the target block may vary depending on the intra prediction mode of the target block. The direction of the intra prediction mode may represent a dependence relationship between the reference samples and the pixels of the prediction block. For example, the value of a specified reference sample may be used as the values of one or more specified pixels in the prediction block. In this case, the specified reference sample and the one or more specified pixels in the prediction block may be the sample and pixels which are positioned in a straight line in the direction of an intra prediction mode. In other words, the value of the specified reference sample may be copied as the value of a pixel located in a direction reverse to the direction of the intra prediction mode. Alternatively, the value of a pixel in the prediction block may be the value of a reference sample located in the direction of the intra prediction mode with respect to the location of the pixel.

In an example, when the intra prediction mode of a target block is a vertical mode, the above reference samples may be used for intra prediction. When the intra prediction mode is the vertical mode, the value of a pixel in the prediction block may be the value of a reference sample vertically located above the location of the pixel. Therefore, the above reference samples adjacent to the top of the target block may be used for intra prediction. Furthermore, the values of pixels in one row of the prediction block may be identical to those of the above reference samples.

In an example, when the intra prediction mode of a target block is a horizontal mode, the left reference samples may be used for intra prediction. When the intra prediction mode is the horizontal mode, the value of a pixel in the prediction block may be the value of a reference sample horizontally located left to the location of the pixel. Therefore, the left reference samples adjacent to the left of the target block may be used for intra prediction. Furthermore, the values of pixels in one column of the prediction block may be identical to those of the left reference samples.

In an example, when the mode value of the intra prediction mode of the current block is 34, at least some of the left reference samples, the above-left corner reference sample, and at least some of the above reference samples may be used for intra prediction. When the mode value of the intra prediction mode is 18, the value of a pixel in the prediction block may be the value of a reference sample diagonally located at the above-left corner of the pixel.

Further, At least a part of the above-right reference samples may be used for intra prediction in a case that an intra prediction mode of which a mode value is a value ranging from 52 to 66.

Further, At least a part of the below-left reference samples may be used for intra prediction in a case that an intra prediction mode of which a mode value is a value ranging from 2 to 17.

Further, the above-left corner reference sample may be used for intra prediction in a case that a intra prediction mode of which a mode value is a value ranging from 19 to 49.

The number of reference samples used to determine the pixel value of one pixel in the prediction block may be either 1, or 2 or more.

As described above, the pixel value of a pixel in the prediction block may be determined depending on the location of the pixel and the location of a reference sample indicated by the direction of the intra prediction mode. When the location of the pixel and the location of the reference sample indicated by the direction of the intra prediction mode are integer positions, the value of one reference sample indicated by an integer position may be used to determine the pixel value of the pixel in the prediction block.

When the location of the pixel and the location of the reference sample indicated by the direction of the intra prediction mode are not integer positions, an interpolated reference sample based on two reference samples closest to the location of the reference sample may be generated. The value of the interpolated reference sample may be used to determine the pixel value of the pixel in the prediction block. In other words, when the location of the pixel in the prediction block and the location of the reference sample indicated by the direction of the intra prediction mode indicate the location between two reference samples, an interpolated value based on the values of the two samples may be generated.

The prediction block generated via prediction may not be identical to an original target block. In other words, there may be a prediction error which is the difference between the target block and the prediction block, and there may also be a prediction error between the pixel of the target block and the pixel of the prediction block.

Hereinafter, the terms "difference", "error", and "residual" may be used to have the same meaning, and may be used interchangeably with each other.

For example, in the case of directional intra prediction, the longer the distance between the pixel of the prediction block and the reference sample, the greater the prediction error that may occur. Such a prediction error may result in discontinuity between the generated prediction block and neighbor blocks.

In order to reduce the prediction error, filtering for the prediction block may be used. Filtering may be configured to adaptively apply a filter to an area, regarded as having a large prediction error, in the prediction block. For example, the area regarded as having a large prediction error may be the boundary of the prediction block. Further, an area regarded as having a large prediction error in the prediction block may differ depending on the intra prediction mode, and the characteristics of filters may also differ depending thereon.

As illustrated in FIG. 8, for intra prediction of a target block, at least one of reference line 0 to reference line 3 may be used. Each reference line may indicate a reference sample line. As the number of the reference line is lower, a line of reference samples closer to a target block may be indicated.

Samples in segment A and segment F may be acquired through padding that uses samples closest to the target block in segment B and segment E instead of being acquired from reconstructed neighbor blocks.

Index information indicating a reference sample line to be used for intra prediction of the target block may be signaled. The index information may indicate a reference sample line to be used for intra prediction of the target block, among multiple reference sample lines. For example, the index information may have a value corresponding to any one of 0 to 3.

When the top boundary of the target block is the boundary of a CTU, only reference sample line 0 may be available. Therefore, in this case, index information may not be signaled. When an additional reference sample line other than reference sample line 0 is used, filtering of a prediction block, which will be described later, may not be performed.

In the case of inter-color intra prediction, a prediction block for a target block of a second color component may be generated based on the corresponding reconstructed block of a first color component.

For example, the first color component may be a luma component, and the second color component may be a chroma component.

In order to perform inter-color intra prediction, parameters for a linear model between the first color component and the second color component may be derived based on a template.

The template may include reference samples above the target block (above reference samples) and/or reference samples to the left of the target block (left reference samples), and may include above reference samples and/or left reference samples of a reconstructed block of the first color component, which correspond to the reference samples.

For example, parameters for a linear model may be derived using 1) the value of the sample of a first color component having the maximum value, among the samples in the template, 2) the value of the sample of a second color component corresponding to the sample of the first color component, 3) the value of the sample of a first color component having the minimum value, among the samples in the template, and 4) the value of the sample of a second color component corresponding to the sample of the first color component.

When the parameters for the linear model are derived, a prediction block for the target block may be generated by applying the corresponding reconstructed block to the linear model.

Depending on the image format, sub-sampling may be performed on samples neighbor the reconstructed block of the first color component and the corresponding reconstructed block of the first color component. For example, when one sample of the second color component corresponds to four samples of the first color component, one corresponding sample may be calculated by performing sub-sampling on the four samples of the first color component. When sub-sampling is performed, derivation of the parameters for the linear model and inter-color intra prediction may be performed based on the sub-sampled corresponding sample.

Information about whether inter-color intra prediction is performed and/or the range of the template may be signaled in an intra prediction mode.

The target block may be partitioned into two or four sub-blocks in a horizontal direction and/or a vertical direction.

The sub-blocks resulting from the partitioning may be sequentially reconstructed. That is, as intra prediction is performed on each sub-block, a sub-prediction block for the sub-block may be generated. Also, as dequantization (inverse quantization) and/or an inverse transform are performed on each sub-block, a sub-residual block for the corresponding sub-block may be generated. A reconstructed sub-block may be generated by adding the sub-prediction block to the sub-residual block. The reconstructed sub-block may be used as a reference sample for intra prediction of the sub-block having the next priority.

A sub-block may be a block including a specific number (e.g., 16) of samples or more. For example, when the target block is an 8×4 block or a 4×8 block, the target block may be partitioned into two sub-blocks. Also, when the target block is a 4×4 block, the target block cannot be partitioned into sub-blocks. When the target block has another size, the target block may be partitioned into four sub-blocks.

Information about whether intra prediction based on such sub-blocks is performed and/or information about a partition direction (horizontal direction or vertical direction) may be signaled.

Such sub-block-based intra prediction may be limited such that it is performed only when reference sample line 0 is used. When sub-block-based intra prediction is performed, filtering of a prediction block, which will be described below, may not be performed.

A final prediction block may be generated by performing filtering on the prediction block generated via intra prediction.

Filtering may be performed by applying specific weights to a filtering target sample, which is the target to be filtered, a left reference sample, an above reference sample, and/or an above-left reference sample.

The weights and/or reference samples (e.g., the range of reference samples, the locations of the reference samples, etc.) used for filtering may be determined based on at least one of a block size, an intra prediction mode, and the location of the filtering target sample in a prediction block.

For example, filtering may be performed only in a specific intra prediction mode (e.g., DC mode, planar mode, vertical mode, horizontal mode, diagonal mode and/or adjacent diagonal mode).

The adjacent diagonal mode may be a mode having a number obtained by adding k to the number of the diagonal mode, and may be a mode having a number obtained by subtracting k from the number of the diagonal mode. In other words, the number of the adjacent diagonal mode may be the sum of the number of the diagonal mode and k, or may be the difference between the number of the diagonal mode and k. For example, k may be a positive integer of 8 or less.

The intra prediction mode of the target block may be derived using the intra prediction mode of a neighbor block present near the target block, and such a derived intra prediction mode may be entropy-encoded and/or entropy-decoded.

For example, when the intra prediction mode of the target block is identical to the intra prediction mode of the neighbor block, information indicating that the intra prediction mode of the target block is identical to the intra prediction mode of the neighbor block may be signaled using specific flag information.

Further, for example, indicator information for a neighbor block having an intra prediction mode identical to the intra prediction mode of the target block, among intra prediction modes of multiple neighbor blocks, may be signaled.

For example, when the intra prediction mode of the target block is different from the intra prediction mode of the neighbor block, entropy encoding and/or entropy decoding may be performed on information about the intra prediction mode of the target block by performing entropy encoding and/or entropy decoding based on the intra prediction mode of the neighbor block.

Figure 9:
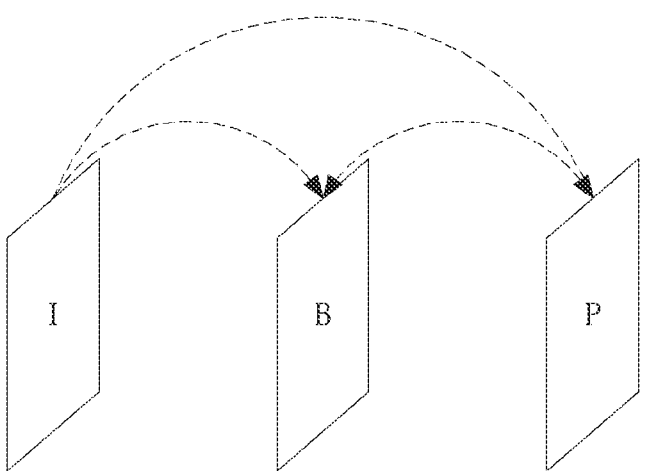
FIG. 9 is a diagram for explaining an embodiment of an inter prediction procedure.

FIG. 9 is a diagram for explaining an embodiment of an inter prediction procedure.

The rectangles shown in FIG. 9 may represent images (or pictures). Further, in FIG. 9, arrows may represent prediction directions. An arrow pointing from a first picture to a second picture means that the second picture refers to the first picture. That is, each image may be encoded and/or decoded depending on the prediction direction.

Images may be classified into an Intra Picture (I picture), a Uni-prediction Picture or Predictive Coded Picture (P picture), and a Bi-prediction Picture or Bi-predictive Coded Picture (B picture) depending on the encoding type. Each picture may be encoded and/or decoded depending on the encoding type thereof.

When a target image that is the target to be encoded is an I picture, the target image may be encoded using data contained in the image itself without inter prediction that refers to other images. For example, an I picture may be encoded only via intra prediction.

When a target image is a P picture, the target image may be encoded via inter prediction, which uses reference pictures existing in one direction. Here, the one direction may be a forward direction or a backward direction.

When a target image is a B picture, the image may be encoded via inter prediction that uses reference pictures existing in two directions, or may be encoded via inter prediction that uses reference pictures existing in one of a forward direction and a backward direction. Here, the two directions may be the forward direction and the backward direction.

A P picture and a B picture that are encoded and/or decoded using reference pictures may be regarded as images in which inter prediction is used.

Below, inter prediction in an inter mode according to an embodiment will be described in detail.

Inter prediction or a motion compensation may be performed using a reference image and motion information.

In an inter mode, the encoding apparatus 100 may perform inter prediction and/or motion compensation on a target block. The decoding apparatus 200 may perform inter prediction and/or motion compensation, corresponding to inter prediction and/or motion compensation performed by the encoding apparatus 100, on a target block.

Motion information of the target block may be individually derived by the encoding apparatus 100 and the decoding apparatus 200 during the inter prediction. The motion information may be derived using motion information of a reconstructed neighbor block, motion information of a col block, and/or motion information of a block adjacent to the col block.

For example, the encoding apparatus 100 or the decoding apparatus 200 may perform prediction and/or motion compensation by using motion information of a spatial candidate and/or a temporal candidate as motion information of the target block. The target block may mean a PU and/or a PU partition.

A spatial candidate may be a reconstructed block which is spatially adjacent to the target block.

A temporal candidate may be a reconstructed block corresponding to the target block in a previously reconstructed co-located picture (col picture).

In inter prediction, the encoding apparatus 100 and the decoding apparatus 200 may improve encoding efficiency and decoding efficiency by utilizing the motion information of a spatial candidate and/or a temporal candidate. The motion information of a spatial candidate may be referred to as 'spatial motion information'. The motion information of a temporal candidate may be referred to as 'temporal motion information'.

Below, the motion information of a spatial candidate may be the motion information of a PU including the spatial candidate. The motion information of a temporal candidate may be the motion information of a PU including the temporal candidate. The motion information of a candidate block may be the motion information of a PU including the candidate block.

Inter prediction may be performed using a reference picture.

The reference picture may be at least one of a picture previous to a target picture and a picture subsequent to the target picture. The reference picture may be an image used for the prediction of the target block.

In inter prediction, a region in the reference picture may be specified by utilizing a reference picture index (or refIdx) for indicating a reference picture, a motion vector, which will be described later, etc. Here, the region specified in the reference picture may indicate a reference block.

Inter prediction may select a reference picture, and may also select a reference block corresponding to the target block from the reference picture. Further, inter prediction may generate a prediction block for the target block using the selected reference block.

The motion information may be derived during inter prediction by each of the encoding apparatus 100 and the decoding apparatus 200.

A spatial candidate may be a block 1) which is present in a target picture, 2) which has been previously reconstructed via encoding and/or decoding, and 3) which is adjacent to the target block or is located at the corner of the target block. Here, the "block located at the corner of the target block" may be either a block vertically adjacent to a neighbor block that is horizontally adjacent to the target block, or a block horizontally adjacent to a neighbor block that is vertically adjacent to the target block. Further, "block located at the corner of the target block" may have the same meaning as "block adjacent to the corner of the target block". The meaning of "block located at the corner of the target block" may be included in the meaning of "block adjacent to the target block".

For example, a spatial candidate may be a reconstructed block located to the left of the target block, a reconstructed block located above the target block, a reconstructed block located at the below-left corner of the target block, a reconstructed block located at the above-right corner of the target block, or a reconstructed block located at the above-left corner of the target block.

Each of the encoding apparatus 100 and the decoding apparatus 200 may identify a block present at the location spatially corresponding to the target block in a col picture. The location of the target block in the target picture and the location of the identified block in the col picture may correspond to each other.

Each of the encoding apparatus 100 and the decoding apparatus 200 may determine a col block present at the predefined relative location for the identified block to be a temporal candidate. The predefined relative location may be a location present inside and/or outside the identified block.

For example, the col block may include a first col block and a second col block. When the coordinates of the identified block are (xP, yP) and the size of the identified block is represented by (nPSW, nPSH), the first col block may be a block located at coordinates (xP+nPSW, yP+nPSH). The second col block may be a block located at coordinates (xP+(nPSW>>1), yP+(nPSH>>1)). The second col block may be selectively used when the first col block is unavailable.

The motion vector of the target block may be determined based on the motion vector of the col block. Each of the encoding apparatus 100 and the decoding apparatus 200 may scale the motion vector of the col block. The scaled motion vector of the col block may be used as the motion vector of the target block. Further, a motion vector for the motion information of a temporal candidate stored in a list may be a scaled motion vector.

The ratio of the motion vector of the target block to the motion vector of the col block may be identical to the ratio of a first temporal distance to a second temporal distance. The first temporal distance may be the distance between the reference picture and the target picture of the target block. The second temporal distance may be the distance between the reference picture and the col picture of the col block.

The scheme for deriving motion information may change depending on the inter prediction mode of a target block. For example, as inter prediction modes applied for inter prediction, an Advanced Motion Vector Predictor (AMVP) mode, a merge mode, a skip mode, a merge mode with a motion vector difference, a sub block merge mode, a triangle partition mode, an inter-intra combined prediction mode, an affine inter mode, a current picture reference mode, etc. may be present. The merge mode may also be referred to as a "motion merge mode". Individual modes will be described in detail below.

1) AMVP Mode

When an AMVP mode is used, the encoding apparatus 100 may search a neighbor region of a target block for a similar block. The encoding apparatus 100 may acquire a prediction block by performing prediction on the target block using motion information of the found similar block. The encoding apparatus 100 may encode a residual block, which is the difference between the target block and the prediction block.

1-1) Creation of List of Prediction Motion Vector Candidates

When an AMVP mode is used as the prediction mode, each of the encoding apparatus 100 and the decoding apparatus 200 may create a list of prediction motion vector candidates using the motion vector of a spatial candidate, the motion vector of a temporal candidate, and a zero vector. The prediction motion vector candidate list may include one or more prediction motion vector candidates. At least one of the motion vector of a spatial candidate, the motion vector of a temporal candidate, and a zero vector may be determined and used as a prediction motion vector candidate.

Hereinafter, the terms "prediction motion vector (candidate)" and "motion vector (candidate)" may be used to have the same meaning, and may be used interchangeably with each other.

Hereinafter, the terms "prediction motion vector candidate" and "AMVP candidate" may be used to have the same meaning, and may be used interchangeably with each other.

Hereinafter, the terms "prediction motion vector candidate list" and "AMVP candidate list" may be used to have the same meaning, and may be used interchangeably with each other.

Spatial candidates may include a reconstructed spatial neighbor block. In other words, the motion vector of the reconstructed neighbor block may be referred to as a "spatial prediction motion vector candidate".

Temporal candidates may include a col block and a block adjacent to the col block. In other words, the motion vector of the col block or the motion vector of the block adjacent to the col block may be referred to as a "temporal prediction motion vector candidate".

The zero vector may be a (0, 0) motion vector.

The prediction motion vector candidates may be motion vector predictors for predicting a motion vector. Also, in the encoding apparatus 100, each prediction motion vector candidate may be an initial search location for a motion vector.

1-2) Search for Motion Vectors that Use List of Prediction Motion Vector Candidates The encoding apparatus 100 may determine the motion vector to be used to encode a target block within a search range using a list of prediction motion vector candidates. Further, the encoding apparatus 100 may determine a prediction motion vector candidate to be used as the prediction motion vector of the target block, among prediction motion vector candidates present in the prediction motion vector candidate list.

The motion vector to be used to encode the target block may be a motion vector that can be encoded at minimum cost.

Further, the encoding apparatus 100 may determine whether to use the AMVP mode to encode the target block.

1-3) Transmission of Inter Prediction Information

The encoding apparatus 100 may generate a bitstream including inter prediction information required for inter prediction. The decoding apparatus 200 may perform inter prediction on the target block using the inter prediction information of the bitstream.

The inter prediction information may contain 1) mode information indicating whether an AMVP mode is used, 2) a prediction motion vector index, 3) a Motion Vector Difference (MVD), 4) a reference direction, and 5) a reference picture index.

Hereinafter, the terms "prediction motion vector index" and "AMVP index" may be used to have the same meaning, and may be used interchangeably with each other.

Further, the inter prediction information may contain a residual signal.

The decoding apparatus 200 may acquire a prediction motion vector index, an MVD, a reference direction, and a reference picture index from the bitstream through entropy decoding when mode information indicates that the AMVP mode is used.

The prediction motion vector index may indicate a prediction motion vector candidate to be used for the prediction of a target block, among prediction motion vector candidates included in the prediction motion vector candidate list.

1-4) Inter Prediction in AMVP Mode that Uses Inter Prediction Information

The decoding apparatus 200 may derive prediction motion vector candidates using a prediction motion vector candidate list, and may determine the motion information of a target block based on the derived prediction motion vector candidates.

The decoding apparatus 200 may determine a motion vector candidate for the target block, among the prediction motion vector candidates included in the prediction motion vector candidate list, using a prediction motion vector index. The decoding apparatus 200 may select a prediction motion vector candidate, indicated by the prediction motion vector index, from among prediction motion vector candidates included in the prediction motion vector candidate list, as the prediction motion vector of the target block.

The encoding apparatus 100 may generate an entropy-encoded prediction motion vector index by applying entropy encoding to a prediction motion vector index, and may generate a bitstream including the entropy-encoded prediction motion vector index. The entropy-encoded prediction motion vector index may be signaled from the encoding apparatus 100 to the decoding apparatus 200 through a bitstream. The decoding apparatus 200 may extract the entropy-encoded prediction motion vector index from the bitstream, and may acquire the prediction motion vector index by applying entropy decoding to the entropy-encoded prediction motion vector index.

The motion vector to be actually used for inter prediction of the target block may not match the prediction motion vector. In order to indicate the difference between the motion vector to be actually used for inter prediction of the target block and the prediction motion vector, an MVD may be used. The encoding apparatus 100 may derive a prediction motion vector similar to the motion vector to be actually used for inter prediction of the target block so as to use an MVD that is as small as possible.

A MVD may be the difference between the motion vector of the target block and the prediction motion vector. The encoding apparatus 100 may calculate the MVD, and may generate an entropy-encoded MVD by applying entropy encoding to the MVD. The encoding apparatus 100 may generate a bitstream including the entropy-encoded MVD.

The MVD may be transmitted from the encoding apparatus 100 to the decoding apparatus 200 through the bitstream. The decoding apparatus 200 may extract the entropy-encoded MVD from the bitstream, and may acquire the MVD by applying entropy decoding to the entropy-encoded MVD.

The decoding apparatus 200 may derive the motion vector of the target block by summing the MVD and the prediction motion vector. In other words, the motion vector of the target block derived by the decoding apparatus 200 may be the sum of the MVD and the motion vector candidate.

Also, the encoding apparatus 100 may generate entropy-encoded MVD resolution information by applying entropy encoding to calculated MVD resolution information, and may generate a bitstream including the entropy-encoded MVD resolution information. The decoding apparatus 200 may extract the entropy-encoded MVD resolution information from the bitstream, and may acquire MVD resolution information by applying entropy decoding to the entropy-encoded MVD resolution information. The decoding apparatus 200 may adjust the resolution of the MVD using the MVD resolution information.

Meanwhile, the encoding apparatus 100 may calculate an MVD based on an affine model. The decoding apparatus 200 may derive the affine control motion vector of the target block through the sum of the MVD and an affine control motion vector candidate, and may derive the motion vector of a sub-block using the affine control motion vector.

The reference direction may indicate a list of reference pictures to be used for prediction of the target block. For example, the reference direction may indicate one of a reference picture list L0 and a reference picture list L1.

The reference direction merely indicates the reference picture list to be used for prediction of the target block, and may not mean that the directions of reference pictures are limited to a forward direction or a backward direction. In other words, each of the reference picture list L0 and the reference picture list L1 may include pictures in a forward direction and/or a backward direction.

That the reference direction is unidirectional may mean that a single reference picture list is used. That the reference direction is bidirectional may mean that two reference picture lists are used. In other words, the reference direction may indicate one of the case where only the reference picture list L0 is used, the case where only the reference picture list L1 is used, and the case where two reference picture lists are used.

The reference picture index may indicate a reference picture that is used for prediction of the target block, among reference pictures present in a reference picture list. The encoding apparatus 100 may generate an entropy-encoded reference picture index by applying entropy encoding to the reference picture index, and may generate a bitstream including the entropy-encoded reference picture index. The entropy-encoded reference picture index may be signaled from the encoding apparatus 100 to the decoding apparatus 200 through the bitstream. The decoding apparatus 200 may extract the entropy-encoded reference picture index from the bitstream, and may acquire the reference picture index by applying entropy decoding to the entropy-encoded reference picture index.

When two reference picture lists are used to predict the target block, a single reference picture index and a single motion vector may be used for each of the reference picture lists. Further, when two reference picture lists are used to predict the target block, two prediction blocks may be specified for the target block. For example, the (final) prediction block of the target block may be generated using the average or weighted sum of the two prediction blocks for the target block.

The motion vector of the target block may be derived by the prediction motion vector index, the MVD, the reference direction, and the reference picture index.

The decoding apparatus 200 may generate a prediction block for the target block based on the derived motion vector and the reference picture index. For example, the prediction block may be a reference block, indicated by the derived motion vector, in the reference picture indicated by the reference picture index.

Since the prediction motion vector index and the MVD are encoded without the motion vector itself of the target block being encoded, the number of bits transmitted from the encoding apparatus 100 to the decoding apparatus 200 may be decreased, and encoding efficiency may be improved.

For the target block, the motion information of reconstructed neighbor blocks may be used. In a specific inter prediction mode, the encoding apparatus 100 may not separately encode the actual motion information of the target block. The motion information of the target block is not encoded, and additional information that enables the motion information of the target block to be derived using the motion information of reconstructed neighbor blocks may be encoded instead. As the additional information is encoded, the number of bits transmitted to the decoding apparatus 200 may be decreased, and encoding efficiency may be improved.

For example, as inter prediction modes in which the motion information of the target block is not directly encoded, there may be a skip mode and/or a merge mode. Here, each of the encoding apparatus 100 and the decoding apparatus 200 may use an identifier and/or an index that indicates a unit, the motion information of which is to be used as the motion information of the target unit, among reconstructed neighbor units.

2) Merge Mode

As a scheme for deriving the motion information of a target block, there is merging. The term "merging" may mean the merging of the motion of multiple blocks. "Merging" may mean that the motion information of one block is also applied to other blocks. In other words, a merge mode may be a mode in which the motion information of the target block is derived from the motion information of a neighbor block.

When a merge mode is used, the encoding apparatus 100 may predict the motion information of a target block using the motion information of a spatial candidate and/or the motion information of a temporal candidate. The spatial candidate may include a reconstructed spatial neighbor block that is spatially adjacent to the target block. The spatial neighbor block may include a left neighbor block and an above neighbor block. The temporal candidate may include a col block. The terms "spatial candidate" and "spatial merge candidate" may be used to have the same meaning, and may be used interchangeably with each other. The terms "temporal candidate" and "temporal merge candidate" may be used to have the same meaning, and may be used interchangeably with each other.

The encoding apparatus 100 may acquire a prediction block via prediction. The encoding apparatus 100 may encode a residual block, which is the difference between the target block and the prediction block.

2-1) Creation of Merge Candidate List

When the merge mode is used, each of the encoding apparatus 100 and the decoding apparatus 200 may create a merge candidate list using the motion information of a spatial candidate and/or the motion information of a temporal candidate. The motion information may include 1) a motion vector, 2) a reference picture index, and 3) a reference direction. The reference direction may be unidirectional or bidirectional. The reference direction may mean a inter prediction indicator.

The merge candidate list may include merge candidates. The merge candidates may be motion information. In other words, the merge candidate list may be a list in which pieces of motion information are stored.

The merge candidates may be pieces of motion information of temporal candidates and/or spatial candidates. In other words, the merge candidates list may comprise motion information of a temporal candidates and/or spatial candidates, etc.

Further, the merge candidate list may include new merge candidates generated by a combination of merge candidates that are already present in the merge candidate list. In other words, the merge candidate list may include new motion information generated by a combination of pieces of motion information previously present in the merge candidate list.

Also, a merge candidate list may include history-based merge candidates. The history-based merge candidates may be the motion information of a block which is encoded and/or decoded prior to a target block.

Also, a merge candidate list may include a merge candidate based on an average of two merge candidates.

The merge candidates may be specific modes deriving inter prediction information. The merge candidate may be information indicating a specific mode deriving inter prediction information. Inter prediction information of a target block may be derived according to a specific mode which the merge candidate indicates. Furthermore, the specific mode may include a process of deriving a series of inter prediction information. This specific mode may be an inter prediction information derivation mode or a motion information derivation mode.

The inter prediction information of the target block may be derived according to the mode indicated by the merge candidate selected by the merge index among the merge candidates in the merge candidate list.

For example, the motion information derivation modes in the merge candidate list may be at least one of 1) motion information derivation mode for a sub-block unit and 2) an affine motion information derivation mode.

Furthermore, the merge candidate list may include motion information of a zero vector. The zero vector may also be referred to as a "zero-merge candidate".

In other words, pieces of motion information in the merge candidate list may be at least one of 1) motion information of a spatial candidate, 2) motion information of a temporal candidate, 3) motion information generated by a combination of pieces of motion information previously present in the merge candidate list, and 4) a zero vector.

Motion information may include 1) a motion vector. 2) a reference picture index, and 3) a reference direction. The reference direction may also be referred to as an "inter prediction indicator". The reference direction may be unidirectional or bidirectional. The unidirectional reference direction may indicate L0 prediction or L1 prediction.

The merge candidate list may be created before prediction in the merge mode is performed.

The number of merge candidates in the merge candidate list may be predefined. Each of the encoding apparatus 100 and the decoding apparatus 200 may add merge candidates to the merge candidate list depending on the predefined scheme and predefined priorities so that the merge candidate list has a predefined number of merge candidates. The merge candidate list of the encoding apparatus 100 and the merge candidate list of the decoding apparatus 200 may be made identical to each other using the predefined scheme and the predefined priorities.

Merging may be applied on a CU basis or a PU basis. When merging is performed on a CU basis or a PU basis, the encoding apparatus 100 may transmit a bitstream including predefined information to the decoding apparatus 200. For example, the predefined information may contain 1) information indicating whether to perform merging for individual block partitions, and 2) information about a block with which merging is to be performed, among blocks that are spatial candidates and/or temporal candidates for the target block.

2-2) Search for Motion Vector that Uses Merge Candidate List

The encoding apparatus 100 may determine merge candidates to be used to encode a target block. For example, the encoding apparatus 100 may perform prediction on the target block using merge candidates in the merge candidate list, and may generate residual blocks for the merge candidates. The encoding apparatus 100 may use a merge candidate that incurs the minimum cost in prediction and in the encoding of residual blocks to encode the target block.

Further, the encoding apparatus 100 may determine whether to use a merge mode to encode the target block.

2-3) Transmission of Inter Prediction Information

The encoding apparatus 100 may generate a bitstream that includes inter prediction information required for inter prediction. The encoding apparatus 100 may generate entropy-encoded inter prediction information by performing entropy encoding on inter prediction information, and may transmit a bitstream including the entropy-encoded inter prediction information to the decoding apparatus 200. Through the bitstream, the entropy-encoded inter prediction information may be signaled to the decoding apparatus 200 by the encoding apparatus 100. The decoding apparatus 200 may extract entropy-encoded inter prediction information from the bitstream, and may acquire inter prediction information by applying entropy decoding to the entropy-encoded inter prediction information.

The decoding apparatus 200 may perform inter prediction on the target block using the inter prediction information of the bitstream.

The inter prediction information may contain 1) mode information indicating whether a merge mode is used, 2) a merge index and 3) correction information.

Further, the inter prediction information may contain a residual signal.

The decoding apparatus 200 may acquire the merge index from the bitstream only when the mode information indicates that the merge mode is used.

The mode information may be a merge flag. The unit of the mode information may be a block. Information about the block may include mode information, and the mode information may indicate whether a merge mode is applied to the block.

The merge index may indicate a merge candidate to be used for the prediction of the target block, among merge candidates included in the merge candidate list. Alternatively, the merge index may indicate a block with which the target block is to be merged, among neighbor blocks spatially or temporally adjacent to the target block.

The encoding apparatus 100 may select a merge candidate having the highest encoding performance among the merge candidates included in the merge candidate list and set a value of the merge index to indicate the selected merge candidate.

Correction information may be information used to correct a motion vector. The encoding apparatus 100 may generate correction information. The decoding apparatus 200 may correct the motion vector of a merge candidate selected by a merge index based on the correction information.

The correction information may include at least one of information indicating whether correction is to be performed, correction direction information, and correction size information. A prediction mode in which the motion vector is corrected based on the signaled correction information may be referred to as a "merge mode having a motion vector difference".

2-4) Inter Prediction of Merge Mode that Uses Inter Prediction Information

The decoding apparatus 200 may perform prediction on the target block using the merge candidate indicated by the merge index, among merge candidates included in the merge candidate list.

The motion vector of the target block may be specified by the motion vector, reference picture index, and reference direction of the merge candidate indicated by the merge index.

3) Skip Mode

A skip mode may be a mode in which the motion information of a spatial candidate or the motion information of a temporal candidate is applied to the target block without change. Also, the skip mode may be a mode in which a residual signal is not used. In other words, when the skip mode is used, a reconstructed block may be the same as a prediction block.

The difference between the merge mode and the skip mode lies in whether or not a residual signal is transmitted or used. That is, the skip mode may be similar to the merge mode except that a residual signal is not transmitted or used.

When the skip mode is used, the encoding apparatus 100 may transmit information about a block, the motion information of which is to be used as the motion information of the target block, among blocks that are spatial candidates or temporal candidates, to the decoding apparatus 200 through a bitstream. The encoding apparatus 100 may generate entropy-encoded information by performing entropy encoding on the information, and may signal the entropy-encoded information to the decoding apparatus 200 through a bitstream. The decoding apparatus 200 may extract entropy-encoded information from the bitstream, and may acquire information by applying entropy decoding to the entropy-encoded information.

Further, when the skip mode is used, the encoding apparatus 100 may not transmit other syntax information, such as an MVD, to the decoding apparatus 200. For example, when the skip mode is used, the encoding apparatus 100 may not signal a syntax element related to at least one of an MVD, a coded block flag, and a transform coefficient level to the decoding apparatus 200.

3-1) Creation of Merge Candidate List

The skip mode may also use a merge candidate list. In other words, a merge candidate list may be used both in the merge mode and in the skip mode. In this aspect, the merge candidate list may also be referred to as a "skip candidate list" or a "merge/skip candidate list".

Alternatively, the skip mode may use an additional candidate list different from that of the merge mode. In this case, in the following description, a merge candidate list and a merge candidate may be replaced with a skip candidate list and a skip candidate, respectively.

The merge candidate list may be created before prediction in the skip mode is performed.

3-2) Search for Motion Vector that Uses Merge Candidate List

The encoding apparatus 100 may determine the merge candidates to be used to encode a target block. For example, the encoding apparatus 100 may perform prediction on the target block using the merge candidates in a merge candidate list. The encoding apparatus 100 may use a merge candidate that incurs the minimum cost in prediction to encode the target block.

Further, the encoding apparatus 100 may determine whether to use a skip mode to encode the target block.

3-3) Transmission of Inter Prediction Information

The encoding apparatus 100 may generate a bitstream that includes inter prediction information required for inter prediction. The decoding apparatus 200 may perform inter prediction on the target block using the inter prediction information of the bitstream.

The inter prediction information may include 1) mode information indicating whether a skip mode is used, and 2) a skip index.

The skip index may be identical to the above-described merge index.

When the skip mode is used, the target block may be encoded without using a residual signal. The inter prediction information may not contain a residual signal. Alternatively, the bitstream may not include a residual signal.

The decoding apparatus 200 may acquire a skip index from the bitstream only when the mode information indicates that the skip mode is used. As described above, a merge index and a skip index may be identical to each other. The decoding apparatus 200 may acquire the skip index from the bitstream only when the mode information indicates that the merge mode or the skip mode is used.

The skip index may indicate the merge candidate to be used for the prediction of the target block, among the merge candidates included in the merge candidate list.

3-4) Inter Prediction in Skip Mode that Uses Inter Prediction Information

The decoding apparatus 200 may perform prediction on the target block using a merge candidate indicated by a skip index, among the merge candidates included in a merge candidate list.

The motion vector of the target block may be specified by the motion vector, reference picture index, and reference direction of the merge candidate indicated by the skip index.

4) Current Picture Reference Mode

The current picture reference mode may denote a prediction mode that uses a previously reconstructed region in a target picture to which a target block belongs.

A motion vector for specifying the previously reconstructed region may be used. Whether the target block has been encoded in the current picture reference mode may be determined using the reference picture index of the target block.

A flag or index indicating whether the target block is a block encoded in the current picture reference mode may be signaled by the encoding apparatus 100 to the decoding apparatus 200. Alternatively, whether the target block is a block encoded in the current picture reference mode may be inferred through the reference picture index of the target block.

When the target block is encoded in the current picture reference mode, the target picture may exist at a fixed location or an arbitrary location in a reference picture list for the target block.

For example, the fixed location may be either a location where a value of the reference picture index is 0 or the last location.

When the target picture exists at an arbitrary location in the reference picture list, an additional reference picture index indicating such an arbitrary location may be signaled by the encoding apparatus 100 to the decoding apparatus 200.

5) Sub-Block Merge Mode

A sub-block merge mode may be a mode in which motion information is derived from the sub-block of a CU.

When the sub-block merge mode is applied, a sub-block merge candidate list may be generated using the motion information of a co-located sub-block (col-sub-block) of a target sub-block (i.e., a sub-block-based temporal merge candidate) in a reference image and/or an affine control point motion vector merge candidate.

6) Triangle Partition Mode

In a triangle partition mode, a target block may be partitioned in a diagonal direction, and sub-target blocks resulting from partitioning may be generated. For each sub-target block, motion information of the corresponding sub-target block may be derived, and a prediction sample for each sub-target block may be derived using the derived motion information. A prediction sample for the target block may be derived through a weighted sum of the prediction samples for the sub-target blocks resulting from the partitioning.

7) Combination Inter-Intra Prediction Mode

The combination inter-intra prediction mode may be a mode in which a prediction sample for a target block is derived using a weighted sum of a prediction sample generated via inter prediction and a prediction sample generated via intra prediction.

In the above-described modes, the decoding apparatus 200 may autonomously correct derived motion information. For example, the decoding apparatus 200 may search a specific area for motion information having the minimum sum of Absolute Differences (SAD) based on a reference block indicated by the derived motion information, and may derive the found motion information as corrected motion information.

In the above-described modes, the decoding apparatus 200 may compensate for the prediction sample derived via inter prediction using an optical flow.

In the above-described AMVP mode, merge mode, skip mode, etc., motion information to be used for prediction of the target block may be specified among pieces of motion information in a list using the index information of the list.

In order to improve encoding efficiency, the encoding apparatus 100 may signal only the index of an element that incurs the minimum cost in inter prediction of the target block, among elements in the list. The encoding apparatus 100 may encode the index, and may signal the encoded index.

Therefore, the above-described lists (i.e. the prediction motion vector candidate list and the merge candidate list) must be able to be derived by the encoding apparatus 100 and the decoding apparatus 200 using the same scheme based on the same data. Here, the same data may include a reconstructed picture and a reconstructed block. Further, in order to specify an element using an index, the order of the elements in the list must be fixed.

Figure 10:
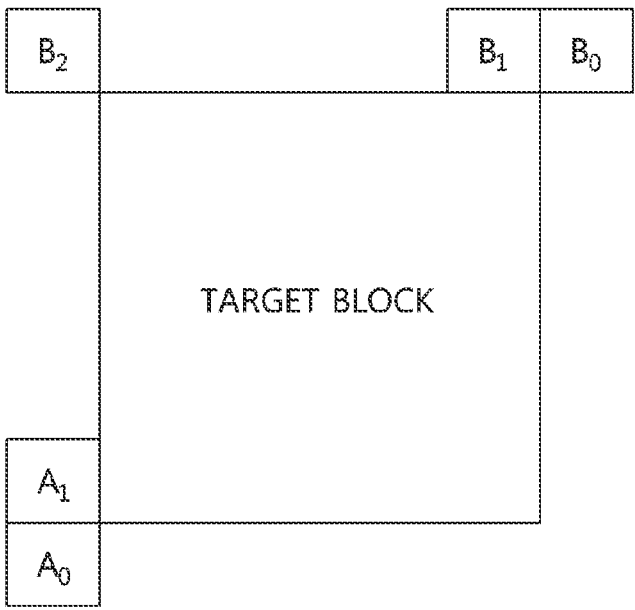
FIG. 10 illustrates spatial candidates according to an embodiment.

FIG. 10 illustrates spatial candidates according to an embodiment.

In FIG. 10, the locations of spatial candidates are illustrated.

The large block in the center of the drawing may denote a target block. Five small blocks may denote spatial candidates.

The coordinates of the target block may be (xP, yP), and the size of the target block may be represented by (nPSW, nPSH).

Spatial candidate $A_0$ may be a block adjacent to the below-left corner of the target block. $A_0$ may be a block that occupies pixels located at coordinates (xP−1, yP+nPSH+1).

Spatial candidate $A_1$ may be a block adjacent to the left of the target block. $A_1$ may be a lowermost block, among blocks adjacent to the left of the target block. Alternatively, $A_1$ may be a block adjacent to the top of $A_0$. $A_1$ may be a block that occupies pixels located at coordinates (xP−1, yP+nPSH).

Spatial candidate $B_0$ may be a block adjacent to the above-right corner of the target block. $B_0$ may be a block that occupies pixels located at coordinates (xP+nPSW+1, yP−1).

Spatial candidate $B_1$ may be a block adjacent to the top of the target block. $B_1$ may be a rightmost block, among blocks adjacent to the top of the target block. Alternatively, $B_1$ may be a block adjacent to the left of $B_0$. $B_1$ may be a block that occupies pixels located at coordinates (xP+nPSW, yP−1).

Spatial candidate $B_2$ may be a block adjacent to the above-left corner of the target block. $B_2$ may be a block that occupies pixels located at coordinates (xP−1, yP−1).

Determination of Availability of Spatial Candidate and Temporal Candidate

In order to include the motion information of a spatial candidate or the motion information of a temporal candidate in a list, it must be determined whether the motion information of the spatial candidate or the motion information of the temporal candidate is available.

Hereinafter, a candidate block may include a spatial candidate and a temporal candidate.

For example, the determination may be performed by sequentially applying the following steps 1) to 4).

Step 1) When a PU including a candidate block is out of the boundary of a picture, the availability of the candidate block may be set to "false". The expression "availability is set to false" may have the same meaning as "set to be unavailable".

Step 2) When a PU including a candidate block is out of the boundary of a slice, the availability of the candidate block may be set to "false". When the target block and the candidate block are located in different slices, the availability of the candidate block may be set to "false".

Step 3) When a PU including a candidate block is out of the boundary of a tile, the availability of the candidate block may be set to "false". When the target block and the candidate block are located in different tiles, the availability of the candidate block may be set to "false".

Step 4) When the prediction mode of a PU including a candidate block is an intra prediction mode, the availability of the candidate block may be set to "false". When a PU including a candidate block does not use inter prediction, the availability of the candidate block may be set to "false".

Figure 11:
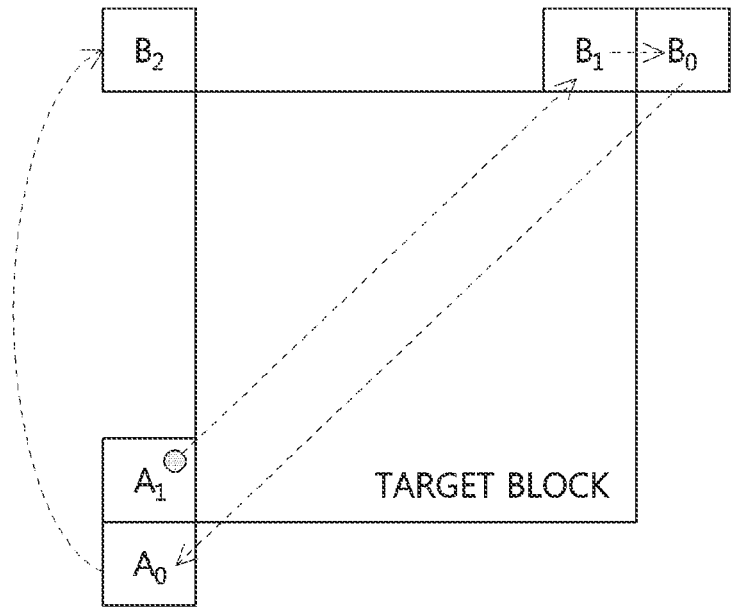
FIG. 11 illustrates the order of addition of motion information of spatial candidates to a merge list according to an embodiment.

FIG. 11 illustrates the order of addition of motion information of spatial candidates to a merge list according to an embodiment.

As shown in FIG. 11, when pieces of motion information of spatial candidates are added to a merge list, the order of $A_1, B_1, B_0, A_0$, and $B_2$ may be used. That is, pieces of motion information of available spatial candidates may be added to the merge list in the order of $A_1$, $B_1$, $B_0$, $A_0$, and $B_2$.

Method for Deriving Merge List in Merge Mode and Skip Mode

As described above, the maximum number of merge candidates in the merge list may be set. The set maximum number is indicated by "N". The set number may be transmitted from the encoding apparatus 100 to the decoding apparatus 200. The slice header of a slice may include N. In other words, the maximum number of merge candidates in the merge list for the target block of the slice may be set by the slice header. For example, the value of N may be basically 5.

Pieces of motion information (i.e., merge candidates) may be added to the merge list in the order of the following steps 1) to 4).

Step 1) Among spatial candidates, available spatial candidates may be added to the merge list. Pieces of motion information of the available spatial candidates may be added to the merge list in the order illustrated in FIG. 10. Here, when the motion information of an available spatial candidate overlaps other motion information already present in the merge list, the motion information may not be added to the merge list. The operation of checking whether the corresponding motion information overlaps other motion information present in the list may be referred to in brief as an "overlap check".

The maximum number of pieces of motion information that are added may be N.

Step 2) When the number of pieces of motion information in the merge list is less than N and a temporal candidate is available, the motion information of the temporal candidate may be added to the merge list. Here, when the motion information of the available temporal candidate overlaps other motion information already present in the merge list, the motion information may not be added to the merge list.

Step 3) When the number of pieces of motion information in the merge list is less than N and the type of a target slice is "B", combined motion information generated by combined bidirectional prediction (bi-prediction) may be added to the merge list.

The target slice may be a slice including a target block.

The combined motion information may be a combination of L0 motion information and L1 motion information. L0 motion information may be motion information that refers only to a reference picture list L0. L1 motion information may be motion information that refers only to a reference picture list L1.

In the merge list, one or more pieces of L0 motion information may be present. Further, in the merge list, one or more pieces of L1 motion information may be present.

The combined motion information may include one or more pieces of combined motion information. When the combined motion information is generated, L0 motion information and L1 motion information, which are to be used for generation, among the one or more pieces of L0 motion information and the one or more pieces of L1 motion information, may be predefined. One or more pieces of combined motion information may be generated in a predefined order via combined bidirectional prediction, which uses a pair of different pieces of motion information in the merge list. One of the pair of different pieces of motion information may be L0 motion information and the other of the pair may be L1 motion information.

For example, combined motion information that is added with the highest priority may be a combination of L0 motion information having a merge index of 0 and L1 motion information having a merge index of 1. When motion information having a merge index of 0 is not L0 motion information or when motion information having a merge index of 1 is not L1 motion information, the combined motion information may be neither generated nor added. Next, the combined motion information that is added with the next priority may be a combination of L0 motion information, having a merge index of 1, and L1 motion information, having a merge index of 0. Subsequent detailed combinations may conform to other combinations of video encoding/decoding fields.

Here, when the combined motion information overlaps other motion information already present in the merge list, the combined motion information may not be added to the merge list.

Step 4) When the number of pieces of motion information in the merge list is less than N, motion information of a zero vector may be added to the merge list.

The zero-vector motion information may be motion information for which the motion vector is a zero vector.

The number of pieces of zero-vector motion information may be one or more. The reference picture indices of one or more pieces of zero-vector motion information may be different from each other. For example, the value of the reference picture index of first zero-vector motion information may be 0. The value of the reference picture index of second zero-vector motion information may be 1.

The number of pieces of zero-vector motion information may be identical to the number of reference pictures in the reference picture list.

The reference direction of zero-vector motion information may be bidirectional. Both of the motion vectors may be zero vectors. The number of pieces of zero-vector motion information may be the smaller one of the number of reference pictures in the reference picture list L0 and the number of reference pictures in the reference picture list L1. Alternatively, when the number of reference pictures in the reference picture list L0 and the number of reference pictures in the reference picture list L1 are different from each other, a reference direction that is unidirectional may be used for a reference picture index that may be applied only to a single reference picture list.

The encoding apparatus 100 and/or the decoding apparatus 200 may sequentially add the zero-vector motion information to the merge list while changing the reference picture index.

When zero-vector motion information overlaps other motion information already present in the merge list, the zero-vector motion information may not be added to the merge list.

The order of the above-described steps 1) to 4) is merely exemplary, and may be changed. Further, some of the above steps may be omitted depending on predefined conditions.

Method for Deriving Prediction Motion Vector Candidate List in AMVP Mode

The maximum number of prediction motion vector candidates in a prediction motion vector candidate list may be predefined. The predefined maximum number is indicated by N. For example, the predefined maximum number may be 2.

Pieces of motion information (i.e. prediction motion vector candidates) may be added to the prediction motion vector candidate list in the order of the following steps 1) to 3).

Step 1) Available spatial candidates, among spatial candidates, may be added to the prediction motion vector candidate list. The spatial candidates may include a first spatial candidate and a second spatial candidate.

The first spatial candidate may be one of $A_0$, $A_1$, scaled $A_0$, and scaled $A_1$. The second spatial candidate may be one of $B_0$, $B_1$, $B_2$, scaled $B_0$, scaled $B_1$, and scaled $B_2$.

Pieces of motion information of available spatial candidates may be added to the prediction motion vector candidate list in the order of the first spatial candidate and the second spatial candidate. In this case, when the motion information of an available spatial candidate overlaps other motion information already present in the prediction motion vector candidate list, the motion information may not be added to the prediction motion vector candidate list. In other words, when the value of N is 2, if the motion information of a second spatial candidate is identical to the motion information of a first spatial candidate, the motion information of the second spatial candidate may not be added to the prediction motion vector candidate list.

The maximum number of pieces of motion information that are added may be N.

Step 2) When the number of pieces of motion information in the prediction motion vector candidate list is less than N and a temporal candidate is available, the motion information of the temporal candidate may be added to the prediction motion vector candidate list. In this case, when the motion information of the available temporal candidate overlaps other motion information already present in the prediction motion vector candidate list, the motion information may not be added to the prediction motion vector candidate list.

Step 3) When the number of pieces of motion information in the prediction motion vector candidate list is less than N, zero-vector motion information may be added to the prediction motion vector candidate list.

The zero-vector motion information may include one or more pieces of zero-vector motion information. The reference picture indices of the one or more pieces of zero-vector motion information may be different from each other.

The encoding apparatus 100 and/or the decoding apparatus 200 may sequentially add pieces of zero-vector motion information to the prediction motion vector candidate list while changing the reference picture index.

When zero-vector motion information overlaps other motion information already present in the prediction motion vector candidate list, the zero-vector motion information may not be added to the prediction motion vector candidate list.

The description of the zero-vector motion information, made above in connection with the merge list, may also be applied to zero-vector motion information. A repeated description thereof will be omitted.

The order of the above-described steps 1) to 3) is merely exemplary, and may be changed. Further, some of the steps may be omitted depending on predefined conditions.

Figure 12:
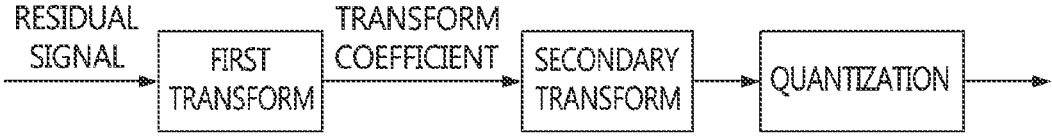
FIG. 12 illustrates a transform and quantization process according to an example.

FIG. 12 illustrates a transform and quantization process according to an example.

As illustrated in FIG. 12, quantized levels may be generated by performing a transform and/or quantization process on a residual signal.

A residual signal may be generated as the difference between an original block and a prediction block. Here, the prediction block may be a block generated via intra prediction or inter prediction.

The residual signal may be transformed into a signal in a frequency domain through a transform procedure that is a part of a quantization procedure.

A transform kernel used for a transform may include various DCT kernels, such as Discrete Cosine Transform (DCT) type 2 (DCT-II) and Discrete Sine Transform (DST) kernels.

These transform kernels may perform a separable transform or a two-dimensional (2D) non-separable transform on the residual signal. The separable transform may be a transform indicating that a one-dimensional (1D) transform is performed on the residual signal in each of a horizontal direction and a vertical direction.

The DCT type and the DST type, which are adaptively used for a 1D transform, may include DCT-V, DCT-VIII, DST-I, and DST-VII in addition to DCT-II, as shown in each of the following Table 3 and the following table 4.

TABLE 3

| Transform set | Transform candidates |
|---|---|
| 0 | DST-VII, DCT-VIII |
| 1 | DST-VII, DST-I |
| 2 | DST-VII, DCT-V |

US 12,652,390 B2

59 / 60

TABLE 4

| Transform set | Transform candidates |
| --- | --- |
| 0 | DST-VII, DCT-VIII, DST-I |
| 1 | DST-VII, DST-I, DCT-VIII |
| 2 | DST-VII, DCT-V, DST-I |

As shown in Table 3 and Table 4, when a DCT type or a DST type to be used for a transform is derived, transform sets may be used. Each transform set may include multiple transform candidates. Each transform candidate may be a DCT type or a DST type.

The following Table 5 shows examples of a transform set to be applied to a horizontal direction and a transform set to be applied to a vertical direction depending on intra prediction modes.

TABLE 5

| Intra prediction mode | 0 | 1 | 2 | 3 | 4 | 5 | 6 | 7 | 8 | 9 |
| --- | --- | --- | --- | --- | --- | --- | --- | --- | --- | --- |
| Vertical transform set | 2 | 1 | 0 | 1 | 0 | 1 | 0 | 1 | 0 | 1 |
| Horizontal transform set | 2 | 1 | 0 | 1 | 0 | 1 | 0 | 1 | 0 | 1 |

| Intra prediction mode | 10 | 11 | 12 | 13 | 14 | 15 | 16 | 17 | 18 | 19 |
| --- | --- | --- | --- | --- | --- | --- | --- | --- | --- | --- |
| Vertical direction transform set | 0 | 1 | 0 | 1 | 0 | 0 | 0 | 0 | 0 | 0 |
| Horizontal direction transform set | 0 | 1 | 0 | 1 | 2 | 2 | 2 | 2 | 2 | 2 |

| Intra prediction mode | 20 | 21 | 22 | 23 | 24 | 25 | 26 | 27 | 28 | 29 |
| --- | --- | --- | --- | --- | --- | --- | --- | --- | --- | --- |
| Vertical direction transform set | 0 | 0 | 0 | 1 | 0 | 1 | 0 | 1 | 0 | 1 |
| Horizontal direction transform set | 2 | 2 | 2 | 1 | 0 | 1 | 0 | 1 | 0 | 1 |

| Intra prediction mode | 30 | 31 | 32 | 33 | 34 | 35 | 36 | 37 | 38 | 39 |
| --- | --- | --- | --- | --- | --- | --- | --- | --- | --- | --- |
| Vertical direction transform set | 0 | 1 | 0 | 1 | 0 | 1 | 0 | 1 | 0 | 1 |
| Horizontal direction transform set | 0 | 1 | 0 | 1 | 0 | 1 | 0 | 1 | 0 | 1 |

| Intra prediction mode | 40 | 41 | 42 | 43 | 44 | 45 | 46 | 47 | 48 | 49 |
| --- | --- | --- | --- | --- | --- | --- | --- | --- | --- | --- |
| Vertical transform set | 0 | 1 | 0 | 1 | 0 | 1 | 2 | 2 | 2 | 2 |
| Horizontal transform set | 0 | 1 | 0 | 1 | 0 | 1 | 0 | 0 | 0 | 0 |

| Intra prediction mode | 50 | 51 | 52 | 53 | 54 | 55 | 56 | 57 | 58 | 59 |
| --- | --- | --- | --- | --- | --- | --- | --- | --- | --- | --- |
| Vertical direction transform set | 2 | 2 | 2 | 2 | 7 | 1 | 0 | 1 | 0 | 1 |
| Horizontal direction transform set | 0 | 0 | 0 | 0 | 0 | 1 | 0 | 1 | 0 | 1 |

TABLE 5-continued

| Intra prediction mode | 60 | 61 | 62 | 63 | 64 | 65 | 66 |
| --- | --- | --- | --- | --- | --- | --- | --- |
| Vertical direction transform set | 0 | 1 | 0 | 1 | 0 | 1 | 0 |
| Horizontal direction transform set | 0 | 1 | 0 | 1 | 0 | 1 | 0 |

In Table 5, numbers of vertical transform sets and horizontal transform sets that are to be applied to the horizontal direction of a residual signal depending on the intra prediction modes of the target block are indicated.

As exemplified in Table 5, transform sets to be applied to the horizontal direction and the vertical direction may be predefined depending on the intra prediction mode of the target block. The encoding apparatus 100) may perform a transform and an inverse transform on the residual signal using a transform included in the transform set corresponding to the intra prediction mode of the target block. Further, the decoding apparatus 200 may perform an inverse transform on the residual signal using a transform included in the transform set corresponding to the intra prediction mode of the target block.

In the transform and inverse transform, transform sets to be applied to the residual signal may be determined, as exemplified in Tables 3, 4, and 5, and may not be signaled. Transform indication information may be signaled from the encoding apparatus 100 to the decoding apparatus 200. The transform indication information may be information indicating which one of multiple transform candidates included in the transform set to be applied to the residual signal is used.

For example, when the size of the target block is 64×64 or less, transform sets, each having three transforms, may be configured depending on the intra prediction modes. An optimal transform method may be selected from among a total of nine multiple transform methods resulting from combinations of three transforms in a horizontal direction and three transforms in a vertical direction. Through such an optimal transform method, the residual signal may be encoded and/or decoded, and thus coding efficiency may be improved.

Here, information indicating which one of transforms belonging to each transform set has been used for at least one of a vertical transform and a horizontal transform may be entropy-encoded and/or -decoded. Here, truncated unary binarization may be used to encode and/or decode such information.

As described above, methods using various transforms may be applied to a residual signal generated via intra prediction or inter prediction.

The transform may include at least one of a first transform and a secondary transform. A transform coefficient may be generated by performing the first transform on the residual signal, and a secondary transform coefficient may be generated by performing the secondary transform on the transform coefficient.

The first transform may be referred to as a "primary transform". Further, the first transform may also be referred to as an "Adaptive Multiple Transform (AMT) scheme". AMT may mean that, as described above, different transforms are applied to respective 1D directions (i.e. a vertical direction and a horizontal direction).

A secondary transform may be a transform for improving energy concentration on a transform coefficient generated by the first transform. Similar to the first transform, the secondary transform may be a separable transform or a non-separable transform. Such a non-separable transform may be a Non-Separable Secondary Transform (NSST).

The first transform may be performed using at least one of predefined multiple transform methods. For example, the predefined multiple transform methods may include a Discrete Cosine Transform (DCT), a Discrete Sine Transform (DST), a Karhunen-Loeve Transform (KLT), etc.

Further, a first transform may be a transform having various types depending on a kernel function that defines a Discrete Cosine Transform (DCT) or a Discrete Sine Transform (DST).

For example, the first transform may include transforms, such as DCT-2, DCT-5, DCT-7, DST-7, DST-L, DST-8, and DCT-8 depending on the transform kernel presented in the following Table 6. In the following Table 6, various transform types and transform kernel functions for Multiple Transform Selection (MTS) are exemplified.

MTS may refer to the selection of combinations of one or more DCT and/or DST kernels so as to transform a residual signal in a horizontal and/or vertical direction.

TABLE 6

| Transform type | Transform kernel function $T_i(j)$ |
|---|---|
| DCT-2 | $$T_i(j) = \omega_0 \cdot \sqrt{\frac{2}{N}} \; - \cos\left(\frac{\pi \cdot i \cdot (2j+1)}{2N}\right)$$ where $$\omega_0 = \sqrt{\frac{2}{N}} \quad (i=0) \text{ or } 1 \text{ (otherwise)}$$ |
| DST-7 | $$T_i(j) = \sqrt{\frac{4}{2N+1}} \cdot \sin\left(\frac{\pi \cdot (2j+1) \cdot (j+1)}{2N+1}\right)$$ |
| DCT-5 | $$T_i(j) = \omega_0 \cdot \omega_1 \cdot \sqrt{\frac{2}{2N-1}} \cdot \cos\left(\frac{2\pi i \cdot j}{2N+1}\right)$$ where $$\omega_{0/1} = \sqrt{\frac{2}{N}} \quad (i \text{ or } j=0) \text{ or } 1 \text{ (otherwise)}$$ |
| DCT-8 | $$T_i(j) = \sqrt{\frac{4}{2N+1}} \cdot \cos\left(\frac{\pi \cdot (2j+1) \cdot (2j+1)}{4N+2}\right)$$ |
| DST-1 | $$T_i(j) = \sqrt{\frac{2}{N+1}} \cdot \sin\left(\frac{\pi \cdot (i+1) \cdot (j+1)}{N+1}\right)$$ |

In Table 6, i and j may be integer values that are equal to or greater than 0 and are less than or equal to N−1.

The secondary transform may be performed on the transform coefficient generated by performing the first transform.

As in the first transform, transform sets may also be defined in a secondary transform. The methods for deriving and/or determining the above-described transform sets may be applied not only to the first transform but also to the secondary transform.

The first transform and the secondary transform may be determined for a specific target.

For example, a first transform and a secondary transform may be applied to signal components corresponding to one or more of a luminance (luma) component and a chrominance (chroma) component. Whether to apply the first transform and/or the secondary transform may be determined depending on at least one of coding parameters for a target block and/or a neighbor block. For example, whether to apply the first transform and/or the secondary transform may be determined depending on the size and/or shape of the target block.

In the encoding apparatus 100 and the decoding apparatus 200, transform information indicating the transform method to be used for the target may be derived by utilizing specified information.

For example, the transform information may include a transform index to be used for a primary transform and/or a secondary transform. Alternatively, the transform information may indicate that a primary transform and/or a secondary transform are not used.

For example, when the target of a primary transform and a secondary transform is a target block, the transform method(s) to be applied to the primary transform and/or the secondary transform indicated by the transform information may be determined depending on at least one of coding parameters for the target block and/or blocks neighbor the target block.

Alternatively, transform information indicating a transform method for a specific target may be signaled from the encoding apparatus 100 to the decoding apparatus 200.

For example, for a single CU, whether to use a primary transform, an index indicating the primary transform, whether to use a secondary transform, and an index indicating the secondary transform may be derived as the transform information by the decoding apparatus 200. Alternatively, for a single CU, the transform information, which indicates whether to use a primary transform, an index indicating the primary transform, whether to use a secondary transform, and an index indicating the secondary transform, may be signaled.

The quantized transform coefficient (i.e. the quantized levels) may be generated by performing quantization on the result, generated by performing the first transform and/or the secondary transform, or on the residual signal.

Figure 13:
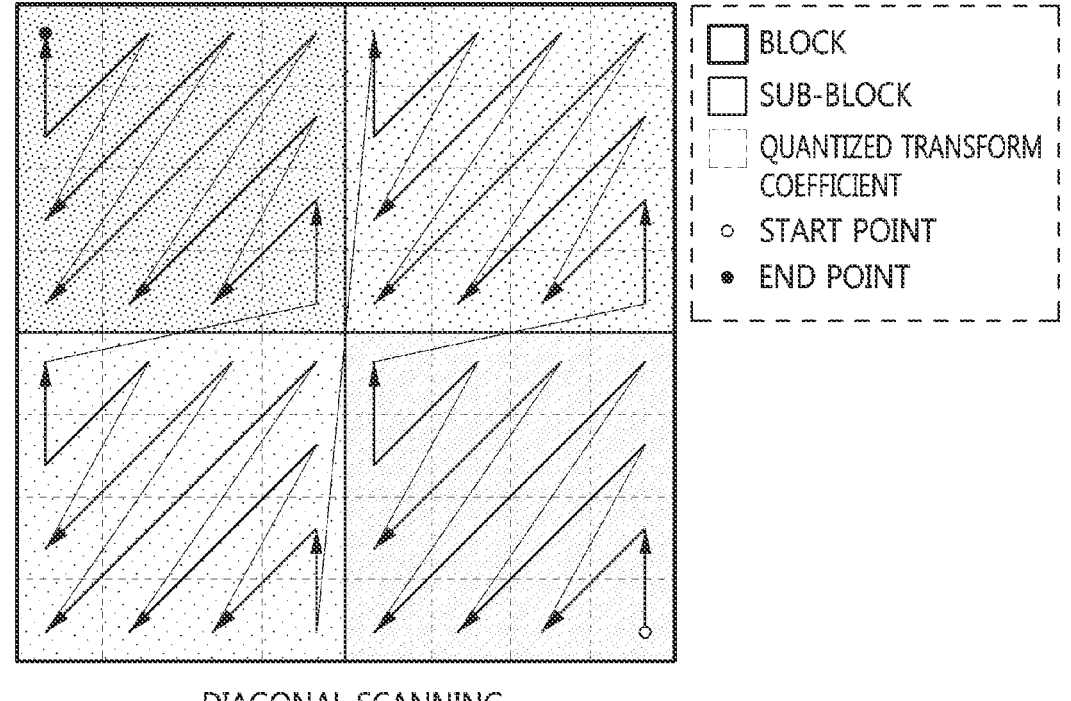
FIG. 13 illustrates diagonal scanning according to an example.

FIG. 13 illustrates diagonal scanning according to an example.

Figure 14:
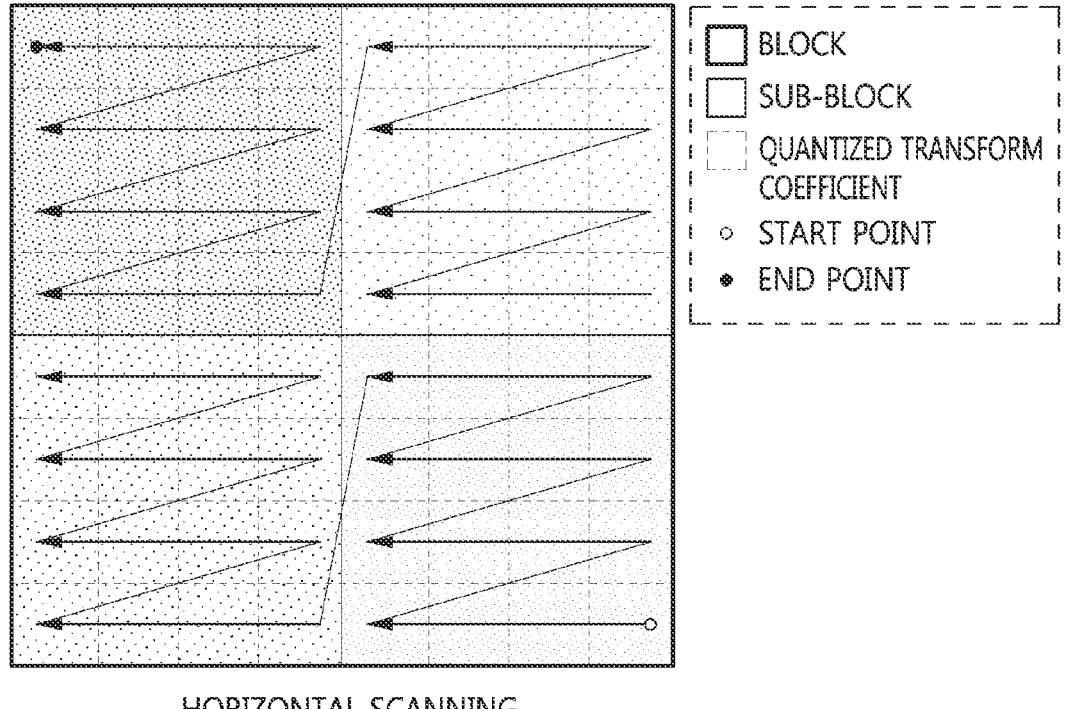
FIG. 14 illustrates horizontal scanning according to an example.

FIG. 14 illustrates horizontal scanning according to an example.

Figure 15:
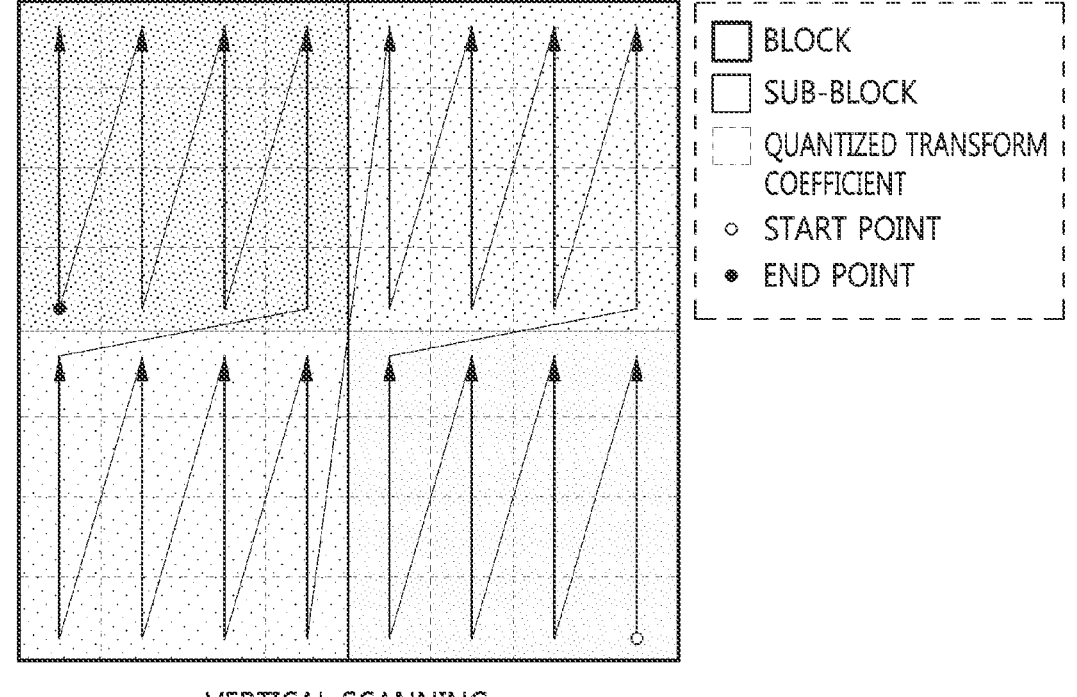
FIG. 15 illustrates vertical scanning according to an example.

FIG. 15 illustrates vertical scanning according to an example.

Quantized transform coefficients may be scanned via at least one of (up-right) diagonal scanning, vertical scanning, and horizontal scanning depending on at least one of an intra prediction mode, a block size, and a block shape. The block may be a Transform Unit (TU).

Each scanning may be initiated at a specific start point, and may be terminated at a specific end point.

For example, quantized transform coefficients may be changed to 1D vector forms by scanning the coefficients of a block using diagonal scanning of FIG. 13. Alternatively, horizontal scanning of FIG. 14 or vertical scanning of FIG. 15, instead of diagonal scanning, may be used depending on the size and/or intra prediction mode of a block.

Vertical scanning may be the operation of scanning 2D block-type coefficients in a column direction. Horizontal scanning may be the operation of scanning 2D block-type coefficients in a row direction.

In other words, which one of diagonal scanning, vertical scanning, and horizontal scanning is to be used may be determined depending on the size and/or inter prediction mode of the block.

As illustrated in FIGS. 13, 14, and 15, the quantized transform coefficients may be scanned along a diagonal direction, a horizontal direction or a vertical direction.

The quantized transform coefficients may be represented by block shapes. Each block may include multiple sub-blocks. Each sub-block may be defined depending on a minimum block size or a minimum block shape.

In scanning, a scanning sequence depending on the type or direction of scanning may be primarily applied to sub-blocks. Further, a scanning sequence depending on the direction of scanning may be applied to quantized transform coefficients in each sub-block.

For example, as illustrated in FIGS. 13, 14, and 15, when the size of a target block is 8×8, quantized transform coefficients may be generated through a first transform, a secondary transform, and quantization on the residual signal of the target block. Therefore, one of three types of scanning sequences may be applied to four 4×4 sub-blocks, and quantized transform coefficients may also be scanned for each 4×4 sub-block depending on the scanning sequence.

The encoding apparatus 100 may generate entropy-encoded quantized transform coefficients by performing entropy encoding on scanned quantized transform coefficients, and may generate a bitstream including the entropy-encoded quantized transform coefficients.

The decoding apparatus 200 may extract the entropy-encoded quantized transform coefficients from the bitstream, and may generate quantized transform coefficients by performing entropy decoding on the entropy-encoded quantized transform coefficients. The quantized transform coefficients may be aligned in the form of a 2D block via inverse scanning. Here, as the method of inverse scanning, at least one of up-right diagonal scanning, vertical scanning, and horizontal scanning may be performed.

In the decoding apparatus 200, dequantization may be performed on the quantized transform coefficients. A secondary inverse transform may be performed on the result generated by performing dequantization depending on whether to perform the secondary inverse transform. Further, a first inverse transform may be performed on the result generated by performing the secondary inverse transform depending on whether the first inverse transform is to be performed. A reconstructed residual signal may be generated by performing the first inverse transform on the result generated by performing the secondary inverse transform.

For a luma component which is reconstructed via intra prediction or inter prediction, inverse mapping having a dynamic range may be performed before in-loop filtering.

The dynamic range may be divided into 16 equal pieces, and mapping functions for respective pieces may be signaled. Such a mapping function may be signaled at a slice level or a tile group level.

An inverse mapping function for performing inverse mapping may be derived based on the mapping function.

In-loop filtering, the storage of a reference picture, and motion compensation may be performed in an inverse mapping area.

A prediction block generated via inter prediction may be changed to a mapped area through mapping using a mapping function, and the changed prediction block may be used to generate a reconstructed block. However, since intra prediction is performed in the mapped area, a prediction block generated via intra prediction may be used to generate a reconstructed block without requiring mapping and/or inverse mapping.

For example, when the target block is a residual block of a chroma component, the residual block may be changed to an inversely mapped area by scaling the chroma component of the mapped area.

Whether scaling is available may be signaled at a slice level or a tile group level.

For example, scaling may be applied only to the case where mapping is available for a luma component and where the partitioning of the luma component and the partitioning of the chroma component follow the same tree structure.

Scaling may be performed based on the average of the values of samples in a luma prediction block, which corresponds to a chroma prediction block. Here, when the target block uses inter prediction, the luma prediction block may mean a mapped luma prediction block.

A value required for scaling may be derived by referring to a look-up table using the index of a piece to which the average of sample values of the luma prediction block belongs.

The residual block may be changed to an inversely mapped area by scaling the residual block using a finally derived value. Thereafter, for the block of a chroma component, reconstruction, intra prediction, inter prediction, in-loop filtering, and the storage of a reference picture may be performed in the inversely mapped area.

For example, information indicating whether the mapping and/or inverse mapping of a luma component and a chroma component are available may be signaled through a sequence parameter set.

A prediction block for the target block may be generated based on a block vector. The block vector may indicate displacement between the target block and a reference block. The reference block may be a block in a target image.

In this way, a prediction mode in which the prediction block is generated by referring to the target image may be referred to as an "Intra-Block Copy (IBC) mode".

An IBC mode may be applied to a CU having a specific size. For example, the IBC mode may be applied to an M×N CU. Here, M and N may be less than or equal to 64.

The IBC mode may include a skip mode, a merge mode, an AMVP mode, etc. In the case of the skip mode or the merge mode, a merge candidate list may be configured, and a merge index is signaled, and thus a single merge candidate may be specified among merge candidates present in the merge candidate list. The block vector of the specified merge candidate may be used as the block vector of the target block.

In the case of the AMVP mode, a differential block vector may be signaled. Also, a prediction block vector may be derived from the left neighbor block and the above neighbor block of the target block. Further, an index indicating which neighbor block is to be used may be signaled.

A prediction block in the IBC mode may be included in a target CTU or a left CTU, and may be limited to a block within a previously reconstructed area. For example, the value of a block vector may be limited so that a prediction block for a target block is located in a specific area. The specific area may be an area defined by three 64×64 blocks that are encoded and/or decoded prior to a 64×64 block including the target block. The value of the block vector is limited in this way, and thus memory consumption and device complexity caused by the implementation of the IBC mode may be decreased.

Figure 16:
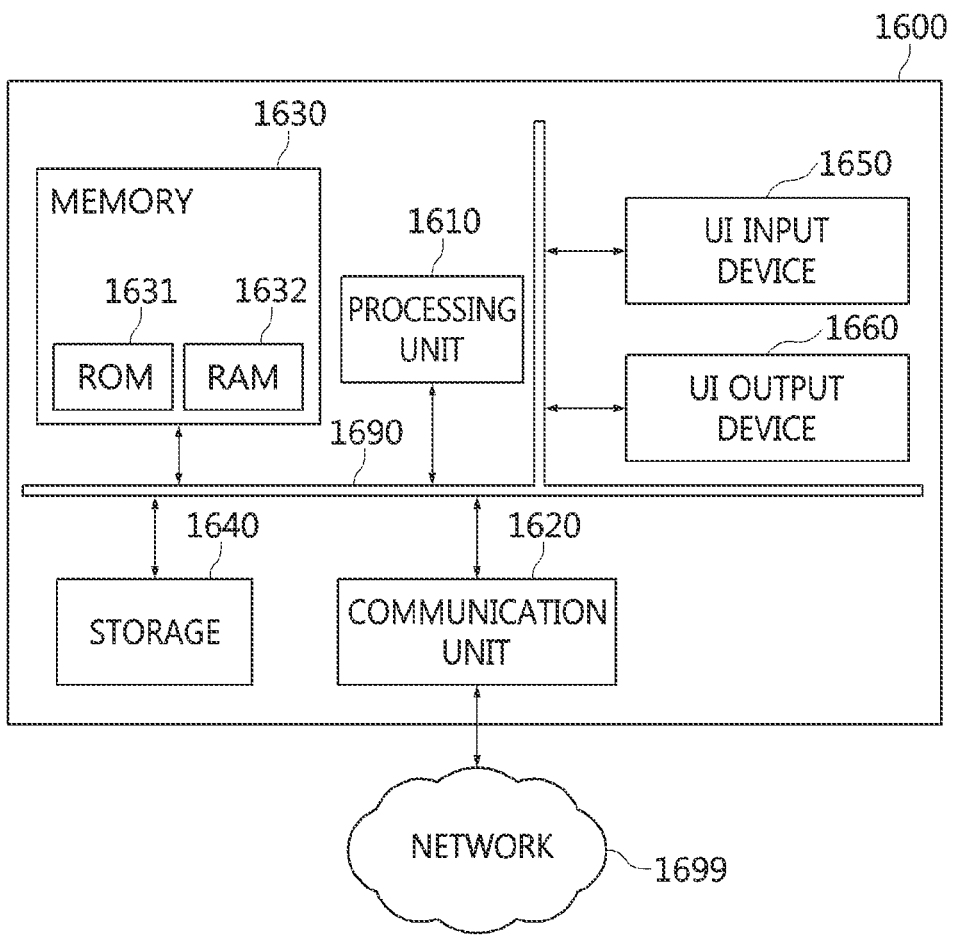
FIG. 16 is a configuration diagram of an encoding apparatus according to an embodiment.

FIG. 16 is a configuration diagram of an encoding apparatus according to an embodiment.

An encoding apparatus 1600 may correspond to the above-described encoding apparatus 100.

The encoding apparatus 1600 may include a processing unit 1610, memory 1630, a user interface (UI) input device 1650, a UI output device 1660, and storage 1640, which communicate with each other through a bus 1690. The encoding apparatus 1600 may further include a communication unit 1620 coupled to a network 1699.

The processing unit 1610 may be a Central Processing Unit (CPU) or a semiconductor device for executing processing instructions stored in the memory 1630 or the storage 1640. The processing unit 1610 may be at least one hardware processor.

The processing unit 1610 may generate and process signals, data or information that are input to the encoding apparatus 1600, are output from the encoding apparatus 1600, or are used in the encoding apparatus 1600, and may perform examination, comparison, determination, etc. related to the signals, data or information. In other words, in embodiments, the generation and processing of data or information and examination, comparison and determination related to data or information may be performed by the processing unit 1610.

The processing unit 1610 may include an inter prediction unit 110, an intra prediction unit 120, a switch 115, a subtractor 125, a transform unit 130, a quantization unit 140, an entropy encoding unit 150, a dequantization unit 160, an inverse transform unit 170, an adder 175, a filter unit 180, and a reference picture buffer 190.

At least some of the inter prediction unit 110, the intra prediction unit 120, the switch 115, the subtractor 125, the transform unit 130, the quantization unit 140, the entropy encoding unit 150, the dequantization unit 160, the inverse transform unit 170, the adder 175, the filter unit 180, and the reference picture buffer 190 may be program modules, and may communicate with an external device or system. The program modules may be included in the encoding apparatus 1600 in the form of an operating system, an application program module, or other program modules.

The program modules may be physically stored in various types of well-known storage devices. Further, at least some of the program modules may also be stored in a remote storage device that is capable of communicating with the encoding apparatus 1200.

The program modules may include, but are not limited to, a routine, a subroutine, a program, an object, a component, and a data structure for performing functions or operations according to an embodiment or for implementing abstract data types according to an embodiment.

The program modules may be implemented using instructions or code executed by at least one processor of the encoding apparatus 1600.

The processing unit 1610 may execute instructions or code in the inter prediction unit 110, the intra prediction unit 120, the switch 115, the subtractor 125, the transform unit 130, the quantization unit 140, the entropy encoding unit 150, the dequantization unit 160, the inverse transform unit 170, the adder 175, the filter unit 180, and the reference picture buffer 190.

A storage unit may denote the memory 1630 and/or the storage 1640. Each of the memory 1630 and the storage 1640 may be any of various types of volatile or nonvolatile storage media. For example, the memory 1630 may include at least one of Read-Only Memory (ROM) 1631 and Random Access Memory (RAM) 1632.

The storage unit may store data or information used for the operation of the encoding apparatus 1600. In an embodiment, the data or information of the encoding apparatus 1600 may be stored in the storage unit.

For example, the storage unit may store pictures, blocks, lists, motion information, inter prediction information, bitstreams, etc.

The encoding apparatus 1600 may be implemented in a computer system including a computer-readable storage medium.

The storage medium may store at least one module required for the operation of the encoding apparatus 1600. The memory 1630 may store at least one module, and may be configured such that the at least one module is executed by the processing unit 1610.

Functions related to communication of the data or information of the encoding apparatus 1600 may be performed through the communication unit 1620.

For example, the communication unit 1620 may transmit a bitstream to a decoding apparatus 1600, which will be described later.

Figure 17:
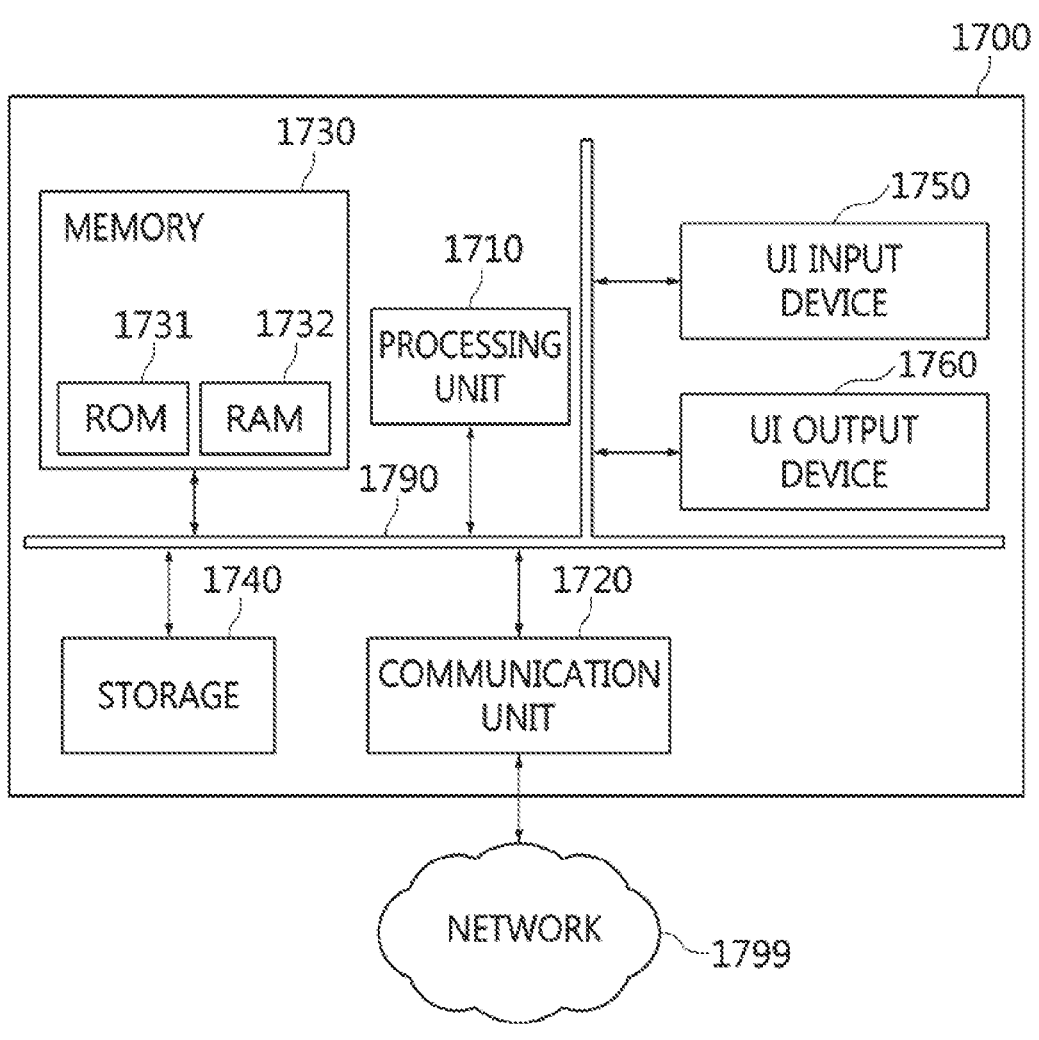
FIG. 17 is a configuration diagram of a decoding apparatus according to an embodiment.

FIG. 17 is a configuration diagram of a decoding apparatus according to an embodiment.

The decoding apparatus 1700 may correspond to the above-described decoding apparatus 200.

The decoding apparatus 1700 may include a processing unit 1710, memory 1730, a user interface (UI) input device 1750, a UI output device 1760, and storage 1740, which communicate with each other through a bus 1790. The decoding apparatus 1700 may further include a communication unit 1720 coupled to a network 1799.

The processing unit 1710 may be a Central Processing Unit (CPU) or a semiconductor device for executing processing instructions stored in the memory 1730 or the storage 1740. The processing unit 1710 may be at least one hardware processor.

The processing unit 1710 may generate and process signals, data or information that are input to the decoding apparatus 1700, are output from the decoding apparatus 1700, or are used in the decoding apparatus 1700, and may perform examination, comparison, determination, etc. related to the signals, data or information. In other words, in embodiments, the generation and processing of data or information and examination, comparison and determination related to data or information may be performed by the processing unit 1710.

The processing unit 1710 may include an entropy decoding unit 210, a dequantization unit 220, an inverse transform unit 230, an intra prediction unit 240, an inter prediction unit 250, a switch 245, an adder 255, a filter unit 260, and a reference picture buffer 270.

At least some of the entropy decoding unit 210, the dequantization unit 220, the inverse transform unit 230, the intra prediction unit 240, the inter prediction unit 250, the adder 255, the switch 245, the filter unit 260, and the reference picture buffer 270 of the decoding apparatus 200 may be program modules, and may communicate with an external device or system. The program modules may be included in the decoding apparatus 1700 in the form of an operating system, an application program module, or other program modules.

The program modules may be physically stored in various types of well-known storage devices. Further, at least some of the program modules may also be stored in a remote storage device that is capable of communicating with the decoding apparatus 1700.

The program modules may include, but are not limited to, a routine, a subroutine, a program, an object, a component, and a data structure for performing functions or operations according to an embodiment or for implementing abstract data types according to an embodiment.

The program modules may be implemented using instructions or code executed by at least one processor of the decoding apparatus 1700.

The processing unit 1710 may execute instructions or code in the entropy decoding unit 210, the dequantization unit 220, the inverse transform unit 230, the intra prediction unit 240, the inter prediction unit 250, the switch 245, the adder 255, the filter unit 260, and the reference picture buffer 270.

A storage unit may denote the memory 1730 and/or the storage 1740. Each of the memory 1730 and the storage 1740 may be any of various types of volatile or nonvolatile storage media. For example, the memory 1730 may include at least one of ROM 1731 and RAM 1732.

The storage unit may store data or information used for the operation of the decoding apparatus 1700. In an embodiment, the data or information of the decoding apparatus 1700 may be stored in the storage unit.

For example, the storage unit may store pictures, blocks, lists, motion information, inter prediction information, bitstreams, etc.

The decoding apparatus 1700 may be implemented in a computer system including a computer-readable storage medium.

The storage medium may store at least one module required for the operation of the decoding apparatus 1700. The memory 1730 may store at least one module, and may be configured such that the at least one module is executed by the processing unit 1710.

Functions related to communication of the data or information of the decoding apparatus 1700 may be performed through the communication unit 1720.

For example, the communication unit 1720 may receive a bitstream from the encoding apparatus 1700.

Hereinafter, a filter according to an embodiment will be described.

Across a boundary between a block and another block, whether filtering is to be performed, filtering boundary strength, and a filtering method (or type) may be determined, and filtering may be performed based on the result of the determination.

A filtering method may mean a method for performing filtering using different filter lengths or different filter coefficients.

The filter may be a deblocking filter. The filter according to the embodiment may correspond to the filter unit 180 described above with reference to FIG. 1 and/or the filter unit 260 described above with reference to FIG. 2.

A block to which the filter is applied may be one of units determined as an image is divided, for example, a picture, a sub-picture, a slice, a tile, a brick, a coding tree unit (CTU), a coding unit (CU), a prediction unit (PU), a transform unit (TU), a coding block, a prediction block, a transform block, and a sub-block. Here, a sub-block may be a unit, such as a sub-CU, a sub-PU, or a sub-TU, generated by additionally partitioning at least one of a CU, a PU, and a TU.

Hereinafter, the target block may be the block, which is the target of current filtering. Alternatively, the target block may be a block including a boundary, which is the target of current filtering. Alternatively, the boundary of the target block may be a filtering target. A neighbor block may be a block adjacent to the target block. A neighbor block may be a block spatially adjacent to the target block or a block temporally adjacent to the target block.

The deblocking filter according to an embodiment may reduce blocking artifacts occurring at a block boundary attributable to at least one of prediction, transform, and quantization.

Meanwhile, the filter according to the embodiment may perform filtering using information about at least one of a prediction type, a transform type, and a quantization type, signaled together with a reconstructed target block. The information about at least one of the prediction, transform, and quantization types may be transferred to the adder through the dequantization unit and the inverse transform unit, and may be transferred back from the adder to the filter unit.

As a method for eliminating the above-described blocking artifacts, a deblocking filter may be used. Deblocking filtering may be performed in the manner using a loop filter.

A deblocking filter may perform filtering across a boundary between a block and another block or a boundary between a sub-block and another sub-block in a block.

Here, the block may have an M×N shape. Each of M and N may be a positive integer. The M×N shape may denote a square shape or a rectangular (or non-square) shape.

Blocking artifacts may be caused by performing prediction, transform or quantization on a block. In order to reduce such blocking artifacts, a deblocking filter may be applied to at least one of boundaries of units such as a CTU, a CU, a PU, a TU, a coding tree block, a coding block, a prediction block, a transform block, and a sub-block.

Meanwhile, the filtering method for reducing such blocking artifacts may perform filtering in which all boundaries of the M×N block are taken into consideration and which are fitted to the block size.

A deblocking filtering process according to an embodiment may be performed as follows.

First, for a vertical boundary of a picture, a sub-picture, a slice, a tile, a brick, a CTU, or a block, horizontal one-directional (1D) filtering may be performed on reconstructed signals around the vertical boundary. Next, for a region around the horizontal boundary of a picture, a sub-picture, a slice, a tile, a brick, a CTU, or a block, vertical 1D filtering may be performed on reconstructed signals filtered (by horizontal 1D filtering) around the horizontal boundary.

Alternatively, for the region around the horizontal boundary of a picture, a sub-picture, a slice, a tile, a brick, a CTU, or a block, vertical 1D filtering may be performed on reconstructed signals around the horizontal boundary. Next, for a region around the vertical boundary of a picture, a sub-picture, a slice, a tile, a brick, a CTU, or a block, horizontal 1D filtering may be performed on reconstructed signals filtered (by vertical 1D filtering) around the vertical boundary.

The deblocking filtering method for a horizontal boundary may be similar to the deblocking filtering method for a vertical boundary. Although the embodiment has been described based on the deblocking filtering method for a vertical boundary, the deblocking filtering method for a horizontal boundary may be performed and implemented in a similar way.

Figure 18:
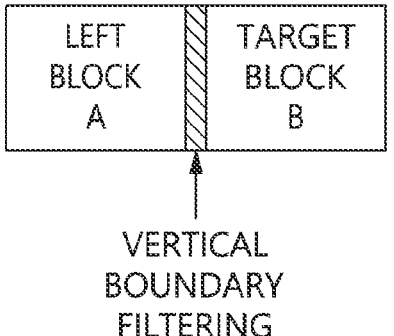
FIG. 18 illustrates vertical boundary filtering across block boundaries adjacent to each other according to an embodiment.

FIG. 18 illustrates vertical boundary filtering across block boundaries adjacent to each other according to an embodiment.

Figure 19:
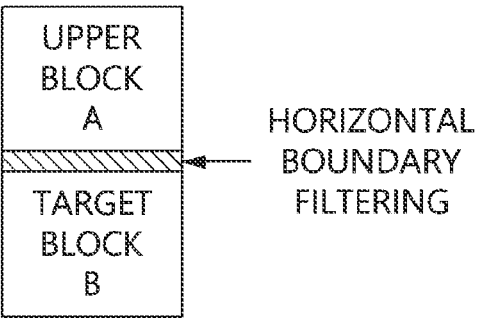
FIG. 19 illustrates horizontal boundary filtering across block boundaries adjacent to each other according to an embodiment.

FIG. 19 illustrates horizontal boundary filtering across block boundaries adjacent to each other according to an embodiment.

FIG. 18 exemplifies filtering across a vertical boundary between adjacent blocks. In FIG. 18, horizontal filtering may be performed across a vertical boundary between a target block (block B) and a left block (block A).

FIG. 19 exemplifies filtering across a horizontal boundary between adjacent blocks. In FIG. 19, vertical filtering may be performed across a horizontal boundary between a target block (block B) and an upper block (block A).

Meanwhile, in FIGS. 18 and 19, each of block A and block B may be one of a CTU, a CU, a PU, a TU, a coding tree block, a coding block, a prediction block, a transform block, and a sub-block. A sub-block may be a sub-CU, a sub-TU or a sub-PU.

Figure 20:
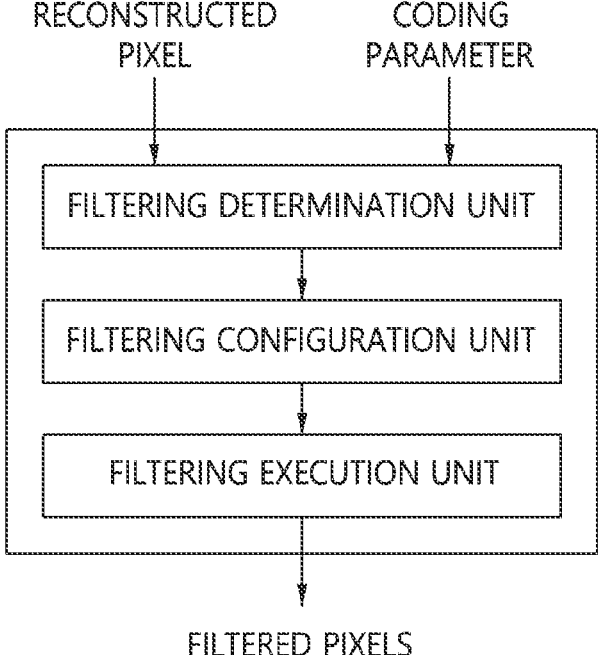
FIG. 20 illustrates a deblocking filter according to an embodiment.

FIG. 20 illustrates a deblocking filter according to an embodiment.

1) At least one coding parameter of coding parameters of a target block and coding parameters signaled in a high-level parameter set or header, and 2) reconstructed pixels used for filtering may be used as the input of deblocking filtering. The coding parameter input to the deblocking filter according to the embodiment may be the coding parameter described above with reference to FIG. 1.

A filtering boundary to which filtering is to be applied and whether filtering is to be performed may be determined using the information input to the deblocking filtering. Further, the filtering strength and filtering type for the filtering boundary may be determined using the information input to the deblocking filtering. After the determination has been performed, deblocking filtering may be performed, and pixels to which filtering is applied through deblocking filtering may be output.

Referring to FIG. 20, a deblocking filter according to an embodiment may include a filtering determination unit, a filtering configuration unit, and a filtering execution unit.

The filtering determination unit may select a boundary across which deblocking filtering is to be performed from among the boundary of a block, the boundary of a tile, the boundary of a sub-picture, the boundary of a brick, and the boundary of a slice, and may determine whether filtering is to be performed across the selected boundary.

The filtering configuration unit may determine the strength and type of filtering to be applied to the boundary around which the filtering is to be determined to be performed.

The filtering type may indicate at least one of the number of samples to be used for filtering, the locations of samples used for filtering, the number of samples to be filtered, the locations of samples to be filtered, and the length of the filter.

The filtering execution unit may perform filtering across the selected boundary.

Meanwhile, since tiles are based on technology for supporting parallel processing, an additional postprocessing operation may be required in relation to filtering across a tile boundary. Therefore, information indicating whether filtering is to be performed across a tile boundary may be signaled at a high level such that filtering across the tile boundary can be selectively used, separately from whether filtering across the block boundary is to be performed.

Such filtering across the tile boundary will be described below. Here, filtering across a boundary, which will be described later, may be applied to at least one of a picture, a sub-picture, a slice, a brick, etc., instead of a tile.

Figure 21:
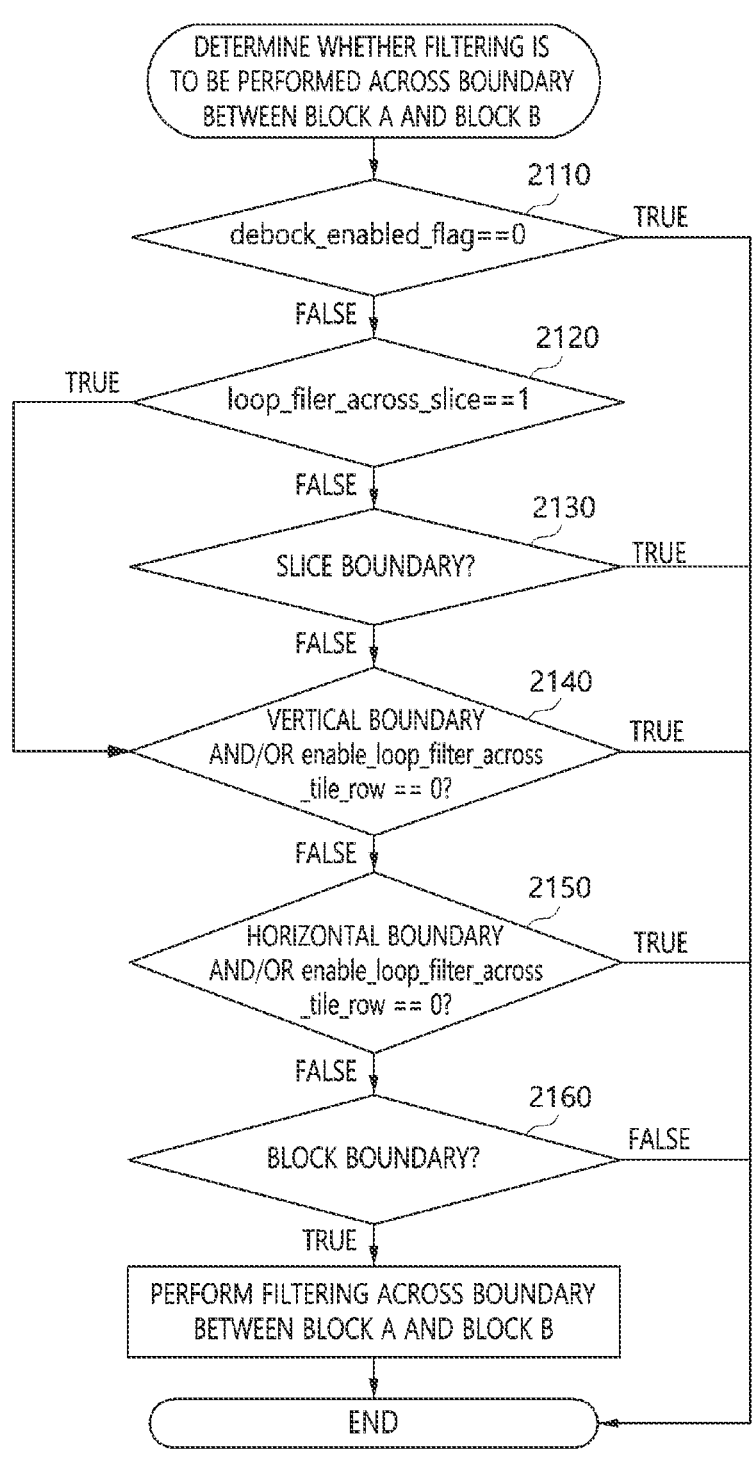
FIG. 21 is a flowchart illustrating a method for determining whether filtering is to be performed according to an embodiment.

FIG. 21 is a flowchart illustrating a method for determining whether filtering is to be performed according to an embodiment.

In FIG. 21, block A and block B may be blocks adjacent to each other. Block A and block B may be block A and block B, respectively, described above with reference to FIGS. 18 and 19.

Hereinafter, the target boundary may be a boundary, which is the target of filtering, or may be the boundary of a target block. In an embodiment, the target boundary may be a boundary between block A and block B.

At step 2110, when deblock_enabled_flag is 0, it may be determined that filtering is not possible, and filtering may be terminated based on the result of the determination (in the case of true at step 2110). In contrast, when deblock_enabled_flag is 1, it may be determined that filtering can be performed, and step 2120 may be performed based on the result of the determination (in the case of false at step 2110).

deblock_enabled_flag may be information indicating whether performance of deblocking filtering is possible. That is, deblock_enabled_flag may denote information indicating whether deblocking filtering is to be performed.

The case where deblock_enabled_flag is 1 may indicate that performance of deblocking filtering is possible. In contrast, the case where deblock_enabled_flag is 0 may indicate that performance of deblocking filtering is not possible.

deblock_enabled_flag may be determined for a sequence unit, a picture unit, a sub-picture unit, a slice unit, a tile group unit, a brick unit or a tile unit, and may be signaled using a bitstream for the corresponding unit. Also, deblock_enabled_flag may be signaled in at least one of a parameter set and a header.

In an embodiment, a slice may be replaced with at least one of a picture, a sub-picture, a tile, and a brick.

At step 2120, when loop_filter_across_slice is 1, it may be determined that filtering can also be performed across a slice boundary, and step 2140 may be performed based on the result of the determination (in the case of true at step 2120). In contrast, when loop_filter_across_slice is 0, it may be determined that the performance of filtering is not possible across a slice boundary, and step 2130 may be performed based on the result of the determination (in the case of false at step 2120).

loop_filter_across_slice may be information indicating whether deblocking filtering can be performed across the slice boundary.

The case where loop_filter_across_slice is 0 may indicate that the performance of deblocking filtering is not possible across the slice boundary. The case where loop_filter_across_slice is 1 may indicate that the performance of deblocking filtering is possible across the slice boundary.

loop_filter_across_slice may be determined for a sequence unit, a picture unit, a sub-picture unit, a slice unit, a tile group unit, a brick unit or a tile unit when deblock_enabled_flag is 1, and may be signaled using a bitstream for the corresponding unit.

At step 2130, whether the target boundary is a slice boundary may be determined.

When the target boundary is a slice boundary (in the case of true at step 2130), filtering may be terminated. That is, when it is determined that the performance of filtering across the slice boundary is not possible (loop_filter_across_slice==0) and the target boundary is a slice boundary, filtering may be terminated.

In contrast, when the target boundary is not a slice boundary, step 2140 may be performed (in the case of false at step 2130).

In an embodiment, a tile may be replaced with at least one of a picture, a sub-picture, a slice, and a brick.

At step 2140, when the target boundary is a vertical boundary of a tile and when enable_loop_filter_across_tile_col is 0, filtering may be terminated (in the case of true at step 2140). In contrast, when the target boundary is not a vertical boundary of the tile or when enable_loop_filter_across_tile_col is 1, step 2150 may be performed (in the case of false at step 2140).

enable_loop_filter_across_tile_col may be information indicating whether filtering is to be performed across the left boundary or the right boundary of the target tile. The target tile may be a tile, which is the target of filtering.

enable_loop_filter_across_tile_col may be derived from syntax elements signaled through at least one of a parameter set and a header. The syntax elements may be information indicating whether filtering is to be performed across the boundary of each tile. When filtering to be currently performed is an operation across a vertical boundary, whether filtering is to be performed may be determined using enable_loop_filter_across_tile_col.

At step 2150, when the target boundary is a horizontal boundary of a tile and when enable_loop_filter_across_tile_row is 0, filtering may be terminated (in the case of true at step 2150). In contrast, when the target boundary is not a vertical boundary of the tile or when enable_loop_filter_across_tile_row is 1, step 2160 may be performed (in the case of false at step 2150).

enable_loop_filter_across_tile_row may be information indicating whether filtering is to be performed across the upper boundary or the lower boundary of the target tile.

enable_loop_filter_across_tile_row may be derived from syntax elements signaled through at least one of a parameter set and a header. The syntax elements may be information about whether filtering is to be performed across the boundary of each tile. When filtering to be currently performed is an operation across a horizontal boundary, whether filtering is to be performed may be determined using enable_loop_filter_across_tile_row.

When deblock_enabled_flag is 0 or loop_filter_across_tile is 0, the values of enable_loop_filter_across_tile_col and enable_loop_filter_across_tile_row are derived as 0. When deblock_enabled_flag is 1 and loop_filter_across_tile is 1, the values of enable loop_filter_across_tile_col and enable_loop_filter_across_tile_row may be derived using a syntax element that is signaled through at least one of a parameter set and a header. The syntax element may be information about whether filtering is to be performed across the boundary of each tile.

At step 2160, whether the target boundary is the boundary of a block may be determined. When the target boundary is the boundary of a block, filtering may be performed across the target boundary (in the case of true at step 2160). In contrast, when the target boundary is not a boundary of a block, filtering may be terminated without being performed (in the case of false at step 2160). Here, the block may be a CTU, a CU, a PU, a TU, a coding tree block, a coding block, a prediction block, a transform block, or a sub-block.

In FIG. 21, a description has been made such that, when it is determined that the performance of filtering across the slice boundary is not possible (that is, loop_filter_across_slice==0) and a target boundary is a slice boundary, filtering is not performed. This description may also be applied to the boundary of a brick, a tile group, or a CTU (not a slice boundary).

For example, when it is determined that performance of filtering across a brick boundary is not possible (that is, loop_filter_across_brick==0) and the target boundary is a brick boundary, it may be determined that filtering is not to be performed.

Also, when a boundary between blocks is a vertical boundary and a left boundary of the target block matches the boundary of a picture, it may be determined that filtering is not to be performed. Also, when a boundary between blocks is a horizontal boundary and an upper boundary of the target block matches the boundary of a picture, it may be determined that filtering is not to be performed.

Meanwhile, whether filtering is to be performed according to an embodiment may be determined based on the size of a block. Here, the size of a block may be at least one of the horizontal size, the vertical size, and the area of a block.

When the size of the block is M×N, filtering may not be performed if M or N is less than a threshold of min_deblock_size.

For example, when the size of a block is 4×16 and min_deblock_size is 8, filtering may not be performed across a vertical boundary of the block.

Alternatively, when the size of a block is 16×4 and min_deblock_size is 8, filtering may not be performed across a horizontal boundary of the block.

Figure 22:
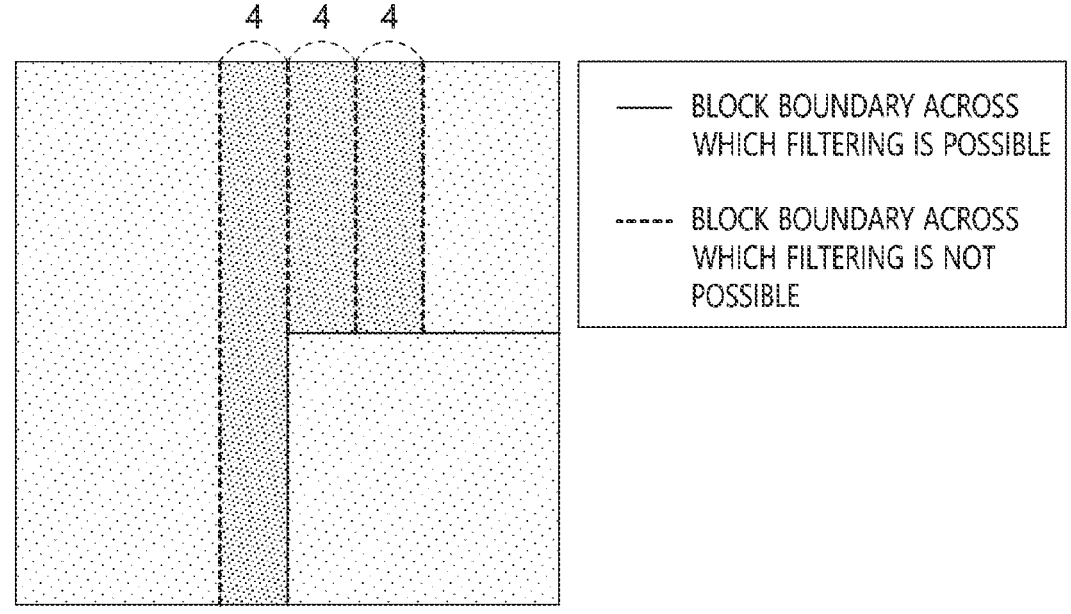
FIG. 22 illustrates a boundary across which filtering is not performed according to an embodiment.

FIG. 22 illustrates a boundary across which filtering is not performed according to an embodiment.

In FIG. 22, the threshold min_deblock_size is set to 8.

Referring to FIG. 22, filtering may not be performed across vertical boundaries between a 4×32 block and a 4×16 block.

Hereinafter, a method for determining filtering strength according to an embodiment will be described.

The filtering strength may be determined in consideration of at least one of 1) the coding parameter of the target block, 2) the coding parameter of a neighbor block, 3) the size of a target block, and 4) the size of the neighbor block.

Filtering strength may be changed depending on an operation expression using the value of at least one of samples belonging to the target block. For example, filtering strength may be changed depending on the gradient calculated using sample values adjacent to boundaries between blocks.

As deblocking filtering, for the target block, 1) vertical filtering may be performed after horizontal filtering, or 2) horizontal filtering may be performed after vertical filtering.

When vertical filtering is performed after horizontal filtering or when horizontal filtering is performed after vertical filtering, nonlinear filtering is applied to samples on which two filtering operations are performed, and thus the results of filtering may vary depending on the order of filtering operations.

Therefore, in order to derive the same results by the encoding apparatus 1600 and the decoding apparatus 1700 (or, in order to prevent mismatch between the encoding apparatus 1600 and the decoding apparatus 1700), filtering performed by the encoding apparatus 1600 and the decoding apparatus 1700 must be performed in a set filtering order (horizontal-vertical filtering order or vertical-horizontal filtering order). The same filtering order may be implicitly determined by the encoding apparatus 1600 and the decoding apparatus 1700, and may be explicitly determined by signaling information, such as a flag.

In an embodiment, filtering strength may be used to have the same meaning as boundary strength (BS). An increase in the filtering strength on the boundary may mean that stronger filtering is performed on the boundary. The case where the value of filtering strength on the boundary is 0 may mean that filtering is not performed on the boundary.

Figure 23:
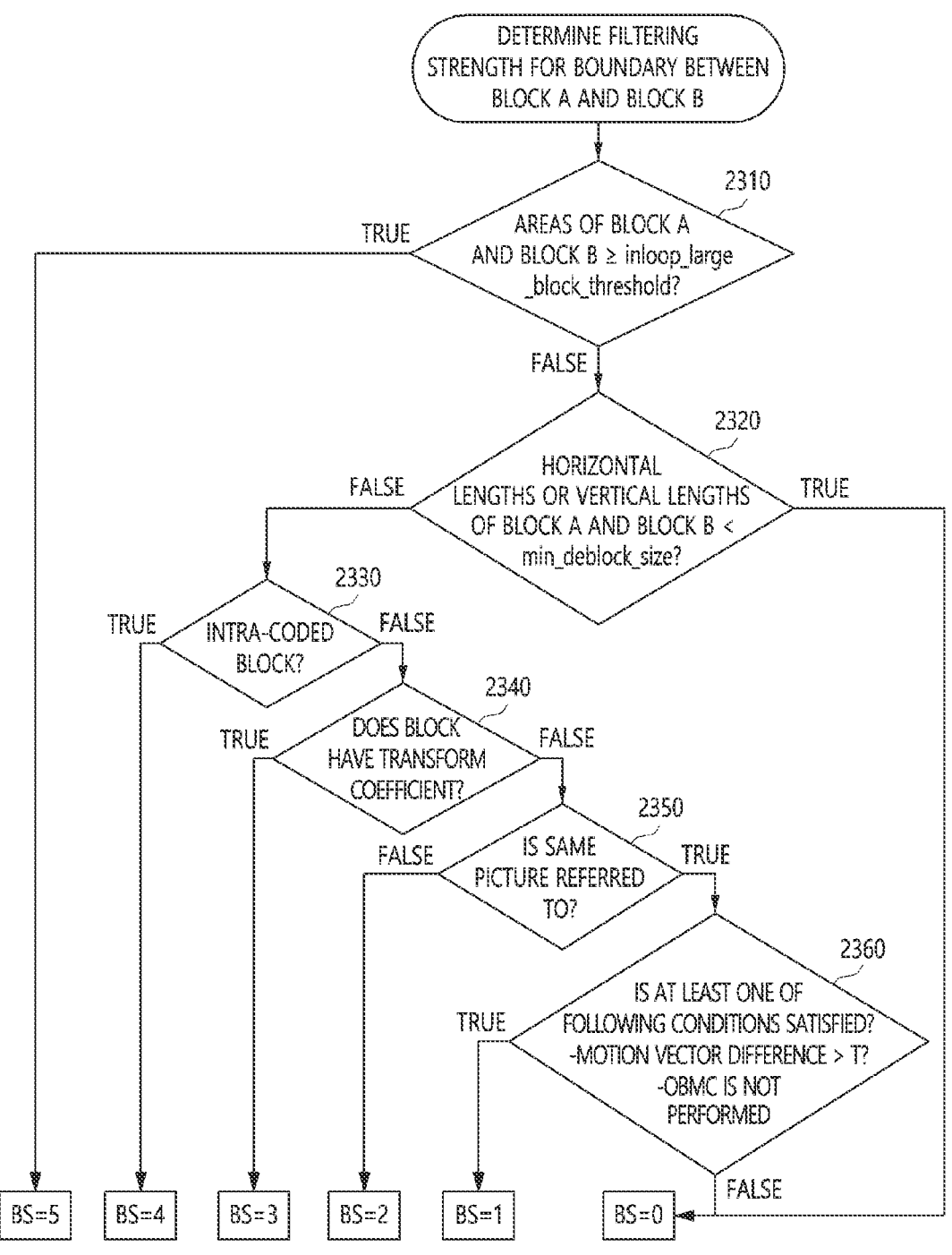
FIG. 23 is a flowchart illustrating a method for determining filtering strength according to an embodiment.

FIG. 23 is a flowchart illustrating a method for determining filtering strength according to an embodiment.

In FIG. 23, block A and block B may be blocks adjacent to each other. Block A and block B may respectively be block A and block B described above with reference to FIGS. 18 and 19.

At step 2310, filtering strength may be determined such that, when the areas of block A and block B are equal to or greater than inloop_large_block_threshold, the highest filtering strength is used for filtering (e.g., BS=5) (in the case of true at step 2310). In contrast, when the area of block A or block B is less than inloop_large_block_threshold, step 2320 may be performed (in the case of false at step 2310).

inloop_large_block_threshold may be a value predefined by the encoding apparatus 1600 and the decoding apparatus 1700. Alternatively, inloop_large_block_threshold may be information signaled to the encoding apparatus 1600 and the decoding apparatus 1700.

When the block size is M×N, the area of the block may be M*N. Both of M and N may be 2n, where n may be a positive integer.

Filtering strength may be determined such that, when at least one of the area of block A and the area of block B is equal to or greater than the predefined constant inloop_large_block_threshold, the highest filtering strength is used in filtering (e.g., BS=5).

In an embodiment, for the determination of filtering strength, at least one of the horizontal size and the vertical size of a block may be used instead of the area of the block.

Further, for the determination of filtering strength, the depth of a block may be used instead of the area of the block. For example, as the depth of a block is increased, the block may be a smaller block.

Also, in an embodiment, the highest filtering strength may not only mean that BS is 5, but may also mean that a filter having a length greater than J is used in a single block. J may be a positive integer of 3 or more. That is, in this case, the total length of the filter may be 2×J or more.

The highest filtering strength (e.g., BS==5) may mean that the values of at least V samples, among samples belonging to block A or block B, are changed by performing filtering using at least U samples, among the samples belonging to block A or block B.

For example, each of U and V may be a positive integer. (U, V) may be (4, 3), (5, 4), (6, 4), (7, 4), (6, 5), (5, 3) or (6, 3). U may be V or more. That is, the value of U may be equal to or greater than the value of V.

Further, when the range of filtering strength values is from 0 to 3, the highest filtering strength may be set by assigning 3 to BS ("BS=3").

Furthermore, when the range of filtering strength values is from 0 to 2, the highest filtering strength may be set by assigning 2 to BS ("BS=2").

As described above, filtering strength may be determined based on the size of a block (or at least one of an area, a horizontal size, a vertical size, and a depth).

As the size of a block is larger, the correlation between samples of the block may be stochastically higher. Therefore, when the size of a block is larger, blocking artifacts may be efficiently removed through strong filtering.

At step 2320, filtering strength may be determined such that, when the size of block A or the size of block B is less than min_deblock_size, the lowest filtering strength is used for filtering (e.g., BS=0) (in the case of true at step 2320). In contrast, when the size of block A or the size of block B is equal to or greater than min_deblock_size, step 2330 may be performed (in the case of false at step 2320).

For example, filtering strength may be determined such that, when horizontal sizes of blocks A and block B horizontally adjacent to each other are less than min_deblock_size, the lowest filtering strength is used for filtering across a vertical boundary between the blocks (e.g., BS=0).

For example, filtering strength may be determined such that, when vertical sizes of blocks A and block B horizontally adjacent to each other are less than min_deblock_size, the lowest filtering strength is used for filtering across a vertical boundary between the blocks (e.g., BS=0).

For example, filtering strength may be determined such that, when vertical sizes of blocks A and block B vertically adjacent to each other are less than min_deblock_size, the lowest filtering strength is used for filtering across a horizontal boundary between the blocks (e.g., BS=0).

For example, filtering strength may be determined such that, when horizontal sizes of blocks A and block B vertically adjacent to each other are less than min_deblock_size, the lowest filtering strength is used for filtering across a horizontal boundary between the blocks (e.g., BS=0).

Alternatively, at least one of a picture, a sub-picture, a slice, a tile group, a tile, a brick, a CTU, a CU, a PU, a TU, a coding block, a prediction block, a transform block, and a sub-block may be divided by the unit of min_deblock_size× min_deblock_size. When the vertical boundary or horizontal boundary between block A and block B does not correspond to a boundary of a unit generated from the division, filtering may not be performed on the vertical boundary or the horizontal boundary.

Alternatively, at least one of a picture, a sub-picture, a slice, a tile group, a tile, a brick, a CTU, a CU, a PU, a TU, a coding block, a prediction block, a transform block, and a sub-block may be divided by the unit of min_deblock_size× min deblock size. When the vertical boundary or horizontal boundary between block A and block B, which corresponds to the unit generated from the division, corresponds to the boundary of the unit, filtering may be performed on the vertical boundary or the horizontal boundary.

Here, min_deblock_size may denote the minimum size of a CU, minimum size of a PU, the minimum size of a TU, the minimum size of a coding block, the minimum size of a prediction block, the minimum size of a transform block, the minimum size of a sub-block, the minimum size at which deblocking filtering is performed, etc. Also, min_deblock_size may be a positive integer, such as 1, 2, 4, or 8.

min_deblock_size may be information that is signaled from the encoding apparatus 1600 to the decoding apparatus 1700. min_deblock_size may be signaled in a video parameter set (VPS), a sequence parameter set (SPS), a picture parameter set (PPS), an adaptation parameter set (APS), a decoding parameter set (DPS), a picture header, a sub-picture header, a slice header, a tile header, a brick, or a CTU.

min_deblock_size may be a value preset in the encoding apparatus 1600 and the decoding apparatus 1700.

The lowest filtering strength (e.g., BS==0) may mean that the values of at least V samples, among samples belonging to block A or block B, are changed by performing filtering using at least U samples, among the samples belonging to block A or block B. For example, each of U and V may be an integer. (U, V) may be (0, 0), (1, 1), (2, 1), (2, 2) or (3, 2). U may be V or more.

The attribute value of at least one of U and V in the case of BS==0 may be different from that in the case of BS==1. The attribute value of at least one of U and V in the case of BS==0 may be less than that in the case of BS==1.

The lowest filtering strength (e.g., BS==0) may also mean that filtering not performed.

At step 2330, filtering strength may be determined such that, when at least one of block A and block B is a block encoded using intra prediction, the high filtering strength is used for filtering (e.g., BS=4) (in the case of true at step 2330). In contrast, when both block A and block B are encoded using inter prediction, step 2340 may be performed (in the case of false at step 2330).

The probability that blocking artifacts attributable to quantization will occur in a block encoded using intra prediction may be higher than the probability that blocking artifacts attributable to quantization will occur in a block encoded using inter prediction. Therefore, in order to efficiently remove blocking artifacts, strong filtering may be performed on the block in which intra prediction is used (e.g., BS=4).

Figure 24:
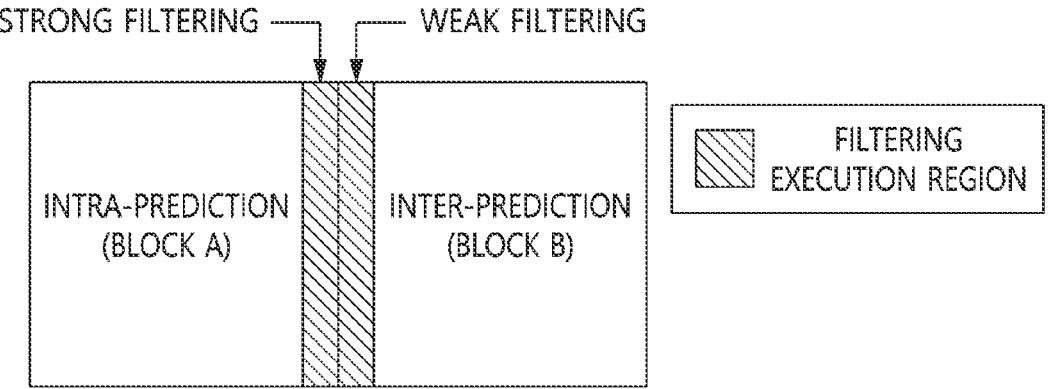
FIGS. 24 and 25 illustrate a method for determining filtering strength depending on a prediction mode according to an embodiment.
Figure 25:
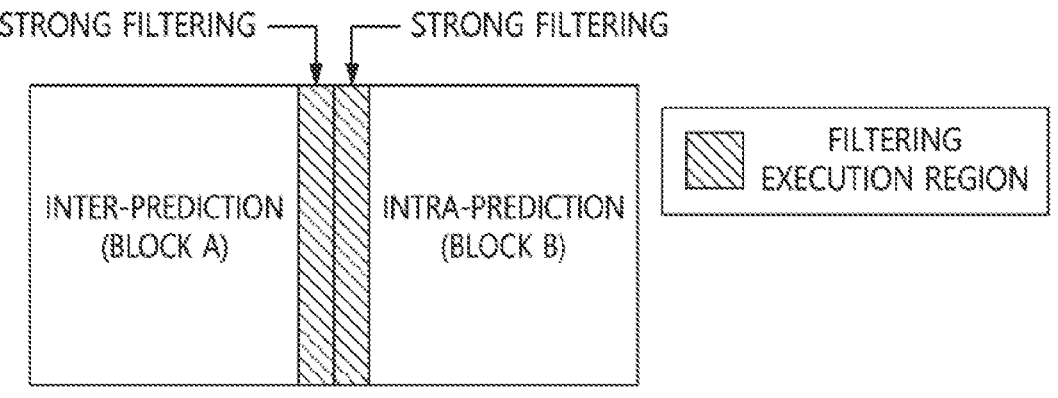

FIGS. 24 and 25 illustrate a method for determining filtering strength depending on a prediction mode according to an embodiment.

Hereinafter, an intra prediction block may denote a block encoded using intra prediction. An inter prediction block may denote a block encoded using inter prediction.

As illustrated in FIG. 24, when block A is a block encoded using intra prediction and block B is a block encoded using inter prediction, filtering at high filtering strength is performed on block A, and filtering at low filtering strength may be performed on block B.

In an intra prediction block, the probability that a prediction error will occur in a region in the corresponding block may be higher when the region in the corresponding block is closer to the right or lower portion of the block. Further, in an inter prediction block, a prediction error less than that of an intra prediction block may occur. Therefore, when a prediction method for block A is intra prediction and a prediction method for block B is inter prediction, filtering strength lower than that of block A is applied to block B when filtering is performed on a boundary between block A and block B, thus efficiently reducing blocking artifacts.

As illustrated in FIG. 25, when block A is a block encoded using inter prediction and block B is a block encoded using intra prediction, filtering at higher filtering strength may be applied to block A and block B.

Intra prediction for block B, which is an intra prediction block, may be performed by referring to samples adjacent to the right boundary of block A. Therefore, when a quantization error is present in block A, the probability that such a quantization error will be propagated to block B without change may be high. Further, when no quantization error is present in block A, the probability that less quantization error will occur in a region near a boundary adjacent to block A, among regions of block B, may be high.

Further, filtering strength may be determined depending on whether prediction modes of block A and block B are different from each other.

For example, filtering strength may be determined such that, when the prediction modes of block A and block B are different from each other, low filtering strength is used (e.g., BS=1).

When the horizontal sizes of block A and block B are 32, a transform mode of block A is DCT-II horizontal transform, and a transform mode of block B is DST-VII horizontal transform or DCT-VIII horizontal transform, filtering strength of block B may be determined to be higher than that of block A. When the transform modes of block A and block B are opposite each other, filtering strength of block A may be determined to be higher than that of block B.

The high filtering strength (e.g., BS==4) may mean that the values of at least V samples, among samples belonging to block A or block B, are changed by performing filtering using at least U samples, among the samples belonging to block A or block B.

For example, each of U and V may be a positive integer. (U, V) may be (3, 2), (4, 3), (5, 4), (6, 4), (7, 4), (6, 5), (5, 3) or (6, 3). U may be V or more.

The attribute value of at least one of U and V in the case of BS==4 may be different from that in the case of BS==5. The attribute value of at least one of U and V in the case of BS==4 may be less than that in the case of BS==5.

Further, when the range of filtering strength values is from 0 to 3, high filtering strength may be set by assigning 2 to BS ("BS=2").

Further, when the range of filtering strength values is from 0 to 2, high filtering strength may be set by assigning 2 to BS ("BS=2").

Reference is to be made again to FIG. 23.

At step 2340, filtering strength may be determined such that, when the number of transform coefficients of block A or the number of transform coefficients of block B is equal to or greater than 1, intermediate filtering strength is used for filtering (e.g., BS=3) (in the case of true at step 2340). In contrast, when transform coefficients of block A and block B are not present, step 2350 may be performed (in the case of false at step 2340).

Here, the case where there are no transform coefficients may mean that information about transform coefficients is not present in a bitstream. Alternatively, the case where there are no transform coefficients may mean that a residual block for a target block is not derived.

The intermediate filtering strength (e.g., BS==3) may mean that the values of at least V samples, among samples belonging to block A or block B, are changed by performing filtering using at least U samples, among the samples belonging to block A or block B.

For example, each of U and V may be a positive integer. (U, V) may be (2, 1), (2, 2), (3, 2), (4, 3), (5, 4), (6, 4), (7, 4), (6, 5), (5, 3) or (6, 3). U may be V or more.

The attribute value of at least one of U and V in the case of BS==3 may be different from that in the case of BS==4. The attribute value of at least one of U and V in the case of BS==3 may be less than that in the case of BS==4.

Further, when the range of filtering strength values is from 0 to 3, the intermediate filtering strength may be set by assigning 1 to BS ("BS=1").

Further, when the range of filtering strength values is from 0 to 2, the intermediate filtering strength may be set by assigning 1 to BS ("BS=1").

At step 2350, filtering strength may be determined such that, when reference pictures of block A and of block B are different from each other, the intermediate filtering strength is used for filtering (e.g., BS=2) (in the case of false at step 2350). In contrast, when reference pictures of block A and block B are identical to each other, step 2360 may be performed (in the case of true at step 2350).

The intermediate filtering strength (e.g., BS==2) may mean that the values of at least V samples, among samples belonging to block A or block B, are changed by performing filtering using at least U samples, among the samples belonging to block A or block B.

For example, each of U and V may be a positive integer. (U, V) may be (1, 1), (2, 1), (2, 2), (3, 2), (4, 3), (5, 4), (6, 4), (7, 4), (6, 5), (5, 3) or (6, 3). U may be V or more.

The attribute value of at least one of U and V in the case of BS==2 may be different from that in the case of BS==3.

The attribute value of at least one of U and V in the case of BS==2 may be different from that in the case of BS==3.

Further, when the range of filtering strength values is from 0 to 3, the intermediate filtering strength may be set by assigning 1 to BS ("BS=1").

Further, when the range of filtering strength values is from 0 to 2, the intermediate filtering strength may be set by assigning 1 to BS ("BS=1").

At step 2360, filtering strength may be determined such that, when at least one of the following condition 1, condition 2, and condition 3 is satisfied, low filtering strength is used for filtering (e.g., BS=1) (in the case of true at step 2360). In contrast, filtering strength may be determined such that, when none of the following conditions 1, 2, and 3 are satisfied, the lowest filtering strength is used for filtering (e.g., BS=0) (in the case of false at step 2360). Here, T may be a positive integer. For example, T may be 16.

Condition 1) A motion vector difference (MVD) between $\frac{1}{16}$ pixel motion vectors of block A and block B is greater than a predefined value T.

Condition 2) Block B does not perform overlapped block motion compensation (OBMC) which uses motion information of block A.

Condition 3) Block A does not perform OBMC that uses the motion information of block B.

Filtering strength according to an embodiment may be determined based on whether OBMC has been used for the corresponding block.

Blocking artifacts occurring at the boundary between block A and block B in the case where OBMC using the motion information of adjacent block A is used for target block B may be smaller than those occurring in the case where OBMC is not used. Therefore, in this case, lower filtering strength is used, and thus image quality may be improved.

For example, as in the case of step 2360, filtering strength BS may be determined to have a value of 0 when OBMC is used. When OBMC is not used, filtering strength BS may be determined to have a value of 1.

Meanwhile, when OBMC is used only for a Y component (or a luma component), filtering strength may be determined to be lower only for the filtering of the Y component, and filtering strength may be maintained for the filtering of a U component and a V component (or chroma components).

For example, when OBMC is used only for a luma (Y) component, filtering strength BS for the luma component may be determined to have a value of 0, and filtering strength BS for the chroma component may be determined to have a value of 1.

Figure 26:
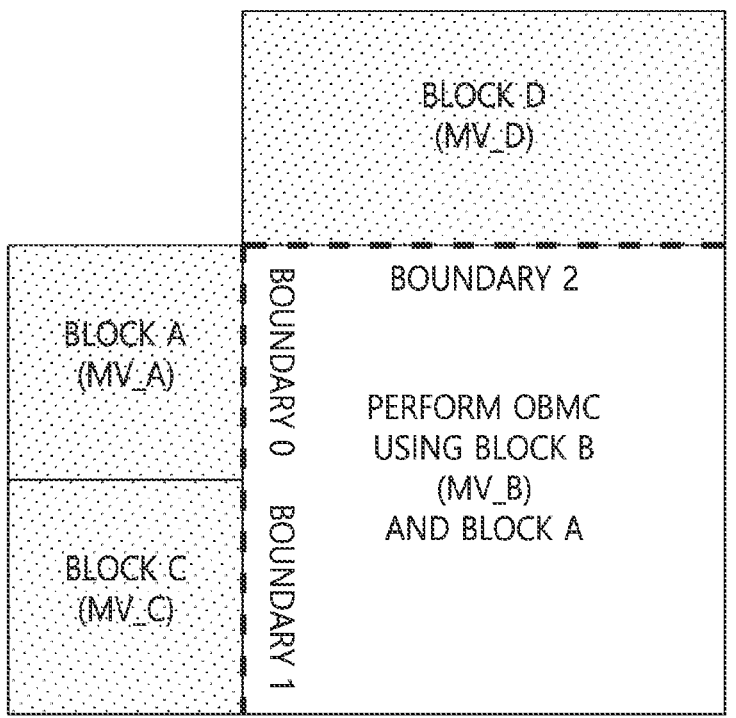
FIG. 26 illustrates the determination of filtering strength of a block on which OBMC is performed according to an embodiment.

FIG. 26 illustrates the determination of filtering strength of a block on which OBMC is performed according to an embodiment.

Filtering strength may be determined such that, when OBMC using motion information of block A is performed on block B, the lowest filtering strength is used for a boundary 0 between block A and block B (e.g., BS=0).

Even if OBMC is performed on block B. OBMC is performed using motion information of block A, and thus filtering strength may be determined such that low filtering strength is used for a boundary 1 between block B and block C and a boundary 2 between block B and block D (e.g., BS=1).

The low filtering strength (e.g., BS==1) may mean that the values of at least V samples, among samples belonging to block A or block B, are changed by performing filtering using at least U samples, among the samples belonging to block A or block B.

For example, each of U and V may be a positive integer. (U, V) may be (1, 1), (2, 1), (2, 2), (3, 2), (4, 3), (5, 4), (6, 4), (7, 4), (6, 5). (5, 3) or (6, 3). U may be V or more.

The attribute value of at least one of U and V in the case of BS==1 may be different from that in the case of BS==2. The attribute value of at least one of U and V in the case of BS==1 may be less than that in the case of BS==2.

Further, when the range of filtering strength values is from 0 to 3, low filtering strength may be set by assigning 1 to BS ("BS=1").

Furthermore, when the range of filtering strength values is from 0 to 2, intermediate filtering strength may be set by assigning 1 to BS ("BS=1").

Steps 2310 to 2350, described above with reference to FIG. 23, have been described as being sequentially performed. However, respective steps 2310 to 2350 are not limited to the order exemplified in FIG. 23, and may be performed either independently or in another order.

Also, the condition of each of steps (2310 to 2350) of FIG. 23 may also be used not only to determine filtering strength, but also to determine whether filtering is to be performed, the number of samples to be used for filtering, the locations of samples to be used for filtering, the number of samples to be filtered, and/or the filtering type.

For example, whether to use OBMC may be used to determine the filter type. When OBMC that uses motion information of block A is performed for block B, a filter type having lower strength may be determined to be used for a boundary between block B and block A or, alternatively, a small number of samples located at a short distance from the boundary may be used for filtering.

When it is determined that the lowest filtering strength is used for filtering (e.g., BS=0), deblocking filtering may not be performed, or deblocking filtering in which low filtering strength (e.g., BS==0) is used may be performed.

The low filtering strength (e.g., BS==0) may mean that the values of at least V samples, among samples belonging to block A or block B, are changed by performing filtering using at least U samples, among the samples belonging to block A or block B.

For example, each of U and V may be a positive integer. (U. V) may be (1, 1), (2, 1), (2, 2), (3, 2), (4, 3), (5, 4), (6, 4), (7, 4), (6, 5), (5, 3) or (6, 3). U may be V or more.

The attribute value of at least one of U and V in the case of BS==0 may be different from that in the case of BS=1. The attribute value of at least one of U and V in the case of BS==0 may be less than that in the case of BS==1.

The number and/or locations of samples to be used for filtering on a block adjacent to the target boundary may be determined using at least one of horizontal sizes and vertical sizes of two blocks forming the block boundary.

In an embodiment, the two blocks may be adjacent blocks forming a block boundary.

The number of samples to be used for filtering may be determined depending on the size of a block having a smaller horizontal size or vertical size between the two blocks.

In order to determine the number of samples to be used for filtering, a block area or block depth may be used instead of the size of the block.

Figure 27:
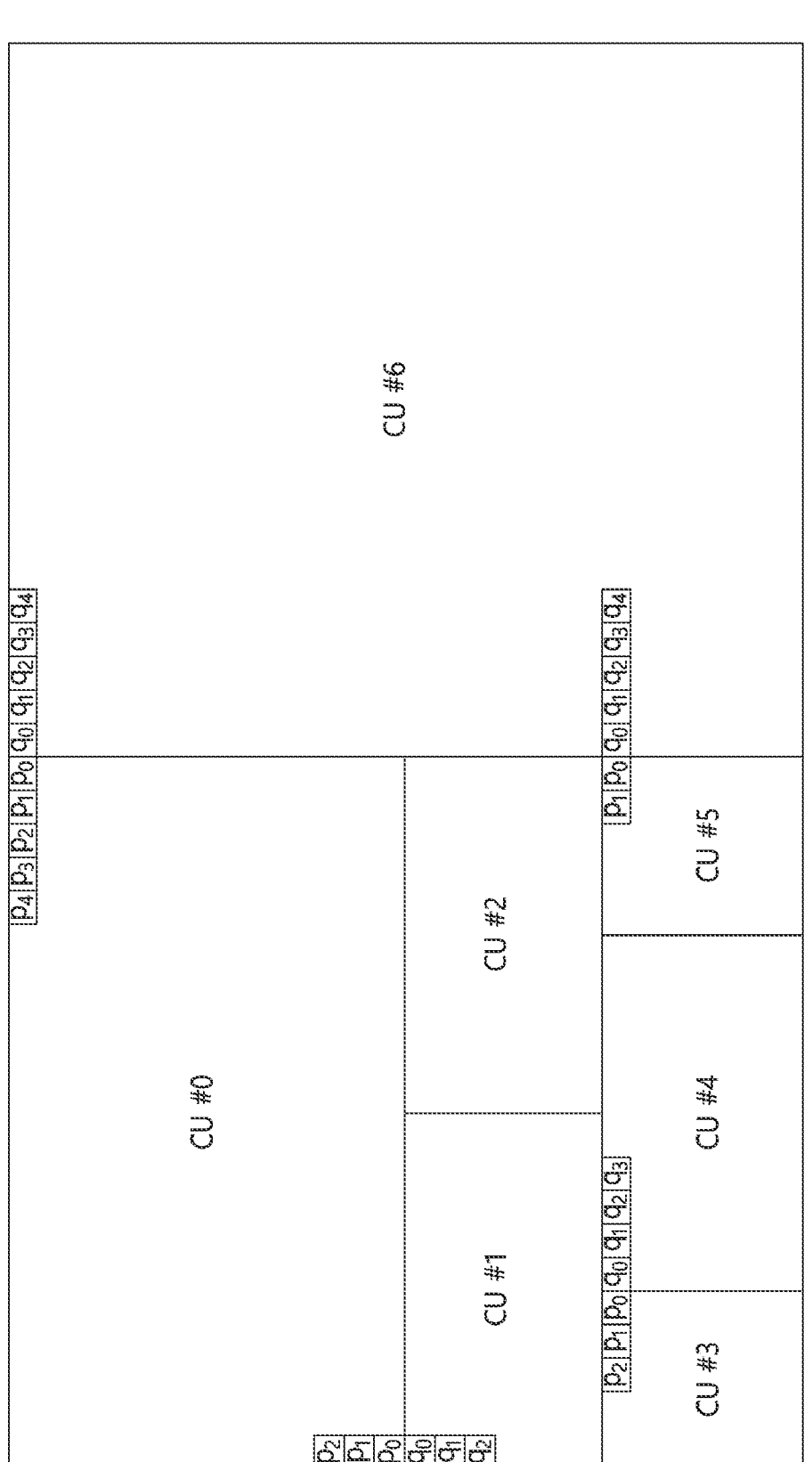
FIG. 27 exemplifies filtering based on block partitioning according to an embodiment.

FIG. 27 exemplifies filtering based on block partitioning according to an embodiment.

In FIG. 27, CU #0, CU #1, CU #2, CU #3, CU #4, CU #5, and CU #6, which are generated by dividing a 64×32 region and have square or rectangular shapes, are illustrated.

Although CUs are illustrated in FIG. 27, the embodiment is not limited only to CUs. Embodiments for a PU, a TU, a coding block, a prediction block, a transform block, a sub-CU or a sub-TU, instead of a CU, may be applied.

CU #0 may be a 32×16 block in which a 32×16 block size transform is used. Each of CU #1, CU #2, and CU #4 may be a 16×8 block in which a 16×8 block size transform is used. Each of CU #3 and CU #5 may be a 8×8 block in which a 8×8 block size transform is used. CU #6 may be a 32×32 block in which a 32×32 block size transform is used.

Since CU #0 and CU #6 are horizontally adjacent to each other, a vertical boundary may be present between CU #0 and CU #6. Since CU #0 and CU #1 are vertically adjacent to each other, a horizontal boundary is present between CU #0 and CU #1.

The number and/or locations of samples used for filtering of the vertical boundary between CU #0 and CU #6 may be determined based on the horizontal size of at least one of CU #0 and CU #6.

When filtering is performed across the vertical boundary between CU #0 and CU #6, if the horizontal size or the vertical size of at least one of CU #0 and CU #6 is greater than inloop_large_block_threshold, filtering on V samples may be performed using U samples in CU #0, and filtering on V samples may be performed using U samples in CU #6. U samples may be consecutive in a horizontal direction from the vertical boundary.

For example, each of U and V may be a positive integer. (U, V) may be (4, 3), (5, 4), (6, 4), (7, 4), (6, 5), (5, 3) or (6, 3). U may be V or more.

When the horizontal size of CU #0 is identical to the horizontal size of CU #6, the number of samples used for a deblocking filter in CU #0 and the number of samples used for the deblocking filter in CU #6 may be equal to each other. Further, when the horizontal size of CU #0 is identical to the horizontal size of CU #6, the number of samples to be deblocking filtered in CU #0 and the number of samples to be deblocking filtered in CU #6 may be equal to each other.

The number and/or locations of samples used for filtering of the horizontal boundary between CU #0 and CU #1 may be determined based on the vertical size of at least one of CU #0 and CU #1.

When filtering is performed across the horizontal boundary between CU #0 and CU #1, if the horizontal size or the vertical size of at least one of CU #0 and CU #1 is greater than inloop_large_block_threshold, filtering on V samples may be performed using U samples in CU #0, and filtering on V samples may be performed using U samples in CU #1. U samples may be consecutive in a vertical direction from the horizontal boundary.

For example, each of U and V may be a positive integer. (U, V) may be (0, 0), (1, 1), (2, 1), (2, 2), (3, 2), (4, 3), (5, 4), (6, 4), (7, 4), (6, 5), (5, 3) or (6, 3). U may be V or more.

When the vertical size of CU #0 is different from the vertical size of CU #1, the number of samples used for a deblocking filter in CU #0 and the number of samples used for the deblocking filter in CU #1 may be different from each other. For example, when the vertical size of CU #1 is smaller than the vertical size of CU #0, the number of samples used for the deblocking filter in CU #1 may be less than the number of samples used for the deblocking filter in CU #0.

When the vertical size of CU #0 is different from the vertical size of CU #1, the number of samples to be deblocking filtered in CU #0 and the number of samples to be deblocking filtered in CU #1 may be different from each other. For example, when the vertical size of CU #1 is smaller than the vertical size of CU #0, the number of samples to be deblocking filtered in CU #1 may be less than the number of samples to be deblocking filtered in CU #0.

Filtering strength for a target boundary may be determined using at least one of horizontal sizes or vertical sizes of two blocks forming a block boundary.

In an embodiment, filtering strength may be determined based on the area or depth of the corresponding block, instead of the size of the block.

The number and/or locations of samples to be used for filtering on a block adjacent to the target boundary may be determined using at least one of horizontal sizes and vertical sizes of two blocks forming the block boundary.

The number of samples to be used for filtering may be determined depending on the size of the block having a smaller horizontal or vertical size between the two blocks. Alternatively, the number of samples to be used for filtering may be determined depending on the size of the block having a larger horizontal or vertical size between the two blocks.

The number and/or locations of samples used for filtering of the vertical boundary between CU #5 and CU #6 may be determined based on the horizontal size of at least one of CU #5 and CU #6.

When filtering is performed across the vertical boundary between CU #5 and CU #6, if the horizontal size or the vertical size of at least one of CU #5 and CU #6 is greater than inloop_large_block_threshold, filtering on V samples may be performed using U samples in CU #5, and filtering on V samples may be performed using U samples in CU #6. U samples may be consecutive in a horizontal direction from the vertical boundary.

For example, each of U and V may be a positive integer. (U, V) may be (0, 0), (1, 1), (2, 1), (2, 2), (3, 2), (4, 3), (5, 4), (6, 4), (7, 4), (6, 5), (5, 3) or (6, 3). U may be V or more.

When the horizontal size of CU #5 is different from the horizontal size of CU #6, the number of samples used for a deblocking filter in CU #5 and the number of samples used for the deblocking filter in CU #6 may be different from each other. For example, when the horizontal size of CU #5 is smaller than the horizontal size of CU #6, the number of samples used for the deblocking filter in CU #5 may be less than the number of samples used for the deblocking filter in CU #6.

When the horizontal size of CU #5 is different from the horizontal size of CU #6, the number of samples to be deblocking filtered in CU #5 and the number of samples to be deblocking filtered in CU #6 may be different from each other. For example, when the horizontal size of CU #5 is smaller than the horizontal size of CU #6, the number of samples to be deblocking filtered in CU #5 may be less than the number of samples to be deblocking filtered in CU #6.

When filtering strength for the vertical boundary between CU #0 and CU #6 is determined, the horizontal size or the vertical size of at least one of CU #0 and CU #6 may be used.

When filtering strength for the horizontal boundary between CU #0 and CU #1 is determined, the horizontal size or the vertical size of at least one of CU #0 and CU #1 may be used.

The filtering strength of a sample in the block having the larger size may be greater than the filtering strength of the sample in the block having the smaller size. For example, filtering strength for the vertical boundary between CU #0 and CU #6 may be greater than filtering strength for the horizontal boundary between CU #0 and CU #1.

Meanwhile, for a rectangular block, a rectangular transform such as a 32×16 or 16×8 form may be performed. Filtering may also be performed for a rectangular block or a transform boundary.

Figure 28:
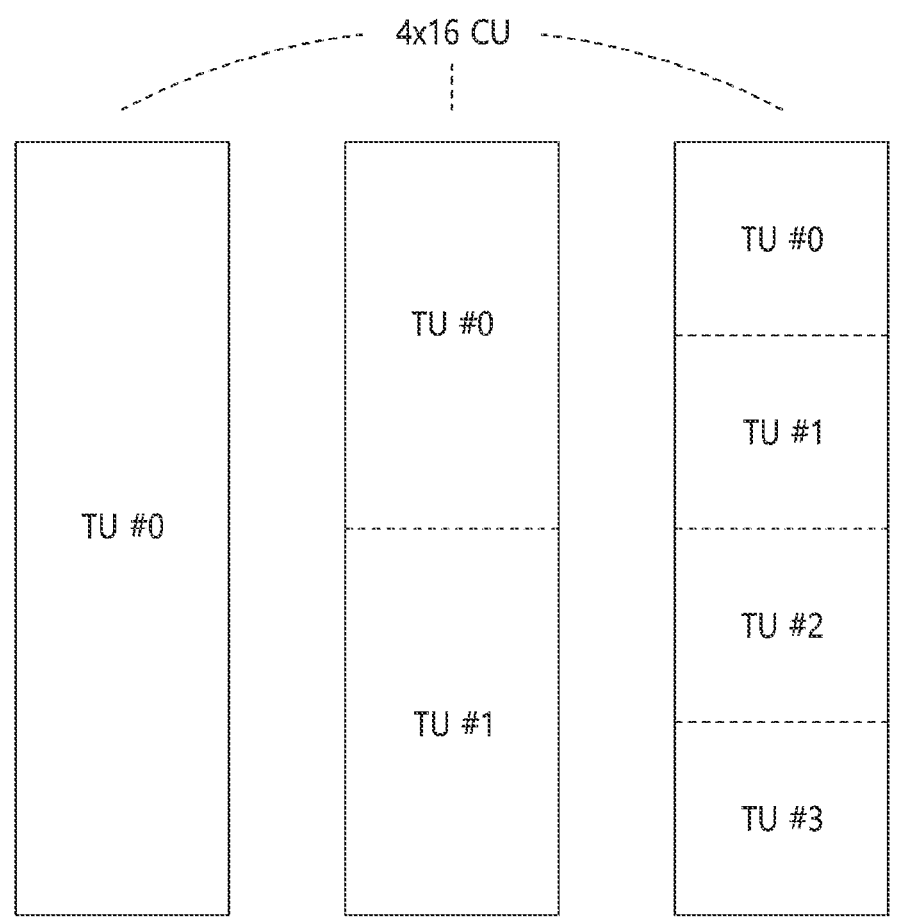
FIG. 28 illustrates multiple transform regions according to an embodiment.

FIG. 28 illustrates multiple transform regions according to an embodiment.

For a rectangular CU having a large aspect ratio, such as CU #1 or CU #2 of FIG. 27, several transform regions may be determined to improve transform efficiency, as illustrated in FIG. 28.

Deblocking filtering may be performed across boundaries between the several transform regions using at least one of coding parameters for the determined transform regions.

Filtering may be performed on samples adjacent to the block boundaries using at least one of the filtering strength and the number and/or locations of samples to be used for filtering, which are determined as described above with reference to FIGS. 18 to 28.

Hereinafter, a detailed filtering method based on filtering strength BS according to an embodiment will be described.

In the case where the range of the filtering strength is from 0 to 5, filtering using the following Equation 1 may be performed when the value of BS is less than 4. When BS is 4, filtering using the following Equation 2 may be performed. When BS is 5, filtering using the following Equation 3 and/or Equation 4 may be performed.

$$\Delta = \text{Clip}[-tc, tc, \{(q0-p0)<<2+(p1-q1)+4\}/8]$$

$$p'0 = p0 + \Delta$$

$$q'0 = q0 + \Delta \qquad \text{[Equation 1]}$$

Equation 1 may be an example of filtering when the value of BS is less than 4.

Here, the value of tc may be determined based on $|p2-p0|$, $|q2-q0|$, and $\beta$. $\beta$ may be determined by a quantization parameter (QP).

Clip[a, b, c] may be a function which outputs a when c is less than a, outputs b when c is greater than b, and outputs c when c is equal to or greater than a and less than or equal to b. In other words, the Clip[a, b, c] function may be a function of controlling the range so that the value of the output c does not fall out of the range from a to b. That is, Clip of Equation 1 may adjust the value of $((q0-p0)<<2+(p1-q1)+4)/8$ so that the value does not fall out of the range from $-tc$ to tc.

As shown in Equation 1, the values of p'0 and q'0 may be calculated through 4-tap filtering of q1, q0, p0, and p1. Filtering of samples p'1 and q'1 may be performed using a method similar to the method for calculating p'0 and q'0.

pn and qn may indicate the location of an n-th sample, as exemplified in FIG. 27. Here, n may be an integer of 0 or more.

$$q'0 = (1 \times q2 + 2 \times q1 + 2 \times q0 + 2 \times p0 + 1 \times p1 + 4)/8 \qquad \text{[Equation 2]}$$

Equation 2 may exemplify a method for calculating q'0 when the value of BS is 4.

In Equation 2, the values of filtering coefficients may be (1, 2, 2, 2, 1). 5-tap filtering using the filtering coefficients (1, 2, 2, 2, 1) may be applied to Equation 2.

By means of α and β determined by quantization parameters, whether samples near the boundary correspond to real edges may be determined.

The number of samples to be filtered through the filtering of Equation 2 may be limited to a maximum of J. (The number of samples may be J for a luma signal, and may be K for a chroma signal.) Due to this limitation, a maximum of L samples may be applied to each block adjacent to the boundary.

Each of J, K, and L may be a positive integer. For example, J may be 6, K may be 4, and L may be 3. Here, J may be K or more. Here, J may be L or more. Here, K may be L or more.

In an embodiment, a filtering method in which filtering strength (e.g., BS==5) for the boundary adjacent to a block having a relatively large size is additionally included may be provided.

Equations 3 and 4 may be used for filtering across the boundary of a block having a relatively large size.

Whether the size of a block is large may be determined by comparing the block size with a threshold value T. Here, T may be a positive integer. For example, T may be 32. In an example, when the horizontal size of the target block is T or more, the target block may be determined to be a large-sized block. In another example, when the vertical size of the target block is T or more, the target block may be determined to be a large-sized block.

For example, at least one of the number of samples used in filtering represented by Equation 3 or Equation 4 and the number of samples to be filtered may be greater than the number of samples when performing filtering using Equation 2. That is, Equation 3 or Equation 4 may represent an example of a filtering method that uses more samples.

$$q'0 = (1 \times q3 + 2 \times q2 + 3 \times q1 + 4 \times q0 + 3 \times p0 + 2 \times p1 + 1 \times p2 + 8)/16 \qquad \text{[Equation 3]}$$

Depending on Equation 3, q'0 may be calculated for a boundary adjacent to a block having a relatively large size. In Equation 3, the number of samples to be used in filtering may be increased compared to Equation 2. 7-tap filtering using the filtering coefficients (1, 2, 3, 4, 3, 2, 1) may be applied to Equation 3.

Based on Equation 3, blocking artifacts may be effectively reduced by increasing the number of neighbor samples adjacent to a block boundary upon filtering on a block having a relatively large size.

$$q'4 = (4 \times q5 + 3 \times q4 + 3 \times q3 + 2 \times q2 + 2 \times q1 + 1 \times q0 + 8)/16 \qquad \text{[Equation 4]}$$

Equation 4 may be used in filtering on a sample of q'4. Depending on Equation 4, blocking artifacts may be reduced by performing filtering on the sample q'4 adjacent to the boundary of a block having a relatively large size.

As the size of a block is larger, blocking artifacts may be reduced by increasing the number of samples to be used in filtering. In detail, filtering using a 7-tap filter, such as that shown in Equation 3, may be performed on a boundary adjacent to the block having a relatively large size.

For example, when the horizontal size of the target block is 32 or more, a 7-tap filter may be used in a vertical boundary. In contrast, when the horizontal size of the target block is less than 32, a filter with a number of taps smaller than 7 may be used on a vertical boundary.

In another example, when the vertical size of the target block is 32 or more, a 7-tap filter may be used in a horizontal boundary. In contrast, when the vertical size of the target block is less than 32, a filter with a number of taps smaller than 7 may be used on a horizontal boundary.

In an embodiment, the number of samples to be used in filtering and the number of samples to be filtered are not limited to the methods exemplified in the foregoing Equations, and various other methods besides the exemplified methods may be differently applied depending on the size, area, and depth of a block.

In the case where the range of the filtering strength is from 0 to 3, filtering may be performed using Equation 1 when the value of BS is 1. When BS is 2, filtering may be performed using the following Equation 2. When BS is 3, filtering may be performed using the following Equation 3 and/or Equation 4.

The number of samples used in filtering and the number of samples to be filtered may be determined based on the quantization parameters of the block on which filtering is performed.

For example, quantization parameters of block A and block B, adjacent to each other, may be compared with each other. Based on this comparison, filtering may be performed on V samples using U samples for a block having a larger quantization parameter value, and filtering may be performed on Y samples using X samples for a block having a smaller quantization parameter value. Here, U may be X or more, and V may be Y or more. Each of U, V, X and Y may be a positive integer. U may be V or more, and X may be Y or more.

The number of samples to be used in filtering and the number of samples to be filtered may be determined depending on at least one of coding parameters of a neighbor block adjacent to the target block.

The samples used in filtering may be limited to samples belonging to two blocks.

Filtering strength may be determined based on a prediction mode.

For example, filtering strength may be determined such that, when a block including samples adjacent to a block boundary is encoded/decoded in an intra-block copy (IBC) mode, low filtering strength is used for filtering (e.g., BS=1).

In an example, filtering strength may be determined such that, when a block boundary is the boundary of a transform block and a block having samples adjacent to a block boundary is encoded/decoded in a combined intra-inter prediction (CIIP) mode, high filtering strength is used for filtering (e.g., BS=2).

The filtering strength may be determined based on a transform mode.

For example, filtering strength may be determined such that, when a secondary transform is performed on a block having a sample adjacent to a block boundary, specific filtering strength is used for filtering (e.g., BS=2).

When a second transform is performed, the probability of an error occurring in a high-frequency component of a residual signal may be increased. Therefore, high filtering strength may be determined to be used for filtering.

Filtering strength may be determined in consideration of both a block size and whether to use a secondary transform.

The number of samples to be used for filtering may be determined based on the sizes of a target block and a neighbor block and a transform mode.

For example, when the horizontal sizes of block A and block B are 32, the transform mode of block A is a DCT-2 horizontal transform, and the transform mode of block B is a DST-7 horizontal transform or a DCT-8 horizontal transform, the number of samples to be used for filtering in block A may be determined to be less than the number of samples to be used for filtering in block B.

Filtering strength may be determined depending on the types of two blocks adjacent to a boundary. Filtering strength may be determined depending on whether a target boundary corresponds to 1) a boundary between a transform block and another transform block, 2) a boundary between a coding block and a transform block, and 3) a boundary between a coding block and another coding block.

Filtering strength may be determined depending on the transform of a block and the quantization type.

For example, when a transform and quantization size is 64×32 or 32×64 or more, the highest filtering strength may be used.

As the unit for performing transform and quantization is larger, the number of samples to be used for filtering may be increased.

One of embodiments may be used for deblocking filtering of a luma signal or deblocking filtering of a chroma signal.

When filtering is performed, the number of samples to be used for filtering may be determined differently depending on the block size. As the size of at least one of a coding block, a prediction block, and a transform block is increased, the number of samples to be used for filtering may also be increased.

When filtering is performed, the number of samples to be filtered may be determined to differ depending on the block size, and the number of samples to be filtered may be further increased as the size of at least one of a coding block, a prediction block, and a transform block is increased.

The filtering strength applied to a luma component may be equally applied to a chroma component. Alternatively, the filtering strength applied to a luma component and the filtering strength applied to a chroma component may be independent of each other.

The number of samples to be used for filtering of a luma component and the number of samples to be used for filtering of a chroma component may be independent of each other. Alternatively, the number of samples to be used for filtering of a chroma component may be less than or equal to the number of samples to be used for filtering of a luma component.

At least one of 1) whether filtering is to be performed. 2) filtering strength, and 3) a filtering method may be additionally determined using neighbor samples at a target boundary, which is the target of filtering.

By using the gradient of neighbor samples at the boundary, whether an image of the neighbor samples at the boundary corresponds to a real edge of the image may be determined, and whether blocking artifacts have occurred due to the encoding/decoding procedure of a block may be determined. By utilizing the results of the determinations, whether filtering is to be performed may be determined. Instead of the gradient, the results calculated in an operation that uses the value of at least one of samples belonging to at least one of block A and block B may be used for determinations.

Hereinafter, filtering across a tile boundary according to an embodiment will be described. Here, filtering, which will be described later, may be applied to at least one of a picture, a sub-picture, a slice, a brick, etc., instead of a tile.

A tile may be used in various application fields, and may be useful especially for a high-definition 360° image.

A 360° image may be generated by projecting a 3D space onto 2D-type faces. Projection methods, such as cube map projection (CMP), as well as EquiRectangular Projection (ERP), may rearrange multiple faces. Therefore, the faces generated by the projection methods may not be spatially continuous. Alternatively, a picture boundary may be continuous to a certain tile boundary, or individual picture boundaries may be continuous to each other. Generally, the encoding apparatus 1600 may set a single face to a single tile. Therefore, whether filtering is to be performed and which filtering method is to be used may be important issues.

If filtering is performed across all boundaries, filtering is performed across a boundary between two discontinuous faces, thus resulting in degradation of image quality. On the other hand, unless filtering is performed across all boundaries, filtering is not performed across a boundary between two continuous faces, thus resulting in blocking artifacts. Further, unless filtering is performed across the boundary of a picture, blocking artifacts may occur even when a decoded picture is output to a user in a 3D form.

In order to solve these problems, whether filtering is to be performed on a picture boundary of each tile and a tile boundary and which filtering method is to be used may be signaled from the encoding apparatus 1600 to the decoding apparatus 1700 through at least one of a parameter set and a header. The encoding apparatus 1600 may generate entropy-encoded information by performing entropy encoding as to whether filtering is to be performed across a picture boundary and a tile boundary of each tile and the filtering method therefor. The entropy-encoded information may be included in at least one of a parameter set and a header. The decoding apparatus 1700 may derive information about whether filtering is to be performed across the picture boundary and the tile boundary of each tile and the filtering method therefor by performing entropy decoding on the entropy-encoded information.

Here, one of a parameter set and a header may include a sequence parameter set, a picture parameter set, an adaptation parameter set, a picture header, a slice header, a tile header, a brick header, etc.

A method for projecting and rearranging a 360° image may be signaled from the encoding apparatus 1600 to the decoding apparatus 1700 through at least one of a parameter set and a header. The encoding apparatus 1600 may generate entropy-encoded information by performing entropy encoding on the method for projecting and rearranging a 360° image. The entropy-encoded information may be included in at least one of a parameter set and a header. The decoding apparatus 1700 may acquire the 360° image projection method and the rearrangement method by performing entropy decoding on the entropy-encoded information. By signaling the 360° image projection method and the rearrangement method, the encoding apparatus 1600 and the decoding apparatus 1700 may implicitly derive information about whether filtering is to be performed on the picture boundary and the tile boundary of each tile.

Here, one of a parameter set and a header may include a sequence parameter set, a picture parameter set, an adaptation parameter set, a picture header, a slice header, a tile header, a brick header, etc.

As described above, filtering may not be implicitly performed across the boundary between discontinuous tiles, and may be implicitly performed across the boundary between continuous tiles.

For the boundary of a picture in a tile, filtering may be performed using reconstructed pixels located at a boundary between continuous faces in a 3D space before being projected in a 2D form and pieces of encoded/decoded information of the reconstructed pixels.

To perform this filtering, the encoding apparatus 1600 may signal information indicating a tile and the location in the tile, on which a boundary is to be filtered, to the decoding apparatus 1700 through at least one of a parameter set and a header. The decoding apparatus 1700 may determine, based on the signaled information, whether filtering across a picture boundary in a specific tile is to be performed, and a tile and the location in the tile on which filtering is to be performed.

The 360° image projection method and the rearrangement method are signaled through at least one of a parameter set and a header, and thus the encoding apparatus 1600 and/or the decoding apparatus 1700 may implicitly derive information about whether filtering is to be performed on a picture boundary in each tile, and may implicitly derive a tile and the location in the tile at which a boundary is to be used for filtering.

Here, the filter used for filtering may include a loop filter, which performs filtering using pixels reconstructed while straddling the boundary or using pieces of encoded/decoded information, in addition to the deblocking filter. The loop filter may include an adaptive sample offset and an adaptive loop filter.

FIG. 29 illustrates six faces configured by projecting a 360° image in the form of a cube map according to an example.

The input and output of the encoding apparatus 1600 and/or the decoding apparatus 1700 may have a rectangular shape. The six faces generated by projection may be rearranged in a rectangular shape without spaces therebetween. By means of this rearrangement, information about six faces may be compressed.

Figure 30:
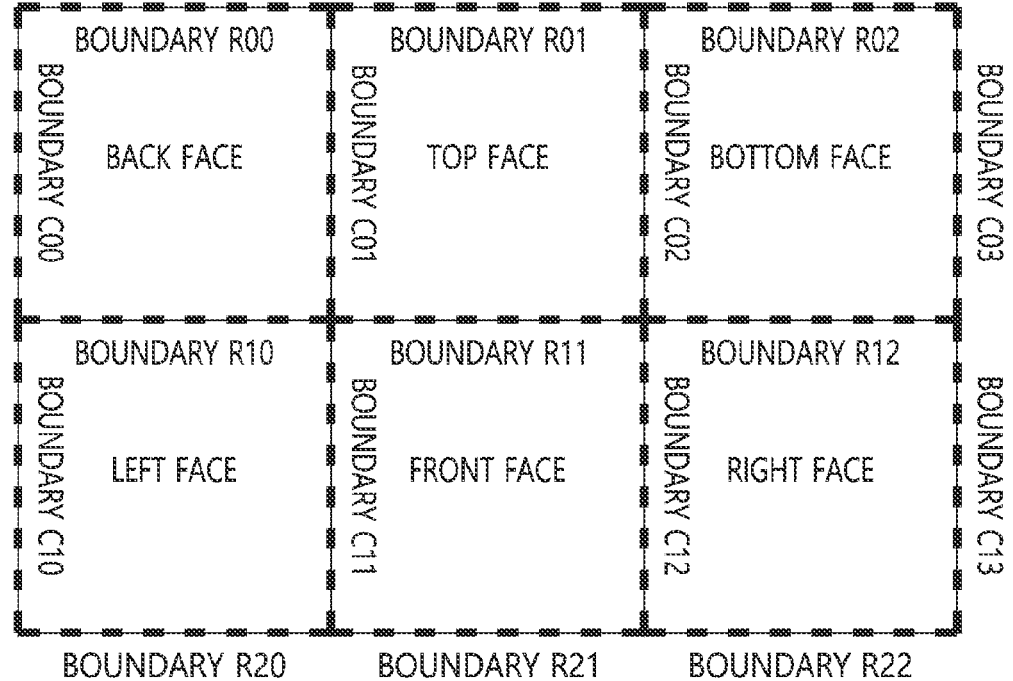
FIGS. 30 and 31 illustrate the rearrangement of six faces projected in the form of a cube map according to an example.
Figure 31:
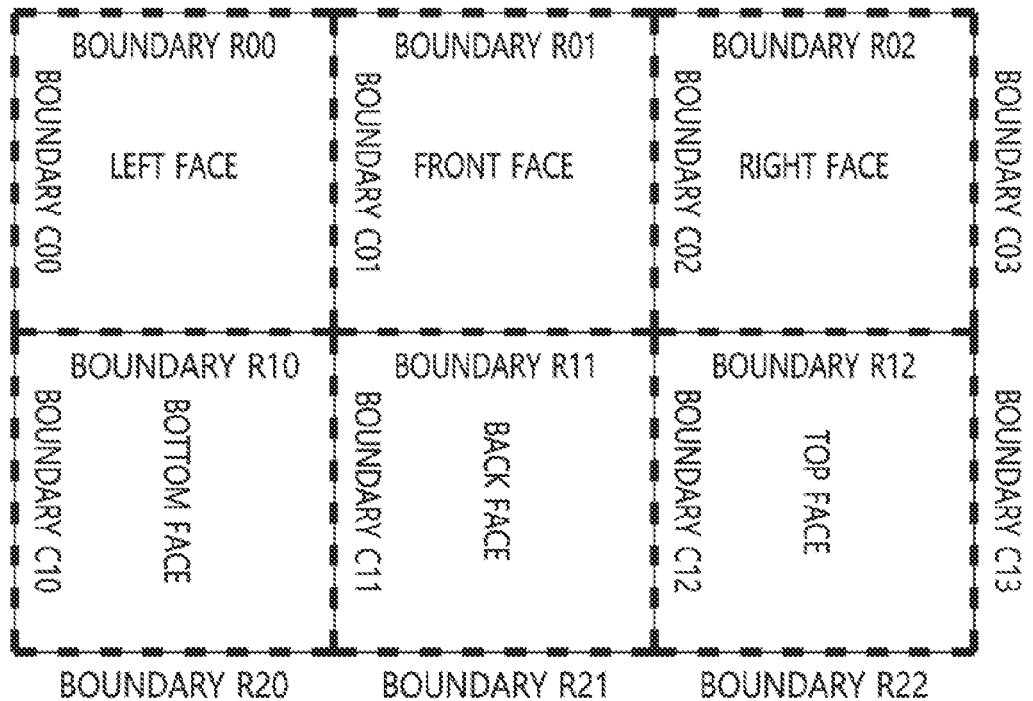

FIGS. 30 and 31 illustrate the rearrangement of six faces projected in the form of a cube map according to an example.

FIGS. 30 and 31 illustrate the rearrangement of six faces projected in the form of a cube map.

FIG. 30 illustrates rearrangement using a CMP.

FIG. 31 illustrates rearrangement using a rotated sphere projection (RSP).

Among the faces illustrated in FIG. 30, faces that are spatially continuous in 3D space may be described as follows: 1) left face and front face, 2) front face and right face, and 3) top face and front face.

The remaining faces may be spatially discontinuous faces in 3D space.

When faces are respectively encoded/decoded as tiles, a boundary C11, a boundary C12, and a boundary R11 may be tile boundaries, but may be spatially continuous boundaries, and a boundary R10, a boundary R12, a boundary C01, and a boundary C02 may be both tile boundaries and spatially discontinuous boundaries.

Filtering may be performed across the boundary C11, the boundary C12, and the boundary R11, which are tile boundaries, but are spatially continuous boundaries. By means of filtering, blocking artifacts may be removed, or image quality may be improved at these boundaries.

Filtering may not be performed across the boundary R10, the boundary R12, the boundary C01, and the boundary C02, which are both tile boundaries and spatially discontinuous boundaries. From the standpoint of image quality, not performing filtering across the boundaries may be preferable.

{boundary COO and boundary C13} and {boundary R00 and boundary R01} may be picture boundaries, but may be continuous boundaries. The boundaries, which are continuous, but are picture boundaries, may be assumed to be boundaries adjacent to each other. Under this assumption, filtering may be performed on boundaries which are both picture boundaries and continuous boundaries. By means of this filtering across the boundaries, image quality may be improved.

Among the faces illustrated in FIG. 31, the top face, the back face, and the bottom face are rotated at an angle of 90°.

By this rotation, among the boundaries between the faces illustrated in FIG. 31, only the boundary R10, the boundary R11, and the boundary R12 may be spatially discontinuous, and the remaining boundaries may be spatially continuous.

Filtering may not be performed on the boundary R10, the boundary R11, and the boundary R12, which are discontinuous boundaries. From the standpoint of image quality, not performing filtering across discontinuous boundaries may be preferable.

{boundary COO and boundary R11} and {boundary ROO and boundary R12} may be picture boundaries, but may be continuous boundaries. Boundaries that are continuous but are also picture boundaries may be assumed to be boundaries adjacent to each other. Under this assumption, filtering may be performed across boundaries which are both picture boundaries and continuous boundaries. By means of this filtering across the boundaries, image quality may be improved.

When the projection method and the rearrangement method illustrated in FIG. 31 are used, the corresponding projection method and rearrangement method may be signaled from the encoding apparatus 1600 to the decoding apparatus 1700 through at least one of a parameter set and a header. Also, whether filtering is to be performed only on the right boundary or left boundary of a tile and the filtering method therefor may be signaled from the encoding apparatus 1600 to the decoding apparatus 1700 through at least one of a parameter set and a header. The encoding apparatus 1600 may generate entropy-encoded information by performing entropy encoding with regard to 1) the projection method and the rearrangement method and 2) whether filtering is to be performed on the right boundary or the left boundary of a tile and the filtering method therefor. The entropy-encoded information may be included in at least one of a parameter set and a header. The decoding apparatus 1700 may derive 1) the projection method and the rearrangement method and 2) whether filtering is to be performed on the right boundary or the left boundary of a tile and the filtering method therefor by performing entropy decoding on the entropy-encoded information. Filtering across an upper boundary and a lower boundary of a tile may (implicitly) not be performed.

Alternatively, when the projection method and the rearrangement method illustrated in FIG. 31 are used, the corresponding projection method and the rearrangement method may be signaled from the encoding apparatus 1600 to the decoding apparatus 1700 through at least one of a parameter set and a header. Further, whether filtering is to be performed only across the boundaries of a picture may be signaled from the encoding apparatus 1600 to the decoding apparatus 1700 through at least one of a parameter set and a header. The encoding apparatus 1600 may generate entropy-encoded information by performing entropy encoding with regard to 1) the projection method and the rearrangement method and 2) whether filtering is to be performed on the boundaries of a picture. The entropy-encoded information may be included in at least one of a parameter set and a header. The decoding apparatus 1700 may derive 1) the projection method and the rearrangement method and 2) whether filtering is to be performed on the boundaries of a picture by performing entropy decoding on the entropy-encoded information. The decoding apparatus 1700 may implicitly determine a tile and the location in the tile on which a boundary is to be used to perform filtering, and may perform filtering across the picture boundary in the tile through the determination.

FIG. 32 illustrates syntax and semantics of a PPS defined in relation to whether each boundary is to be filtered and the signaling of a filtering method according to an example.

Whether filtering is to be performed on the picture boundary and the tile boundary of each tile and the filtering method therefor may be signaled from the encoding apparatus 1600 to the decoding apparatus 1700 through loop_filter_across_tile_col[i][j] and loop_filter_across_tile_row[i][j].

loop_filter_across_tile_upper_boundary[i] and loop_filter_across_tile_left_boundary[i] may be syntax elements indicating, for the picture boundary of each tile, the tile on which filtering is to be performed and the boundary of the tile.

Here, loop_filter_across_tile_upper_boundary[i] may denote location information of an i-th upper boundary, and the location information of the i-th upper boundary may be information about the location of the upper boundary of an i-th tile.

Further, loop_filter_across_tile_left_boundary[i] may denote location information of an i-th left boundary, and the location information of the i-th left boundary may be information about the location of the left boundary of an i-th tile.

If an image is not a 360° image, filtering across a picture boundary may not be required. Therefore, when the image is not a 360° image, loop_filter_across_tile_col[i][0], loop_filter_across_tile_row[i][0], loop_filter_across_tile upper_boundary[i], and loop_filter_across_tile_left_boundary[i] may not be signaled, and thus the fact that filtering is not performed by the encoding apparatus 1600 and the decoding apparatus 1700 may be implicitly derived.

For a CTU or a unit having a predefined size, whether filtering is to be performed on a tile boundary and the filtering method therefor may be signaled. The unit having a predefined size may be fixed at the same value by the encoding apparatus 1600 and the decoding apparatus 1700, and information indicating the unit of the predefined size may be signaled through a sequence parameter set, a picture parameter set, an adaptation parameter set, a picture header, a slice header, a tile header, a brick header, etc.

For this operation, filtering execution information may be signaled from the encoding apparatus 1600 to the decoding apparatus 1700. The filtering execution information may be a flag or a bit.

The filtering execution information may be information indicating, at one time, whether filtering is to be performed on boundaries of all blocks included in a tile boundary.

The filtering execution information may be signaled through a sequence parameter set, a picture parameter set, an adaptation parameter set, a picture header, a slice header, a tile header, a brick header, or the like.

The encoding apparatus 1600 may generate entropy-encoded information by performing entropy encoding on the filtering execution information. The entropy-encoded information may be included in at least one of a parameter set and a header. The decoding apparatus 1700 may derive the filtering execution information by performing entropy decoding on the entropy-encoded information.

When filtering is performed, each individual piece of filtering execution information may be signaled from the encoding apparatus 1600 to the decoding apparatus 1700.

Each individual piece of filtering execution information may include a number of pieces of indication information less than or equal to the number of CTUs (or blocks having a predefined size) located at the tile boundary. For example, the indication information may be a flag or a bit. Each individual piece of filtering execution information may indicate whether filtering is to be performed across a tile boundary in which a corresponding CTU (or block having a predefined size) is located and/or the filtering method therefor. In other words, each individual piece of filtering execution information may indicate whether filtering is to be performed across a tile boundary in which the corresponding CTU (or block having a predefined size) is located and/or the filtering method therefor.

The encoding apparatus 1600 may generate entropy-encoded information by performing entropy encoding on each individual piece of filtering execution information. The entropy-encoded information may be included in at least one of a parameter set and a header. The decoding apparatus 1700 may derive each individual piece of filtering execution information by performing entropy decoding on the entropy-encoded information.

The decoding apparatus 1700 may perform equal tile boundary filtering across boundaries in the tile using each individual piece of filtering execution information. Alternatively, the decoding apparatus 1700 may determine, using each individual piece of filtering execution information, whether filtering is to be performed on each CTU (or each block having a predefined size) located at the tile boundary, and the filtering method therefor.

Signal-Adaptive Deblocking Filtering

As a method for filtering a block boundary, signal-adaptive deblocking filtering may be performed. A signal may be at least one of a luma component signal and a chroma component signal.

The signal-adaptive deblocking filtering may be performed based on the value of a reconstructed signal component.

The signal-adaptive deblocking filtering may determine whether deblocking filtering is to be performed based on the value of a reconstructed signal component.

The signal-adaptive deblocking filtering may determine a filtering strength based on the value of a reconstructed signal component.

The signal-adaptive deblocking filtering may determine a quantization parameter based on the value of a reconstructed signal component, and may perform deblocking filtering using the determined quantization parameter.

The number of reconstructed signal components may be one or more. When one or more values are used, a statistical value of the reconstructed signal components may be calculated. The calculated statistical value may be used for signal-adaptive deblocking filtering.

Filtering in deblocking filtering may be performed based on at least one of tc and β. tc and β may be threshold values that are applied when the strength of a filter is determined or when filtering is performed.

tc and β0 may be determined based on quantization parameters. The quantization parameters may be quantization parameters of one or more blocks adjacent to the block boundary of a target block.

When quantization parameters of one or more blocks are used, the statistical value of the quantization parameters may be calculated, and the calculated statistical value may be determined to be a quantization parameter for the block boundary.

For example, when the quantization parameters are determined based on the value of the reconstructed signal component, and signal-adaptive deblocking filtering is performed, the quantization parameters for the block boundary may be determined by adding a quantization parameter offset to the quantization parameters for the block boundary. The quantization parameter offset may be calculated based on the value of the reconstructed signal component.

Figure 33:
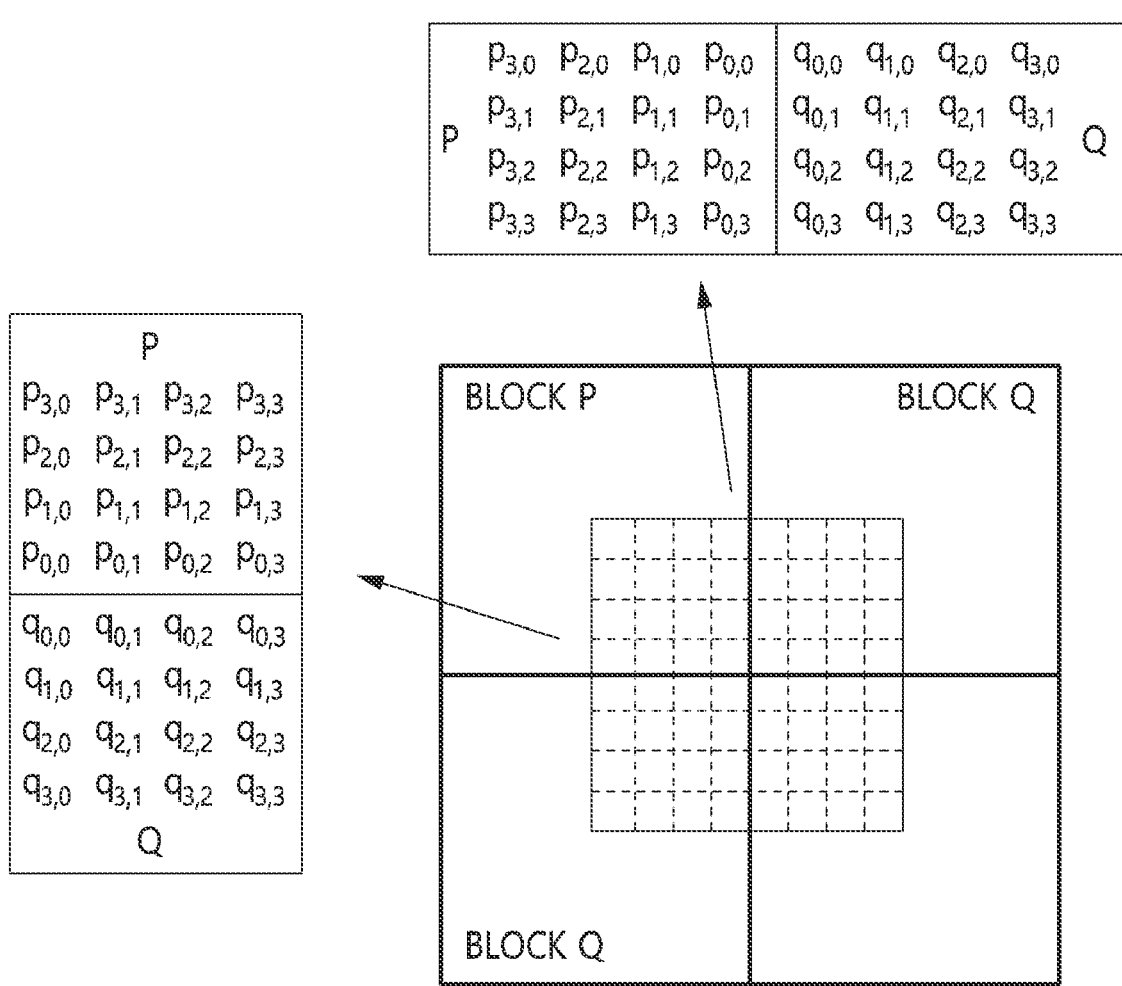
FIG. 33 illustrates the locations of reconstructed samples in a block adjacent to a block boundary according to an example.

FIG. 33 illustrates the locations of reconstructed samples in a block adjacent to a block boundary according to an example.

The value of a reconstructed signal component or the statistical value of the reconstructed signal component may be calculated using at least one of reconstructed samples in a block adjacent to a block boundary.

For example, as shown in the following Equation 5, the statistical value compLevel of the reconstructed signal component may be calculated.

$$compLevel=(p_{0,0}+p_{0,3}+q_{0,0}+q_{0,3})>>M \qquad \text{[Equation 5]}$$

The reconstructed samples calculated using the statistical value of the reconstructed signal component are not limited to Equation 5. In $p_{i,k}$ and $q_{i,k}$, i and k may each have a value ranging from 0 to N.

N may indicate the maximum number of horizontal/vertical samples used for deblocking filtering. N may be a positive integer. For example, N may be 3.

M may be log 2(m). m may be the number of reconstructed signal samples used to calculate the statistical value compLevel for the reconstructed signal component. M may be a positive integer. For example, in Equation 5, M may be 2. Depending on the number of reconstructed signal samples, M may be changed.

Based on the statistical value compLevel of the reconstructed signal component, a quantization parameter offset value qPOffset may be calculated. Here, qPOffset may be determined for each of intervals to which the value of compLevel can belong.

For example, for the ranges within which the value of compLevel can fall, the value of qPOffset may be calculated based on the offsets qPOffset, preset by the encoding apparatus 1600 and/or the decoding apparatus 1700.

For example, for each of the ranges of the compLevel value, information about at least one of the minimum value, the maximum value, and the size of the corresponding range may be signaled from the encoding apparatus 1600 to the decoding apparatus 1700. The size may be the difference between the maximum value of a previous range and the maximum value of a subsequent range. The decoding apparatus 1700 may derive the ranges for the value of compLevel using the information about at least one of the minimum value, the maximum value, and the size of the signaled range.

The encoding apparatus 1600 may generate entropy-encoded information by performing entropy encoding on the information about at least one of the minimum value, the maximum value, and the size of the range. The entropy-encoded information may be signaled from the encoding apparatus 1600 to the decoding apparatus 1700. The decoding apparatus 1700 may derive the information about at least one of the minimum value, the maximum value, and the size of the range by performing entropy decoding on the entropy-encoded information.

Also, the value of qPOffset for each range may be signaled from the encoding apparatus 1600 to the decoding apparatus 1700. The decoding apparatus 1700 may calculate qPOffset for each of the ranges using the signaled qPOffset value.

The encoding apparatus 1600 may generate entropy-encoded information by performing entropy encoding on the value of qPOffset for each range. The entropy-encoded information may be signaled from the encoding apparatus 1600 to the decoding apparatus 1700. The decoding apparatus 1700 may derive the value of qPOffset for each range by performing entropy decoding on the entropy-encoded information.

For example, as shown in the following Equation 6, a quantization parameter $qP_{BlockEdge}$ for a block boundary may be calculated using the quantization parameter offset value qPOffset, which is obtained based on the value of the reconstructed signal component.

$$qP_{BlockEdge}=((Qp_Q+Qp_P+1)>>1)+qPOffset \qquad \text{[Equation 6]}$$

When the block boundary is a vertical boundary, $Qp_P$ may denote the quantization parameter of a left block in the block boundary. $Qp_Q$ may denote the quantization parameter of a right block in the block boundary.

When the block boundary is a horizontal boundary, $Qp_P$ may denote the quantization parameter of an upper block in the block boundary, and $Qp_Q$ may denote the quantization parameter of a lower block in the block boundary. That is, $Qp_P$ may denote the quantization parameter of a block in which a reconstructed sample $p_{i,k}$ is included, and $Qp_Q$ may denote the quantization parameter of a block in which a reconstructed sample $q_{i,k}$ is included.

At least one of tc and β for the block boundary may be determined using the quantization parameter $qP_{BlockEdge}$ for the block boundary, and deblocking filtering may be performed based on the determination.

In signal-adaptive deblocking filtering, at least one of different quantization parameter offset values qPOffset and quantization parameters $qP_{BlockEdge}$ for different block boundaries may be used for a deblocking filtering procedure based on at least one of the prediction mode, color component, size, shape, primary transform type, secondary transform combination, whether a transform is to be used, filtering strength, a sample value, and the statistical value of samples, and coding block flag for at least one of blocks near the boundary.

At least one of the quantization parameter offset value qPOffset that is used and the quantization parameter $qP_{BlockEdge}$ for the block boundary that is used may vary depending on at least one of the prediction mode, color component, size, shape, primary transform type, secondary transform combination, whether a transform is to be used, filtering strength, sample value, and statistical value of samples, and coding block flag for at least one of blocks near the boundary.

The prediction mode may indicate the prediction mode of a block. The prediction mode may indicate which one of an intra prediction mode, an inter prediction mode, and an intra-block copy mode has been used to encode/decode the block.

The color component may indicate the color component of the block. The color component may indicate a luma (Y) component or a chroma component.

The size may indicate at least one of a block size and a transform size.

The shape may indicate at least one of a block shape and a transform shape.

The primary transform may indicate the type of transform that is performed on a residual block so as to generate transform coefficients. The primary transform may indicate at least one of DCT-J-based integer transforms and DST-K-based integer transforms, such as DCT-2, DCT-8, DST-7, DCT-4, and DST-4. Each of J and K may be a positive integer.

The secondary transform may indicate at least one of transforms for rotating at least one of transform coefficients based on an angle. The secondary transform may be performed after the primary transform has been performed.

Whether a transform is to be used may indicate whether at least one of a primary transform and a secondary transform is to be used in a residual block. Whether a transform is to be used may include at least one of whether a primary transform is to be used and whether a second transform is to be used.

The encoding block flag may indicate whether an encoded transform coefficient (or quantized level) for a block is present in a bitstream.

In signal-adaptive deblocking filtering, at least one of different quantization parameter offsets qPOffset and different quantization parameters $qP_{BlockEdge}$ for different block boundaries may be selected for the deblocking filtering procedure based on at least one coding parameter for at least one of blocks present near the boundary.

At least one of the quantization parameter offset qPOffset and the quantization parameter $qP_{BlockEdge}$ for the block boundary may be changed depending on at least one coding parameter for at least one of blocks present near the boundary.

Hereinafter, syntax elements, semantics of the syntax elements, and encoding/decoding procedures, which are required in order to implement signal-adaptive deblocking filtering in the encoding apparatus 1600 and/or the decoding apparatus 1700, are exemplified.

In FIGS. 34, 35, 36 and 37, syntax element information required for the signal-adaptive deblocking filtering is exemplified.

At least one syntax element required for signal-adaptive deblocking filtering may be encoded/decoded in at least one of a parameter set, a header, and a brick. Hereinafter, encoding may refer to entropy encoding. Decoding may refer to entropy decoding.

At least one of a parameter set, a header, and a brick may be at least one of a video parameter set, a decoding parameter set, a sequence parameter set, an adaptation parameter set, a picture parameter set, a picture header, a sub-picture header, a slice header, a tile group header, a tile header, and a brick.

In at least one of signaled units, such as a parameter set, a header, and a brick, signal-adaptive deblocking filtering that uses syntax elements for signal-adaptive deblocking filtering may be used.

For example, when a syntax element for signal-adaptive deblocking filtering is encoded/decoded in a sequence parameter set, signal-adaptive deblocking filtering that uses a syntax element having the same value for the unit of a sequence may be performed.

For example, when a syntax element for signal-adaptive deblocking filtering is encoded/decoded in a slice header, signal-adaptive deblocking filtering that uses a syntax element having the same value for the unit of a slice may be performed.

For example, when a syntax element for signal-adaptive deblocking filtering is encoded/decoded in an adaptation parameter set, signal-adaptive deblocking filtering that uses a syntax element having the same value for units which refer to the same adaptation parameter set may be performed.

The adaptation parameter set may mean a parameter set that can be referred to and shared by different pictures, different sub-pictures, different slices, different tile groups, different tiles, or different bricks. Sub-pictures, slices, tile groups, tiles, or bricks in a picture may respectively refer to different adaptation parameter sets, and may use information contained in the adaptation parameter sets referred to thereby.

FIG. 34 illustrates a first syntax for signal-adaptive deblocking filtering according to an example.

ladf_enabled_flag may be information indicating whether signal-adaptive deblocking filtering is to be used by exploiting a signal-adaptive deblocking filtering syntax element in the unit of a parameter set, a header or a brick that is signaled.

The signal-adaptive deblocking filtering syntax element may be at least one of num_ladf_intervals_minus2, ladf_lowest_interval_qp_offset, ladf_qp_offset[i] and ladf_delta_threshold_minus1[i].

num_ladf_intervals_minus2+2 may indicate the number of signal-adaptive deblocking filtering syntax elements in the unit of a parameter set, a header or a brick that is signaled.

The signal-adaptive deblocking filtering syntax element may be at least one of ladf_qp_offset[i] and ladf_delta_threshold_minus1[i].

num_ladf_intervals_minus2 may have a value ranging from 0 to N. Here, N may be a positive integer. For example, N may be 3.

ladf_lowest_interval_qp_offset may indicate a quantization parameter offset value qPOffset for deriving a quantization parameter $qP_{BlockEdge}$ for a block boundary.

ladf_lowest_interval_qp_offset may indicate a quantization parameter offset value qPOffset related to a first interval to which the reconstructed signal component statistical value compLevel can belong.

ladf_lowest_interval_qp_offset may have a value ranging from 0 to N. Here. N may be a positive integer. For example, N may be 63. Further, N may indicate the maximum value that the quantization parameter can have.

ladf_qp_offset[i] may indicate an array of quantization parameter offset values qPOffset for deriving the quantization parameter $qP_{BlockEdge}$ for a block boundary.

ladf_qp_offset[i] may indicate a quantization parameter offset value qPOffset for each of intervals to which the statistical value reconstructed signal component statistical value compLevel can belong.

ladf_qp_offset[i] may have a value ranging from 0 to N. Here, N may be a positive integer. For example, N may be 63. Further, N may indicate a maximum value that the quantization parameter can have.

ladf_delta_threshold_minus1[i] may be a value used to calculate LadfIntervalLowerBound[i]. This may indicate a minimum value for an i-th interval to which the reconstructed signal component statistical value compLevel can belong.

LadfIntervalLowerBound[i] may have a value ranging from 0 to N. Here, N may be a positive integer. For example, N may be $2^{BitDepth}$–3. BitDepth may indicate the bit depth of a signal for a luma component or a chroma component.

FIG. 35 illustrates a second syntax for signal-adaptive deblocking filtering according to an example.

ladf_delta_prec_minus1+1 may denote the number of bits required in order to signal/represent all values of ladf_delta_threshold_minus1[i].

ladf_delta_prec_minus1 may have a value ranging from 0 to N. Here, N may be a positive integer. For example, N may be BitDepth–M. M may be a positive integer. For example, M may be 2.

FIG. 36 illustrates a third syntax for signal-adaptive deblocking filtering according to an example.

ladf_delta_prec_minus1[i]+1 may denote the number of bits required in order to signal/represent each ladf_delta_threshold_minus1[i].

ladf_delta_prec_minus1[i] may have a value ranging from 0 to N. Here, N may be a positive integer. For example, N may be BitDepth–M. M may be a positive integer. For example, M may be 2.

FIG. 37 illustrates a fourth syntax for signal-adaptive deblocking filtering according to an example.

ladf_delta_bit_depth may denote the number of bits required in order to signal/represent ladf_delta_threshold_minus1[i].

The value of ladf_delta_bit_depth may have a value ranging from 0 to BitDepth.

The value of LadfIntervalLowerBound[0] may be set to 0.

When i has a value ranging from 0 to num_ladf_intervals_minus2, LadfIntervalLowerBound[i+1] may be calculated using at least one of the following Equations 7 and Equation 8.

$$\text{LadfIntervalLowerBound}[i+1]=\text{LadfIntervalLowerBound}[i]+\text{ladf\_delta\_threshold\_minus1}[i]+1 \qquad \text{[Equation 7]}$$

$$\text{LadfIntervalLowerBound}[i+1]=\text{LadfIntervalLowerBound}[i]+(\text{ladf\_delta\_threshold\_minus1}[i]<<(\text{BitDepth}-\text{ladf\_delta\_bit\_depth}))+1 \qquad \text{[Equation 8]}$$

At least one of the following binarization, debinarization, entropy encoding method and/or entropy decoding method may be applied to at least one of syntax elements for signal-adaptive deblocking filtering, which are signaled from the encoding apparatus 1600 to the decoding apparatus 1700.

Signed 0-th order Exp_Golomb binarization/debinarization method (se(v))

Signed K-th order Exp_Golomb binarization/debinarization method (sek(v))

Unsigned positive integer 0-th order Exp_Golomb binarization/debinarization method (ue(v))

Unsigned positive integer K-th order Exp_Golomb binarization/debinarization method (uek(v))

Fixed-length binarization/debinarization method (f(n))

Truncated rice binarization/debinarization method or truncated unary binarization/debinarization method (tu(v))

Truncated binary binarization/debinarization method (tb(v))

Context-adaptive arithmetic encoding/decoding method (ae(v))

Byte-based bit string (b(8))

Signed integer binarization/debinarization method (i(n))

Unsigned positive integer binarization/debinarization method (u(n))

Unary binarization/debinarization method

As in the following description, a quantization parameter for a block boundary may be determined by adding a quantization parameter offset value calculated based on the value of the reconstructed signal component to the quantization parameter value for a block boundary.

First, the quantization parameter offset value qPOffset may be calculated.

When the value of ladf_enabled_flag is a second value (e.g., "1"), the following procedures 1) and 2) may be performed.

Procedure 1) As described above in Equation 5, compLevel may be calculated.

Procedure 2) A quantization parameter offset value qPOffset may be set to ladf_lowest_interval_qp_offset, and may be changed based on the following code 1 after being set.

```
[Code 1]
for( i =0; i <num_ladf_intervrals_minus2 + 1; i++) {
    if( compLevel > LadfIntervalLowerBound[ i + 1] )
        qPOffset = ladf_qp_offset[ i ]
    else
```

-continued

```
                    break
            }
```

5

Instead of procedure 2, the quantization parameter offset value qPOffset may be set to ladf_lowest_interval_qp_off-set, and may be changed based on the following Code 2 after being set.

```
[Code 2]
for( i = 0; i < num+ladf+intervals_minus2 + 1; i++ ) {
    if( compLevel < LadantervalLowerBound[ i + 1 ] )
        qPOffset = ladf_qp_offset[ i ]
    else
        break
}
```

Alternatively, instead of procedure 2, the quantization parameter offset value qPOffset may be set to ladf_low-est_interval_qp_offset, and may be changed based on the following Code 3 after being set.

```
[Code 3]
for( i = 0; I < num_ladf_intervals_minus2 + 1; i++ ) {
    if( compLevel <= LadfintervalLowerBound[ i + 1 ] )
        qPOffset = ladf_qp_offset[ i ]
    else
        break
}
```

When the value of ladf_enabled_flag is a first value (e.g., "0"), ladf_enabled_flag may be set to the quantization parameter offset value qPOffset.

FIG. 38 illustrates a table showing relationships between quantization parameters and filtering-related values according to an example.

As shown in the above-described Equation 6, a quantization parameter $qP_{BlockEdge}$ for a block boundary may be calculated.

Also, at least one of $\beta$ and tc may be determined, and deblocking filtering may be performed using at least one of $\beta$ and tc.

$\beta$ may be calculated by calculating the final quantization parameter Q for the block boundary, as represented by the following Equation 9, and substituting the calculated final quantization parameter Q into the table of FIG. 38.

$$Q=\text{Clip3}(0,63,qP_{BlockEdge}+(\text{beta\_offset\_div2}<<1)) \qquad \text{[Equation 9]}$$

beta_offset_div2 may denote an offset for the value of $\beta$ signaled through at least one of a parameter set, a header, and a brick.

$\beta$ may be a value for an 8-bit image. Depending on the bit depth of the image, scaling of $\beta$ may be performed, as represented by Equation 10. The final value of $\beta$ used for filtering may be calculated by the following Equation 10.

$$\beta=\beta*(1<<(\text{BitDepth}-8)) \qquad \text{[Equation 10]}$$

tc may be calculated by calculating the final quantization parameter Q, as represented by the following Equation 11, and substituting the calculated final quantization parameter Q into the table of FIG. 38.

$$Q=\text{Clip3}(0,65,qP_{BlockEdge}+2*(BS-1)+(tc\_offset\_div2<<1)) \qquad \text{[Equation 11]}$$

tc_offset_div2 may denote an offset for the value of tc, which is signaled in at least one of a parameter set, a header, and a brick.

tc may be a value for an 8-bit image. Depending on the bit depth of the image, scaling of tc may be performed, as represented by Equation 12. The final value of tc used for filtering may be calculated by the following Equation 12.

$$tc=tc*(1<<(\text{BitDepth}-8)) \qquad \text{[Equation 12]}$$

Figure 39:
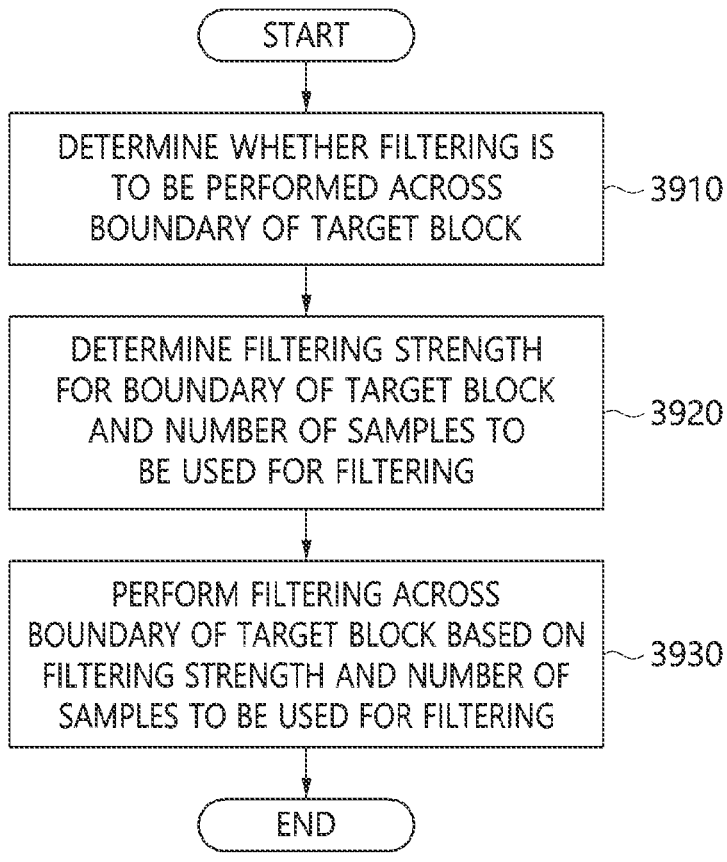
FIG. 39 illustrates an image decoding method according to an embodiment.

FIG. 39 is a flowchart of a filtering method according to an embodiment.

The filtering method may be performed by the encoding apparatus 1600 and/or the decoding apparatus 1700. Here-inafter, a processing unit may be the processing unit 1610 of the encoding apparatus 1600 and/or the processing unit 1710 of the decoding apparatus 1700.

At step 3910, the processing unit may determine whether filtering is to be performed across the boundary of a target block.

Whether filtering is to be performed may be determined based on whether the boundary of the target block corresponds to at least one of a picture boundary, a sub-picture boundary, a slice boundary, a tile boundary, and a brick boundary.

At step 3920, the processing unit may determine filtering strength for the boundary of the target block and the number of samples to be used for filtering.

The number of samples to be used for filtering may be determined based on at least one of the size of the target block and the size of a neighbor block adjacent to the boundary of the target block.

When the boundary of the target block is a vertical boundary, the number of samples to be used for filtering may be determined based on at least one of the horizontal size of the target block and the horizontal size of the neighbor block.

When the boundary of the target block is a horizontal boundary, the number of samples to be used for filtering may be determined based on at least one of the vertical size of the target block and the vertical size of the neighbor block.

The number of samples to be used for filtering may be determined by comparing at least one of the size of the target block and the size of the neighbor block with a predefined value.

For example, the predefined value to be compared with the at least one of the size of the target block and the size of the neighbor block may be 32.

The number of samples to be used for filtering may be independently determined for a luma component and a chroma component of the target block.

Filtering strength may be determined based on the prediction mode of the target block and the prediction mode of the neighbor block.

For example, filtering strength may be determined such that, when the prediction mode of the target block and the prediction mode of the neighbor block are different from each other, low filtering strength is used for filtering. Here, then the low filtering strength is used, BS=1.

At step 3930, the processing unit may perform filtering across the boundary of the target block based on the filtering strength and the number of samples to be used for filtering.

The filtering method according to the embodiment may be performed by the encoding apparatus 1600 and the decoding apparatus 1700 so as to generate a reconstructed image.

An embodiment may include a computer-readable non-transitory storage medium which stores image data for an image used in a decoding method. Here, the image data may be a bitstream. The bitstream may represent image data.

The image data may include the above-described information and coding parameter as to filtering. Decoding on the target block may be performed using the image data.

The information in the bitstream, indicating whether filtering is to be performed, may be used by the encoding apparatus 1600 to indicate whether filtering is to be performed across the boundary of the target block and by the decoding apparatus 1700 to determine whether filtering is to be performed across the boundary of the target block.

In the above-described embodiments, the boundary of the target block may be the boundary of the target block and/or the boundary of the neighbor block.

In the above-described embodiments, the neighbor block may be a block adjacent to the boundary of the target block.

By utilizing the above-described embodiments, unnecessary filtering may be prevented from being performed across the boundary in which blocking artifacts are not caused, and blocking artifacts caused by at least one of prediction, transform, and quantization may be removed.

When the filtering is performed, samples that are used for filtering may be limited to samples belonging to two blocks.

When the filtering is performed, different filtering strengths may be set for a boundary between a transform and another transform, a boundary between a block and a transform, and a boundary between a block and another block.

When the filtering is performed, filtering may be performed when a real edge is not present at the boundary, and filtering strength may be determined depending on the transform and quantization type.

When filtering is performed, the highest filtering strength may be used when a transform and quantization type is a 64×32 or 32×64 size or more.

When the filtering is performed, the number of samples to be used for filtering may be differently set depending on the size of the block, and may be increased as the sizes of a transform unit and a quantization unit are larger.

At least one of the embodiments according to the present invention may be used for deblocking filtering of a luma signal or deblocking filtering of a chroma signal.

By utilizing the above-described embodiments, unnecessary filtering may be prevented from being performed across the boundary in which blocking artifacts are not caused, and blocking artifacts caused by at least one of prediction, transform, and quantization may be removed.

In the present embodiments of the invention, the block may be at least one of a coding block, a prediction block, and a transform block. Also, the block may be a sub-block generated by dividing the block.

Among embodiments, a deblocking filtering may be applied to a deblocking filtering procedure in the form of at least one combination of a specific embodiment or the above embodiments without being limitedly applied to a deblocking filtering procedure in any one embodiment.

The embodiments may be performed using the same method by the encoding apparatus 1600 and by the decoding apparatus 1700.

The image may be encoded/decoded using at least one of the embodiments or at least one combination thereof.

The order of application of the embodiments may be different from each other by the encoding apparatus 1600 and the decoding apparatus 1700, and the order of application of the embodiments may be identical to each other by the encoding apparatus 1600 and the decoding apparatus 1700.

The embodiments may be performed for each of a luma signal and a chroma signal, and may be equally performed for the luma signal and the chroma signal.

The form of a block to which the embodiments of the present disclosure are applied may have a square or non-square shape.

The embodiments of the present disclosure may be applied according to the size of at least one of a target block, a coding block, a prediction block, a transform block, a current block, a coding unit, a prediction unit, a transform unit, a unit, and a current unit. Here, the size may be defined as a minimum size and/or a maximum size so that the embodiments are applied, and may be defined as a fixed size at which the embodiments are applied. Further, in the embodiments, a first embodiment may be applied to a first size, and a second embodiment may be applied to a second size. That is, the embodiments may be compositely applied according to the size. Further, the embodiments of the present disclosure may be applied only to the case where the size is equal to or greater than the minimum size and is less than or equal to the maximum size. That is, the embodiments may be applied only to the case where a block size falls within a certain range.

For example, the embodiments may be applied only to the case where the size of a target block is equal to or greater than 8×8. For example, the embodiments may be applied only to the case where the size of a target block is 4×4. For example, the embodiments may be applied only to the case where the size of a target block is less than or equal to 16×16. For example, the embodiments may be applied only to the case where the size of a target block is equal to or greater 16×16 and less than or equal to 64×64.

The embodiments of the present disclosure may be applied depending on a temporal layer. In order to identify a temporal layer to which the embodiments are applicable, a separate identifier may be signaled, and the embodiments may be applied to the temporal layer specified by the corresponding identifier. Here, the identifier may be defined as the lowest (bottom) layer and/or the highest (top) layer to which the embodiments are applicable, and may be defined as being indicating a specific layer to which the embodiments are applied. Further, a fixed temporal layer to which the embodiments are applied may also be defined.

For example, the embodiments may be applied only to the case where the temporal layer of a target image is the lowermost layer. For example, the embodiments may be applied only to the case where the temporal layer identifier of a target image is equal to or greater than 1. For example, the embodiments may be applied only to the case where the temporal layer of a target image is the highest layer.

A slice type or a tile group type to which the embodiments of the present invention to which the embodiments are applied may be defined, and the embodiments of the present invention may be applied depending on the corresponding slice type or tile group type.

In the above-described embodiments, it may be construed that, during the application of specific processing to a specific target, assuming that specified conditions may be required and the specific processing is performed under a specific determination, a specific coding parameter may be replaced with an additional coding parameter when a description has been made such that whether the specified conditions are satisfied is determined based on the specific coding parameter, or such that the specific determination is made based on the specific coding parameter. In other words, it may be considered that a coding parameter that influences the specific condition or the specific determination is merely exemplary, and it may be understood that, in addition to the specific coding parameter, a combination of one or more additional coding parameters functions as the specific coding parameter.

In the above-described embodiments, although the methods have been described based on flowcharts as a series of steps or units, the present disclosure is not limited to the sequence of the steps and some steps may be performed in a sequence different from that of the described steps or simultaneously with other steps. Further, those skilled in the art will understand that the steps shown in the flowchart are not exclusive and may further include other steps, or that one or more steps in the flowchart may be deleted without departing from the scope of the disclosure.

The above-described embodiments include examples in various aspects. Although all possible combinations for indicating various aspects cannot be described, those skilled in the art will appreciate that other combinations are possible in addition to explicitly described combinations. Therefore, it should be understood that the present disclosure includes other replacements, changes, and modifications belonging to the scope of the accompanying claims.

The above-described embodiments according to the present disclosure may be implemented as a program that can be executed by various computer means and may be recorded on a computer-readable storage medium. The computer-readable storage medium may include program instructions, data files, and data structures, either solely or in combination. Program instructions recorded on the storage medium may have been specially designed and configured for the present disclosure, or may be known to or available to those who have ordinary knowledge in the field of computer software.

A computer-readable storage medium may include information used in the embodiments of the present disclosure. For example, the computer-readable storage medium may include a bitstream, and the bitstream may contain the information described above in the embodiments of the present disclosure.

The computer-readable storage medium may include a non-transitory computer-readable medium.

Examples of the computer-readable storage medium include all types of hardware devices specially configured to record and execute program instructions, such as magnetic media, such as a hard disk, a floppy disk, and magnetic tape, optical media, such as compact disk (CD)-ROM and a digital versatile disk (DVD), magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present disclosure, and vice versa.

As described above, although the present disclosure has been described based on specific details such as detailed components and a limited number of embodiments and drawings, those are merely provided for easy understanding of the entire disclosure, the present disclosure is not limited to those embodiments, and those skilled in the art will practice various changes and modifications from the above description.

Accordingly, it should be noted that the spirit of the present embodiments is not limited to the above-described embodiments, and the accompanying claims and equivalents and modifications thereof fall within the scope of the present disclosure.

The invention claimed is:

1. A video decoding method, comprising:
determining whether to perform filtering on a target boundary; and
performing the filtering on the target boundary in a case that it is determined to perform the filtering, wherein:
whether to perform the filtering on the target boundary is determined based on whether the target boundary corresponds to 4×4 pixel grid boundaries of a target picture in a case that the target boundary is a luma component boundary, and
the filtering on the target boundary is not performed in a case that the target boundary does not correspond to the 4×4 pixel grid boundaries of the target picture in the case that the target boundary is the luma component boundary.

2. The video decoding method of claim 1, wherein:
the target boundary is a boundary for a specific unit; and
whether to perform filtering on the boundary for the specific unit is determined based on information for the specific unit.

3. The video decoding method of claim 2, wherein:
the specific unit is a tile.

4. The video decoding method of claim 3, wherein:
the information is signaled in a picture parameter set.

5. A video encoding method, comprising:
determining whether to perform filtering on a target boundary; and
performing the filtering on the target boundary in a case that it is determined to perform the filtering, wherein:
whether to perform the filtering on the target boundary is determined based on whether the target boundary corresponds to 4×4 pixel grid boundaries of a target picture in a case that the target boundary is a luma component boundary, and
the filtering on the target boundary is not performed in a case that the target boundary does not correspond to the 4×4 pixel grid boundaries of the target picture in the case that the target boundary is the luma component boundary.

6. The video decoding method of claim 1, wherein:
the filtering is a deblocking filtering,
whether to perform the deblocking filtering on the target boundary is determined based on whether the target boundary corresponds to predetermined-sized pixel grid boundaries of the target picture, and
a size of the predetermined-sized pixel grid boundaries is determined based whether the target boundary is the luma component boundary or a chroma component boundary.

7. The video decoding method of claim 1, wherein:
the filtering on the target boundary is not performed in a case that the target boundary does not correspond to 8×8 pixel grid boundaries of the target picture in a case that the target boundary is a chroma component boundary.

8. The video decoding method of claim 1, wherein:
a flag indicating whether deblocking filtering is performed on a tile boundary is obtained from a bitstream, and
the filtering is not performed on the target boundary in a case that the target boundary is a boundary between tiles and the flag indicates the deblocking filtering is not performed on the tile boundary.

9. The video decoding method of claim 1, wherein:
a flag indicating whether deblocking filtering is performed on a slice comprising the target boundary is obtained from a bitstream, and the filtering is not performed on the target boundary in a case that the flag indicates the deblocking filtering is not performed on the slice.

10. A non-transitory computer-readable recording medium storing configured to store and transmit a bitstream generated by a computer program, wherein, the computer program, when executed by a processor, causes a video encoding apparatus to perform following steps to generate the bitstream:

determining whether to perform filtering on a target boundary;

performing the filtering on the target boundary in a case that it is determined to perform the filtering;

generating the bitstream comprising filter information indicating whether the filtering is performed on the target boundary; and storing the bitstream in the non-transitory computer-readable recording medium, wherein whether to perform the filtering on the target boundary is determined based on whether the target boundary corresponds to 4×4 pixel grid boundaries of a target picture in a case that the target boundary is a luma component boundary, and the filtering on the target boundary is not performed in a case that the target boundary does not correspond to the 4×4 pixel grid boundaries of the target picture in the case that the target boundary is the luma component boundary.

11. The non-transitory computer-readable recording medium of claim 10, wherein:

the target boundary is a boundary for a tile, and whether to perform the filtering on the boundary for the tile is determined based on information for the tile.

12. The non-transitory computer-readable recording medium of claim 10, wherein:

the filtering is a deblocking filtering, whether to perform the deblocking filtering on the target boundary is determined based on whether the target boundary corresponds to predetermined-sized pixel grid boundaries of the target picture, and a size of the predetermined-sized pixel grid boundaries is determined based whether the target boundary is the luma component boundary or a chroma component boundary.

13. A non-transitory computer-readable recording medium storing program instructions for transmitting a bitstream, the program instructions comprising:

an instruction to perform generating the bitstream; and an instruction to transmit the bitstream, wherein the generating the bitstream comprises:

generating the bitstream comprising filter information generated by a video encoding method, wherein the video encoding method comprises:

determining whether to perform filtering on a target boundary;

performing the filtering on the target boundary in a case that it is determined to perform the filtering; and generating the filter information used to determine whether the filtering is performed on the target boundary, wherein whether to perform the filtering on the target boundary is determined based on whether the target boundary corresponds to 4×4 pixel grid boundaries of a target picture in a case that the target boundary is a luma component boundary, and wherein the filtering on the target boundary is not performed in a case that the target boundary does not correspond to the 4×4 pixel grid boundaries of the target picture in a case that the target boundary is the luma component boundary.

14. The non-transitory computer-readable recording medium of claim 13, wherein:

the target boundary is a boundary for a tile, and whether to perform the filtering on the boundary for the tile is determined based on information for the tile.

15. The non-transitory computer-readable recording medium of claim 13, wherein:

the filtering is a deblocking filtering, whether to perform the deblocking filtering on the target boundary is determined based on whether the target boundary corresponds to predetermined-sized pixel grid boundaries of the target picture, and a size of the predetermined-sized pixel grid boundaries is determined based whether the target boundary is the luma component boundary or a chroma component boundary.

16. The video encoding method of claim 5, wherein:

the target boundary is a boundary for a tile, and whether to perform the filtering on the boundary for the tile is determined based on information for the tile.

17. The video encoding method of claim 5, wherein:

the filtering is a deblocking filtering, whether to perform the deblocking filtering on the target boundary is determined based on whether the target boundary corresponds to predetermined-sized pixel grid boundaries of the target picture, and a size of the predetermined-sized pixel grid boundaries is determined based whether the target boundary is the luma component boundary or a chroma component boundary.

* * * * *